(12) United States Patent
Aoyama et al.

(10) Patent No.: US 12,702,163 B2
(45) Date of Patent: Aug. 11, 2026

(54) POWER SUPPLY UNIT FOR AEROSOL GENERATION DEVICE

(71) Applicant: Japan Tobacco Inc., Tokyo (JP)

(72) Inventors: Tatsunari Aoyama, Tokyo (JP); Hiroshi Kawanago, Tokyo (JP); Toru Nagahama, Tokyo (JP); Takashi Fujiki, Tokyo (JP); Ryo Yoshida, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 450 days.

(21) Appl. No.: 18/502,039

(22) Filed: Nov. 5, 2023

(65) Prior Publication Data

US 2024/0057670 A1 Feb. 22, 2024

Related U.S. Application Data

(63) Continuation of application No. PCT/JP2022/007384, filed on Feb. 22, 2022.

(30) Foreign Application Priority Data

May 10, 2021 (JP) ................................ 2021-079879

(51) Int. Cl.

*A24F 40/46* (2020.01)
*A24F 40/50* (2020.01)
*H02J 7/00* (2006.01)

(52) U.S. Cl.

CPC .............. *A24F 40/46* (2020.01); *A24F 40/50* (2020.01); *H02J 7/855* (2026.01)

(58) Field of Classification Search

CPC ..... H02J 7/855; H05B 1/0202; H05B 3/0019; H05B 1/0227; A24F 40/50

See application file for complete search history.

(56) References Cited

U.S. PATENT DOCUMENTS

2017/0127726 A1* 5/2017 Xiang ....................... H02J 7/61
2020/0128883 A1* 4/2020 Yamada ................. A24F 40/53

(Continued)

FOREIGN PATENT DOCUMENTS

CN 111246759 A 6/2020
CN 111513365 A 8/2020

(Continued)

OTHER PUBLICATIONS

International Search Report and Written Opinion mailed on Apr. 19, 2022, received for PCT Application PCT/JP2022/007384, filed on Feb. 22, 2022, 9 pages including English Translation.

*Primary Examiner* — Adolf D Berhane
(74) *Attorney, Agent, or Firm* — XSENSUS LLP

(57) ABSTRACT

A power supply unit for an aerosol generating device, includes a power supply, a heater connector, a first plus-side circuit, a second plus-side circuit having one end connected to the positive electrode, including a second plus-side switch, and connected in parallel with the first plus-side circuit, a minus-side switch connected to the negative electrode, and a controller configured to execute predetermined control based on a voltage applied to the fixed resistor or the heater connector when the first plus-side switch and the minus-side switch are ON. One or both of a first condition in which the first plus-side switch is different from at least one of the second plus-side switch and the minus-side switch and a second condition in which the second plus-side switch is different from the minus-side switch is satisfied.

20 Claims, 27 Drawing Sheets

(56) References Cited

U.S. PATENT DOCUMENTS

| | | | | |
|---|---|---|---|---|
| 2020/0237012 | A1 | 7/2020 | Yamada et al. | |
| 2020/0375259 | A1 | 12/2020 | Mizuguchi et al. | |
| 2022/0071303 | A1 | 3/2022 | Aradachi | |
| 2024/0065344 | A1 * | 2/2024 | Aoyama ................. | A24F 40/90 |
| 2025/0079867 | A1 * | 3/2025 | Aoyama ................. | A24F 40/90 |

FOREIGN PATENT DOCUMENTS

| | | | |
|---|---|---|---|
| CN | 111655054 | A | 9/2020 |
| JP | 6613008 | B1 | 11/2019 |
| JP | 6865879 | B1 | 4/2021 |
| KR | 20200049637 | A | 5/2020 |
| KR | 20200089723 | A | 7/2020 |
| WO | 2019/082281 | A1 | 5/2019 |
| WO | 2019122097 | A1 | 6/2019 |
| WO | 2020/217949 | A1 | 10/2020 |

* cited by examiner

CHARGING MODE
SLEEP MODE
ACTIVE MODE
HEATING INITIAL SETTING MODE
HEATING MODE
HEATING COMPLETION MODE
USB CONNECTION
USB DETACHED or CHARGING ENDED
SLIDER CLOSED or PREDETERMINED TIME ELAPSED
SLIDER OPENED
USB CONNECTION
BUTTON OPERATION
INITIAL SETTING ENDED
· UPPER LIMIT OF TIME or PUFF TIMES REACHED
· SLIDER CLOSED
· USB CONNECTION

162A
MCU1
P16
P15
P9
P18
P14
GND
VDD
Vcc2
ADC1a
ADC1b
OP4
OP5
TS4
B
C
E
N6
RPb2
RPb1
RS4
Pb
S3
G
S
D
S4
Lc
SW
VIN
VOUT
Vbst
N1
STEP-UP DC/DC 9
EN
GND
BAT
Ld
N2
N3
Rs
N4
OP1
N7
Cn(+)
HTR
Cn(−)
N8
N5
R4
D5
S5
S6

Vcc2
VDD
GND
P14
P18
P9
P15
P16
MCU1
ADC1a
ADC1b
OP4
OP5
Pb
RPb2
RPb1
N6
B
C
E
OFF
TS4
RS4
S3
ON
S4
G
S
D
N1
N2
N3
N4
N5
N7
N8
Cn(+)
HTR
Cn(−)
HR1
HR2
HR3
OP1
S5
S6
D5
Rs
R4
Ld
Lc
Vbst
VOUT
EN
STEP-UP DC/DC 9
SW
VIN
BAT MCU1
Vcc2
VDD
GND
P14
P18
P9
P15
P16
ADC1a
ADC1b
OP4
OP5
Pb
N6
B
ON
Ts4
Rs4
S3
OFF
S4
G
ON
Ld
N1
N2
N3
N4
N5
Rs
R4
Vtemp
Vout
Vbst
OP1
Vheat
MR1
MR2
MR3
S5
S6
D5
N7
N8
Cn(+)
HTR
Cn(−)
STEP-UP DC/DC 9
VOUT
EN
GND
SW
VIN
Lc
BAT ADC1a
ADC1b
OP4
OP5
MCU1
P16
P15
P9
P18
P14
GND
VDD
Vcc2
Ts4
B
N6
RPb2
RPb1
Pb
S3
Rs4
Lc
SW
VIN
VOUT
Vbst
N1
STEP-UP DC/DC 9
ON
S4
G
S
D
Ld
N3
Rs
N4
N2
N7
OP1
Cn(+)
HTR
Cn(−)
N8
EN
N5
MR1
R4
D5
S5
HR2
S6
HR1
BAT

POWER SUPPLY UNIT FOR AEROSOL GENERATION DEVICE

CROSS-REFERENCE TO RELATED APPLICATIONS

This is a continuation of International Application No. PCT/JP2022/007384 filed on Feb. 22, 2022, and claims priority from Japanese Patent Application No. 2021-079879 filed on May 10, 2021, the entire content of each is incorporated herein by reference.

TECHNICAL FIELD

The present invention relates to a power supply unit for an aerosol generating device.

BACKGROUND ART

Japanese Patent No. 6613008 discloses a control device for an aerosol inhaler, including: an operational amplifier which heats an aerosol source and performs an output corresponding to a voltage applied to a load having a correlation between a temperature and an electric resistance value; a control unit configured to perform processing based on the voltage corresponding to the output; and a first circuit and a second circuit electrically connected in parallel between a power supply and the load, in which the first circuit and the second circuit include a first switch and a second switch, respectively. The control device is configured to acquire a voltage corresponding to the output of the operational amplifier while the second switch is in an ON state.

WO2020/217949 discloses a non-combustion inhaler including: a heating element having a predetermined resistance value; a power supply configured to supply power to the heating element; a plurality of resistors connected in parallel with the heating element; a control unit; a first switch configured to control ON/OFF of the heating element; a second switch connected between the power supply and the plurality of resistors; and a third switch connected between a wiring among the plurality of resistors and the control unit, in which the control unit is configured to execute switch control of turning on the second switch and the third switch and turning off the first switch at the time of measuring a resistance value of the heating element.

In an aerosol generating device capable of inhaling aerosol, a switching element such as a bipolar transistor and a metal-oxide-semiconductor field-effect transistor (MOSFET) is used to control discharging from a power supply to a heater. However, there are various types of switching elements, and in order to improve the performance of the aerosol generating device, there is room for consideration of what type of switching element is appropriate.

SUMMARY

An object of the present invention is to provide a high-performance aerosol generating device.

According to an aspect of the present disclosure, there is provided a power supply unit for an aerosol generating device including: a power supply; a heater connector including a positive electrode and a negative electrode, by which a heater configured to heat an aerosol source by consuming power supplied from the power supply is connected to the positive electrode and the negative electrode; a first plus-side circuit having one end connected to the positive electrode and including a first plus-side switch and a fixed resistor; a second plus-side circuit having one end connected to the positive electrode, including a second plus-side switch, and connected in parallel with the first plus-side circuit; a minus-side switch connected to the negative electrode; and a controller configured to execute predetermined control based on a voltage applied to the fixed resistor or the heater connector when the first plus-side switch and the minus-side switch are ON, in which one or both of a first condition in which the first plus-side switch is different from at least one of the second plus-side switch and the minus-side switch and a second condition in which the second plus-side switch is different from the minus-side switch is satisfied.

According to another aspect of the present disclosure, there is provided a power supply unit for an aerosol generating device including: a power supply; a heater connector including a positive electrode and a negative electrode, by which a heater configured to heat an aerosol source by consuming power supplied from the power supply is connected to the positive electrode and the negative electrode; a first plus-side circuit having one end connected to the positive electrode and including a first plus-side switch and a fixed resistor; a second plus-side circuit having one end connected to the positive electrode, including a second plus-side switch, and connected in parallel with the first plus-side circuit; and a controller configured to execute predetermined control based on a voltage applied to the fixed resistor or the heater connector when the first plus-side switch is ON, in which the first plus-side switch is different from the second plus-side switch.

According to the present invention, a high-performance aerosol generating device can be provided.

BRIEF DESCRIPTION OF DRAWINGS

FIG. 24 is a diagram illustrating a flow of a current when the switch S3 and the switch S4 in a driving example EX2 in FIG. 21 are both turned on.

DESCRIPTION OF EMBODIMENTS

Hereinafter, an inhaling system as an embodiment of an aerosol generating device according to the present invention will be described with reference to the drawings. The inhaling system includes a non-combustion inhaler 100 (hereinafter, also simply referred to as "inhaler 100") which is an embodiment of a power supply unit according to the present invention, and a rod 500 heated by the inhaler 100. In the following description, a configuration in which the inhaler 100 accommodates a heating unit in an undetachable manner will be described as an example. However, the heating unit may be attachable to and detachable from the inhaler 100. For example, the rod 500 and the heating unit may be integrated and attachable to and detachable from the inhaler 100. That is, the power supply unit for the aerosol generating device may have a configuration which does not include the heating unit as a component. The term "undetachable" refers to an aspect in which detachment cannot be performed as long as in an assumed application. Alternatively, an induction heating coil provided in the inhaler 100 and a susceptor built in the rod 500 may cooperate to constitute the heating unit.

Figure 1:
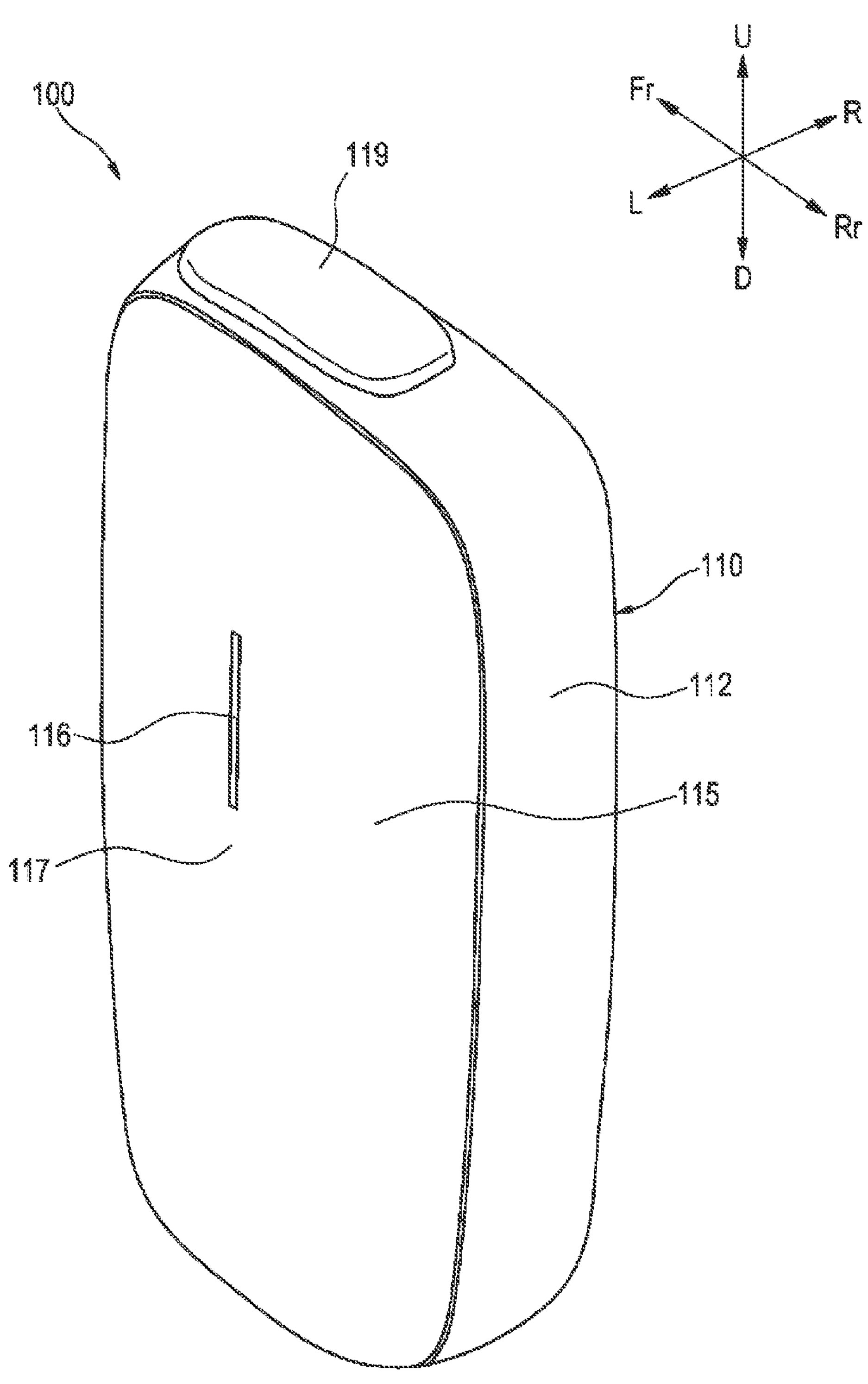
FIG. 1 is a perspective view of a non-combustion inhaler.
Figure 2:
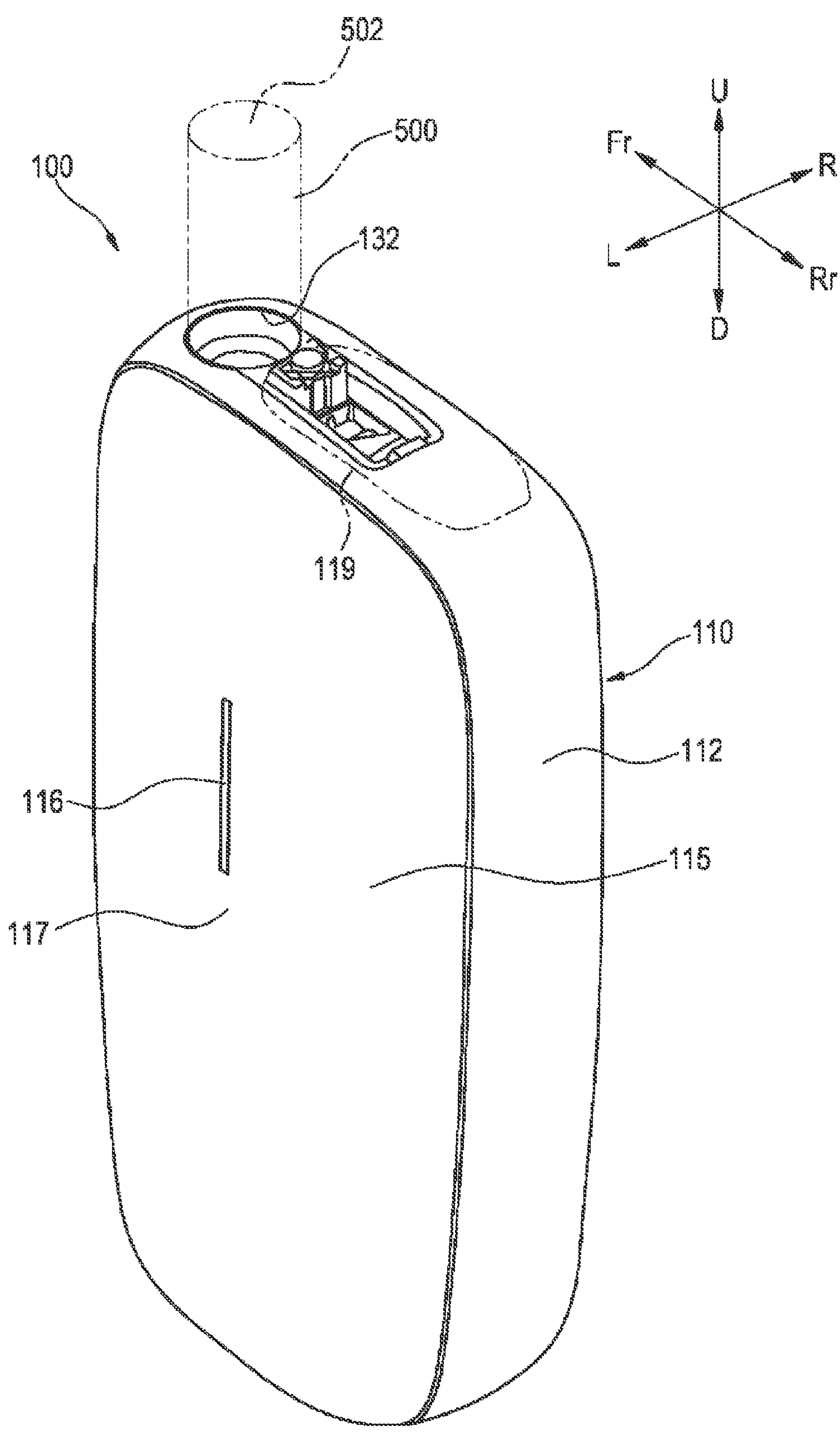
FIG. 2 is a perspective view of the non-combustion inhaler with a rod attached.
Figure 3:
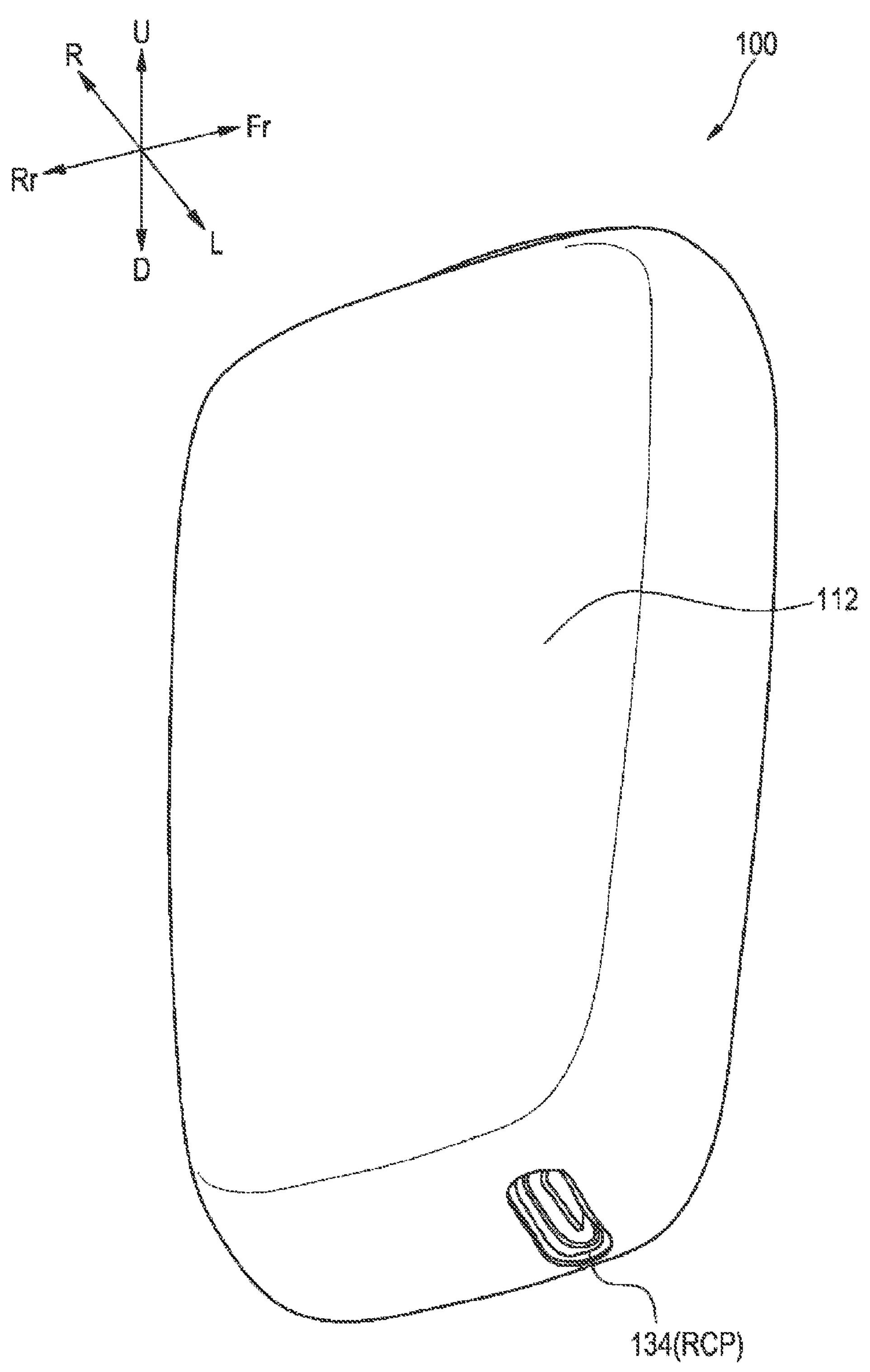
FIG. 3 is another perspective view of the non-combustion inhaler.
Figure 4:
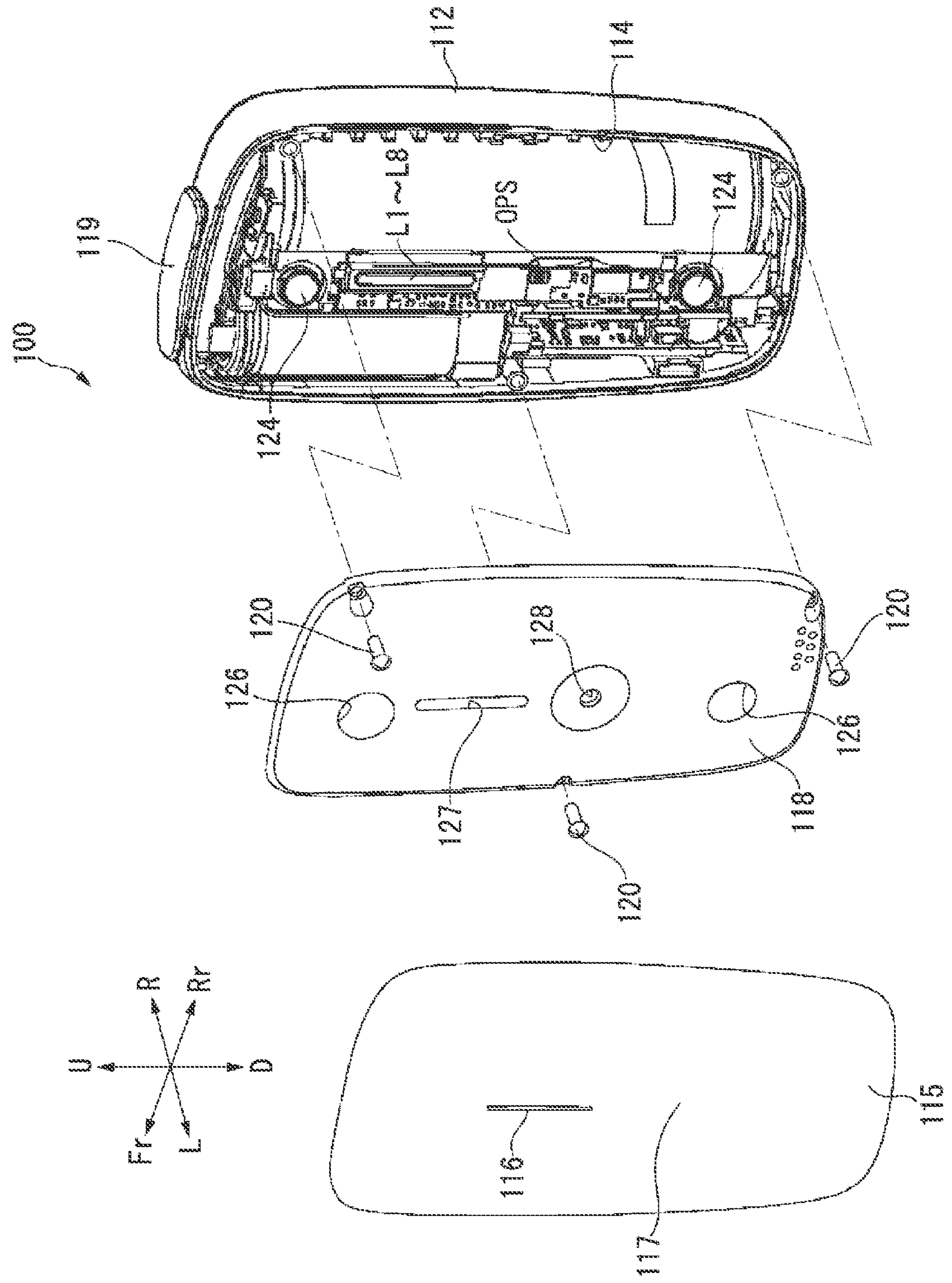
FIG. 4 is an exploded perspective view of the non-combustion inhaler.

FIG. 1 is a perspective view illustrating an overall configuration of the inhaler 100. FIG. 2 is a perspective view of the inhaler 100 with the rod 500 attached. FIG. 3 is another perspective view of the inhaler 100. FIG. 4 is an exploded perspective view of the inhaler 100. In addition, in the following description, for convenience, an orthogonal coordinate system in a three-dimensional space in which three directions orthogonal to one another are defined as a front-rear direction, a left-right direction, and an up-down direction will be described. In the drawings, a front side is indicated by Fr, a rear side is indicated by Rr, a right side is indicated by R, a left side is indicated by L, an upper side is indicated by U, and a lower side is indicated by D.

The inhaler 100 is configured to generate an aerosol containing a flavor by heating the rod 500 which is elongated and substantially columnar (see FIG. 2) as an example of a flavor component generating base material having a filler containing an aerosol source and a flavor source.

<Flavor Component Generating Base Material (Rod)>

The rod 500 includes a filler containing an aerosol source which is heated at a predetermined temperature to generate aerosol.

The type of the aerosol source is not particularly limited, and an extract substance from various natural products and/or a constituent component thereof can be selected according to a purpose. The aerosol source may be a solid, or may be, for example, a polyhydric alcohol such as glycerin or propylene glycol, or a liquid such as water. The aerosol source may include a flavor source such as a tobacco raw material which releases a flavor component by heating, or an extract originated from a tobacco raw material. The gas to which the flavor component is added is not limited to the aerosol, and for example, invisible steam may be generated.

The filler of the rod 500 may contain cut tobacco as the flavor source. A material of the cut tobacco is not specifically limited, and publicly known material such as a lamina and a stem may be used as the material. The filler may contain one kind or two or more kinds of flavors. The kinds of flavors are not specifically limited, however, in view of provision of satisfactory smoke flavor, a flavor is menthol, preferably. The flavor source may contain plants other than tobacco (for example, mints, herbal medicines, or herbs). The rod 500 may not contain a flavor source depending on the purpose.

<Overall Configuration of Non-Combustion Inhaler>

Next, an overall configuration of the inhaler 100 will be described with reference to FIGS. 1 to 4.

The inhaler 100 includes a substantially rectangular case 110 having a front surface, a rear surface, a left surface, a right surface, an upper surface, and a lower surface. The case 110 includes a bottomed tubular case main body 112 in which the front surface, the rear surface, the upper surface, the lower surface, and the right surface are integrally formed, an outer panel 115 and an inner panel 118 which seal an opening portion 114 (see FIG. 4) of the case main body 112 and constitute the left surface, and a slider 119.

The inner panel 118 is fixed to the case main body 112 by bolts 120. The outer panel 115 is fixed to the case main body 112 by magnets 124 held by a chassis 150 (see FIG. 5) to be described later accommodated in the case main body 112, so as to cover an outer surface of the inner panel 118. The outer panel 115 is fixed by the magnets 124, so that a user may replace the outer panel 115 as desired.

The inner panel 118 is provided with two through holes 126 through which the magnets 124 pass. The inner panel 118 is further provided with a vertically long hole 127 and a circular round hole 128 between the two through holes 126 disposed vertically. The long hole 127 is used to transmit light emitted from eight light emitting diodes (LEDs) L1 to L8 built in the case main body 112. A button-type operation switch OPS built in the case main body 112 passes through the round hole 128. Accordingly, the user can detect the light emitted from the eight LEDs L1 to L8 through a LED window 116 of the outer panel 115. In addition, the user can press down the operation switch OPS via a pressing portion 117 of the outer panel 115.

As illustrated in FIG. 2, an opening 132 into which the rod 500 may be inserted is provided in the upper surface of the case main body 112. The slider 119 is coupled to the case main body 112 between a position where the opening 132 is closed (see FIG. 1) and a position where the opening 132 is opened (see FIG. 2), so as to be movable in the front-rear direction.

The operation switch OPS is used to perform various operations of the inhaler 100. For example, the user operates the operation switch OPS via the pressing portion 117 in a state where the rod 500 is inserted into the opening 132 and mounted as illustrated in FIG. 2. Accordingly, the rod 500 is heated by the heating unit 170 (see FIG. 5) without combustion. When the rod 500 is heated, aerosol is generated from the aerosol source contained in the rod 500, and the flavor of the flavor source contained in the rod 500 is added to the aerosol. The user can inhale the aerosol containing the flavor by holding in the mouth an inhaling port 502 of the rod 500 protruding from the opening 132 to perform inhaling.

As illustrated in FIG. 3, a charging terminal 134 which is electrically connected to an external power supply such as an outlet or a mobile battery and receives supply of power is provided on the lower surface of the case main body 112. In the present embodiment, the charging terminal 134 is a universal serial bus (USB) Type-C receptacle, but is not limited thereto. The charging terminal 134 is hereinafter also referred to as a receptacle RCP.

The charging terminal 134 may include, for example, a power receiving coil, and may receive power transmitted from the external power supply in a non-contact manner. A method of wireless power transfer in this case may be an electromagnetic induction type, a magnetic resonance type, or a combination of the electromagnetic induction type and the magnetic resonance type. As another example, the charging terminal 134 may be connectable to various USB terminals or the like, and may include the above-described power receiving coil.

A configuration of the inhaler 100 illustrated in FIGS. 1 to 4 is merely an example. The inhaler 100 can be configured in various forms in which the rod 500 is held and applied with an action such as heating to generate a gas to which a flavor component is added from the rod 500, and a user can inhale the generated gas.

<Internal Configuration of Non-Combustion Inhaler>

An internal unit 140 of the inhaler 100 will be described with reference to FIGS. 5 to 8.

Figure 5:
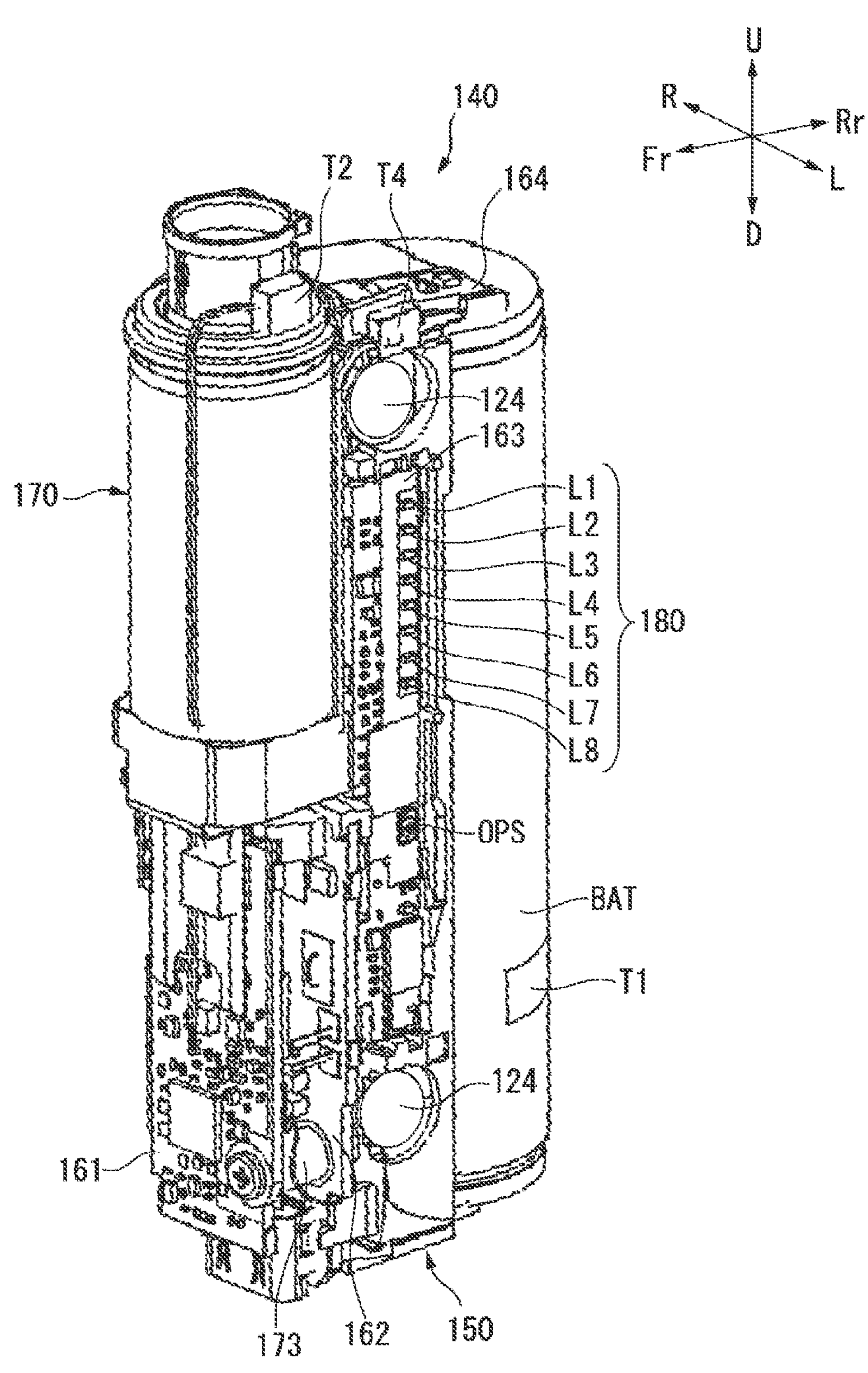
FIG. 5 is a perspective view of an internal unit of the non-combustion inhaler.
Figure 6:
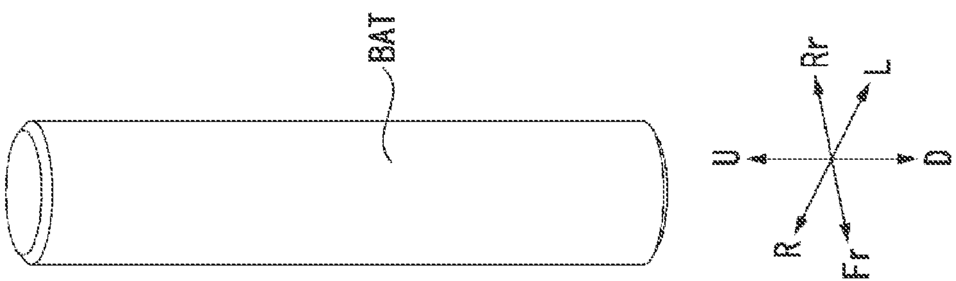
FIG. 6 is an exploded perspective view of the internal unit in FIG. 5.
Figure 6:
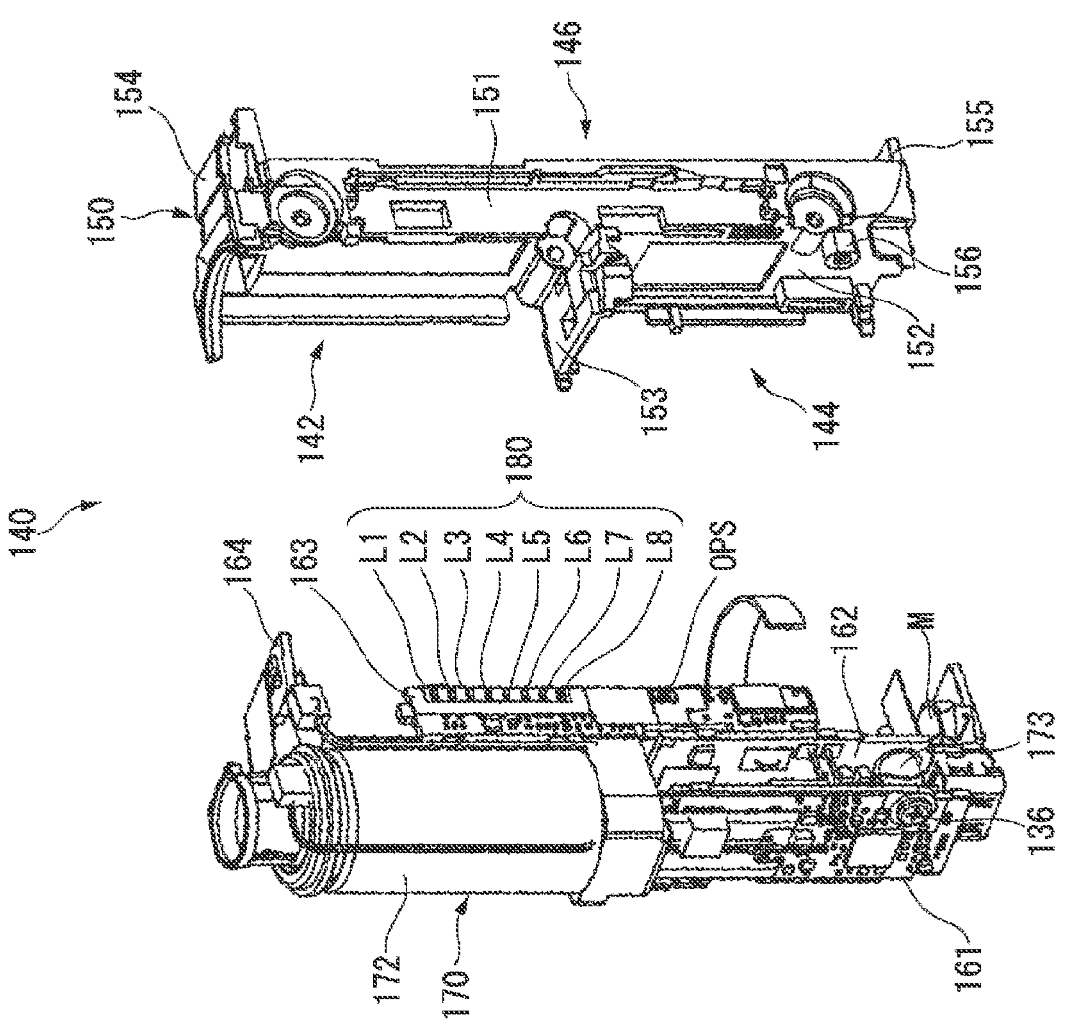
Figure 7:
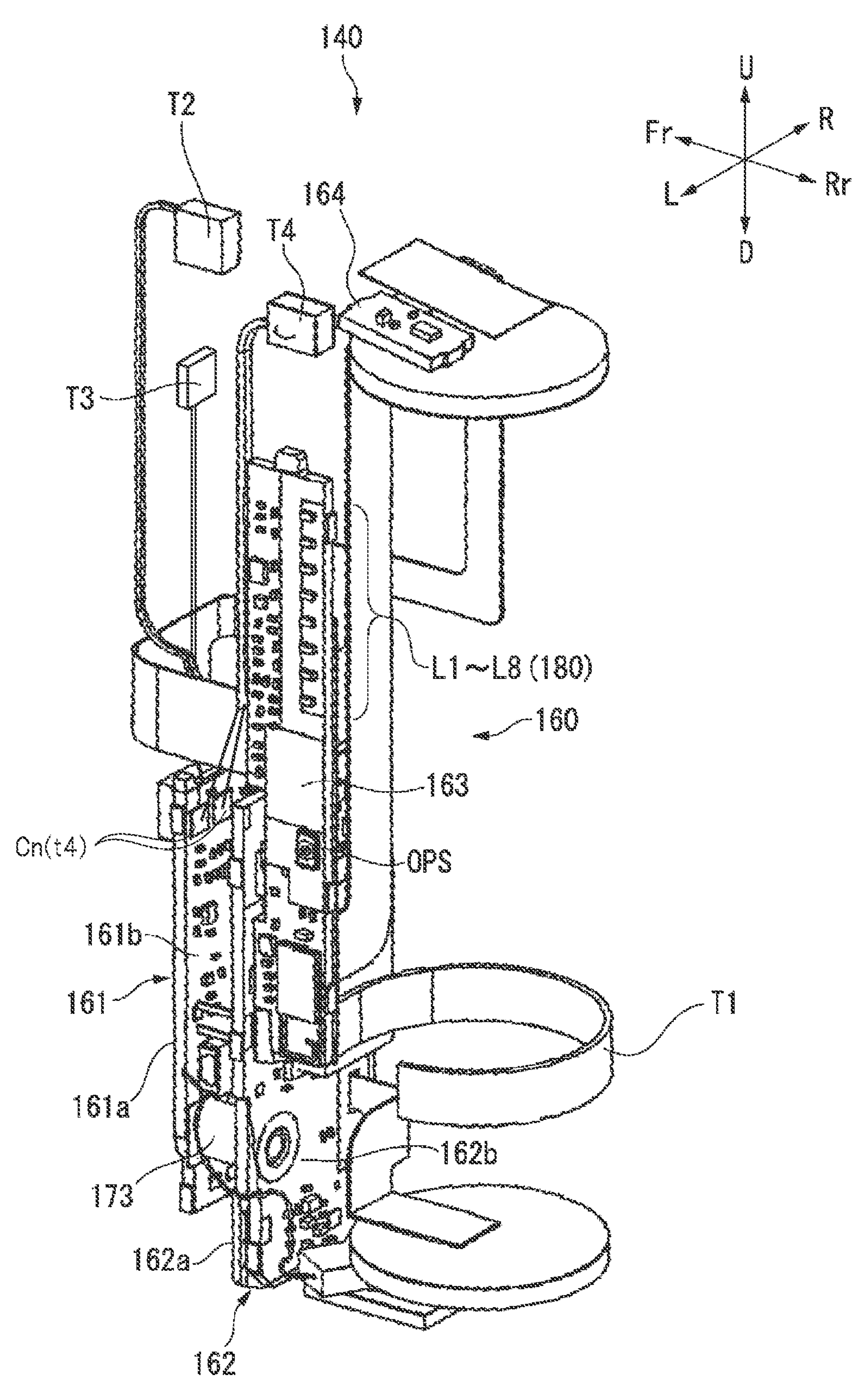
FIG. 7 is a perspective view of the internal unit with a power supply and a chassis removed.
Figure 8:
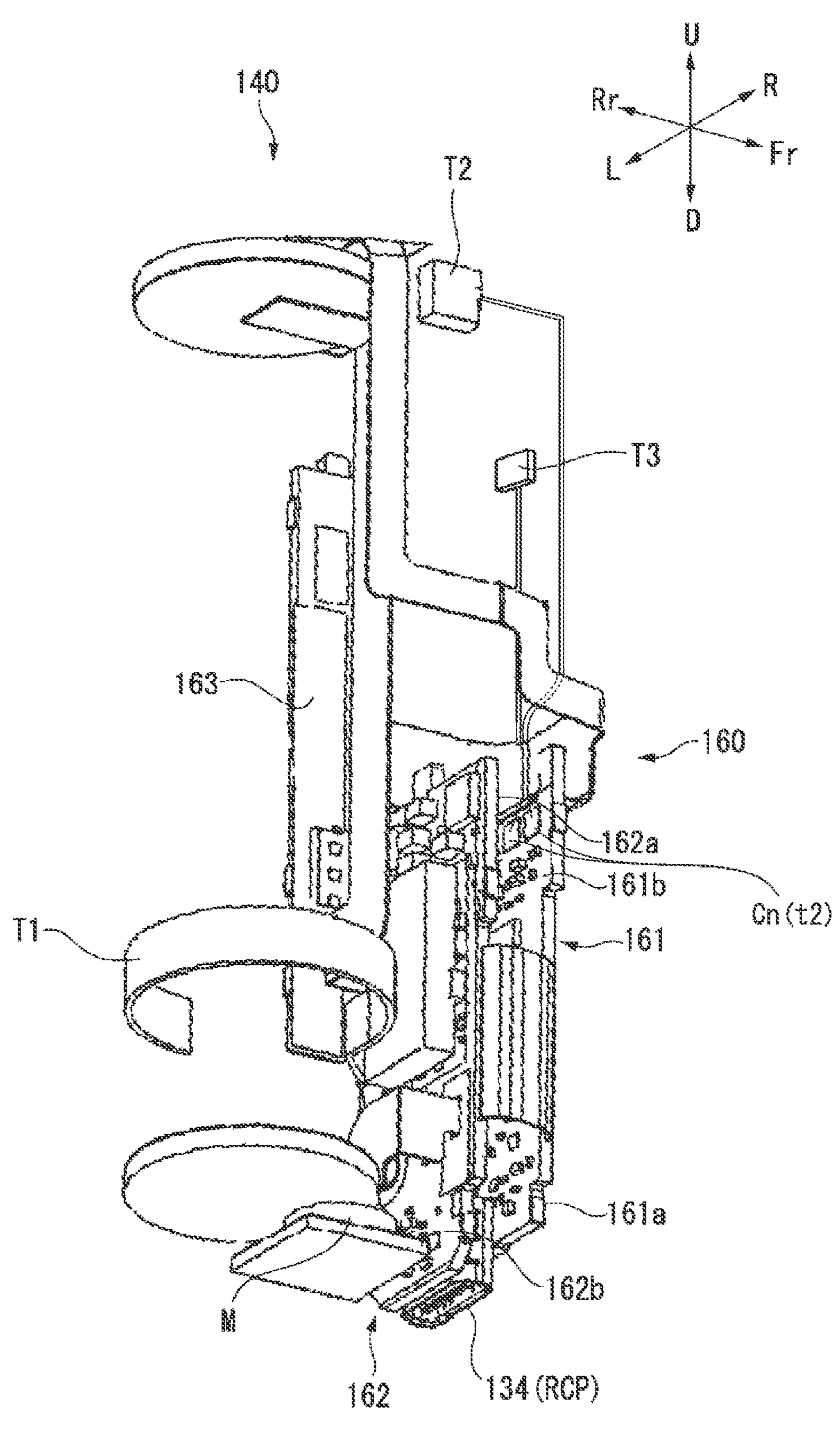
FIG. 8 is another perspective view of the internal unit with the power supply and the chassis removed.

FIG. 5 is a perspective view of the internal unit 140 of the inhaler 100. FIG. 6 is an exploded perspective view of the internal unit 140 in FIG. 5. FIG. 7 is a perspective view of the internal unit 140 from which a power supply BAT and the chassis 150 are removed. FIG. 8 is another perspective view of the internal unit 140 from which the power supply BAT and the chassis 150 are removed.

The internal unit 140 accommodated in an internal space of the case 110 includes the chassis 150, the power supply BAT, a circuit unit 160, a heating unit 170, a notification unit 180, and various sensors.

The chassis 150 includes a plate-shaped chassis main body 151 which is disposed substantially in a center of the internal space of the case 110 in the front-rear direction and which extends in the up-down direction and the front-rear direction, a plate-shaped front-rear dividing wall 152 which is disposed substantially in the center of the internal space of the case 110 in the front-rear direction and which extends in the up-down direction and the left-right direction, a plate-shaped up-down dividing wall 153 which extends forward from substantially a center of the front-rear dividing wall 152 in the up-down direction, a plate-shaped chassis upper wall 154 which extends rearward from upper edge portions of the front-rear dividing wall 152 and the chassis main body 151, and a plate-shaped chassis lower wall 155 which extends rearward from lower edge portions of the front-rear dividing wall 152 and the chassis main body 151. A left surface of the chassis main body 151 is covered with the inner panel 118 and the outer panel 115 of the case 110 described above.

By the chassis 150, a heating unit accommodation region 142 is defined and formed in an upper front portion of the internal space of the case 110, a board accommodation region 144 is defined and formed in a lower front portion thereof, and a power supply accommodation space 146 is defined and formed in a rear portion thereof over the up-down direction.

The heating unit 170 accommodated in the heating unit accommodation region 142 is constituted by a plurality of tubular members, and the tubular members are concentrically disposed to form a tubular body as a whole. The heating unit 170 includes a rod accommodation portion 172 capable of accommodating a part of the rod 500 therein, and a heater HTR (see FIGS. 10 to 19) which heats the rod 500 from an outer periphery or a center. It is preferable that a surface of the rod accommodation portion 172 and the heater HTR are thermally insulated by forming the rod accommodation portion 172 with a heat insulating material or providing a heat insulating material inside the rod accommodation portion 172. The heater HTR may be an element capable of heating the rod 500. The heater HTR is, for example, a heating element. Examples of the heating element include a heating resistor, a ceramic heater, and an induction-heating-type heater. As the heater HTR, for example, a heater having a positive temperature coefficient (PTC) characteristic in which a resistance value increases with an increase in temperature is preferably used. Alternatively, a heater HTR having a negative temperature coefficient (NTC) characteristic in which the resistance value decreases with an increase in temperature may be used. The heating unit 170 has a function of defining a flow path of air supplied to the rod 500 and a function of heating the rod 500. The case 110 is formed with a vent hole (not illustrated) for allowing air to flow in so that air can flow into the heating unit 170.

The power supply BAT accommodated in the power supply accommodation space 146 is a rechargeable secondary battery, an electric double layer capacitor, or the like, preferably a lithium ion secondary battery. An electrolyte of the power supply BAT may be constituted by one or a combination of a gel electrolyte, an electrolytic solution, a solid electrolyte, and an ionic liquid.

The notification unit 180 notifies various types of information such as a state of charge (SOC) indicating a charging state of the power supply BAT, a preheating time at the time of inhaling, and an inhaling available period. The notification unit 180 according to the present embodiment includes the eight LEDs L1 to L8 and a vibration motor M. The notification unit 180 may be constituted by a light emitting element such as the LEDs L1 to L8, a vibration element such as the vibration motor M, or a sound output element. The notification unit 180 may be a combination of two or more elements among a light emitting element, a vibration element, and a sound output element.

The various sensors include an intake sensor which detects a puff operation (inhaling operation) of the user, a power supply temperature sensor which detects a temperature of the power supply BAT, a heater temperature sensor which detects a temperature of the heater HTR, a case temperature sensor which detects a temperature of the case 110, a cover position sensor which detects a position of the slider 119, a panel detection sensor which detects attachment and detachment of the outer panel 115, and the like.

The intake sensor mainly includes, for example, a thermistor T2 disposed in the vicinity of the opening 132. The power supply temperature sensor mainly includes, for example, a thermistor T1 disposed in the vicinity of the power supply BAT. The heater temperature sensor mainly includes, for example, a thermistor T3 disposed in the vicinity of the heater HTR. As described above, the rod accommodation portion 172 is preferably thermally insulated from the heater HTR. In this case, the thermistor T3 is preferably in contact with or close to the heater HTR inside the rod accommodation portion 172. When the heater HTR has the PTC characteristic or the NTC characteristic, the heater HTR may be used for the heater temperature sensor. The case temperature sensor mainly includes, for example, a thermistor T4 disposed in the vicinity of the left surface of the case 110. The cover position sensor mainly includes a Hall IC 14 including a Hall element disposed in the vicinity of the slider 119. The panel detection sensor mainly includes a Hall IC 13 including a Hall element disposed in the vicinity of an inner surface of the inner panel 118.

The circuit unit 160 includes four circuit boards, a plurality of integrate circuits (ICs), and a plurality of elements. The four circuit boards include an MCU-mounted board 161 to be described later on which a micro controller unit (MCU) 1 and a charging IC 2 are mainly disposed, a receptacle-mounted board 162 on which the charging terminal 134 is mainly disposed, an LED-mounted board 163 on which the operation switch OPS, the LEDs L1 to L8, and a communication IC 15 to be described later are disposed, and a Hall IC-mounted board 164 on which the Hall IC 14 to be described later including a Hall element constituting the cover position sensor is disposed.

The MCU-mounted board 161 and the receptacle-mounted board 162 are disposed in parallel with each other in the board accommodation region 144. Specifically, the MCU-mounted board 161 and the receptacle-mounted board 162 are disposed such that element disposition surfaces thereof extend in the left-right direction and the up-down direction, and the MCU-mounted board 161 is disposed in front of the receptacle-mounted board 162. Each of the MCU-mounted board 161 and the receptacle-mounted board 162 is provided with an opening portion. The MCU-mounted board 161 and the receptacle-mounted board 162 are fastened, by a bolt 136, to a board fixing portion 156 of the front-rear dividing wall 152 in a state where a cylindrical spacer 173 is interposed between peripheral portions of the respective opening portions. That is, the spacer 173 fixes positions of the MCU-mounted board 161 and the receptacle-mounted board 162 inside the case 110, and mechanically connects the MCU-mounted board 161 and the receptacle-mounted board 162. Accordingly, the MCU-mounted board 161 and the receptacle-mounted board 162 come into contact with each other, and it is possible to prevent the occurrence of a short-circuit current therebetween.

For convenience, assuming that the surfaces of the MCU-mounted board 161 and the receptacle-mounted board 162 facing the front are main surfaces 161*a* and 162*a*, respectively, and surfaces opposite to the main surfaces 161*a* and 162*a* are secondary surfaces 161*b* and 162*b*, respectively, the secondary surface 161*b* of the MCU-mounted board 161 and the main surface 162*a* of the receptacle-mounted board 162 face each other with a predetermined gap therebetween. The main surface 161*a* of the MCU-mounted board 161 faces the front surface of the case 110, and the secondary surface 162*b* of the receptacle-mounted board 162 faces the front-rear dividing wall 152 of the chassis 150. Elements and ICs mounted on the MCU-mounted board 161 and the receptacle-mounted board 162 will be described later.

The LED-mounted board 163 is disposed on a left side surface of the chassis main body 151 and between the two magnets 124 disposed vertically. An element disposition surface of the LED-mounted board 163 is disposed along the up-down direction and the front-rear direction. In other words, element disposition surfaces of the MCU-mounted board 161 and the receptacle-mounted board 162 are orthogonal to the element disposition surface of the LED-mounted board 163. In this way, the element disposition surfaces of the MCU-mounted board 161 and the receptacle-mounted board 162 and the element disposition surface of the LED-mounted board 163 are not limited to being orthogonal to one another, and preferably intersect with one another (not parallel with one another). The vibration motor M constituting the notification unit 180 together with the LEDs L1 to L8 is fixed to a lower surface of the chassis lower wall 155 and is electrically connected to the MCU-mounted board 161.

The Hall IC-mounted board 164 is disposed on the upper surface of the chassis upper wall 154.

<Operation Modes of Inhaler>

Figure 9:
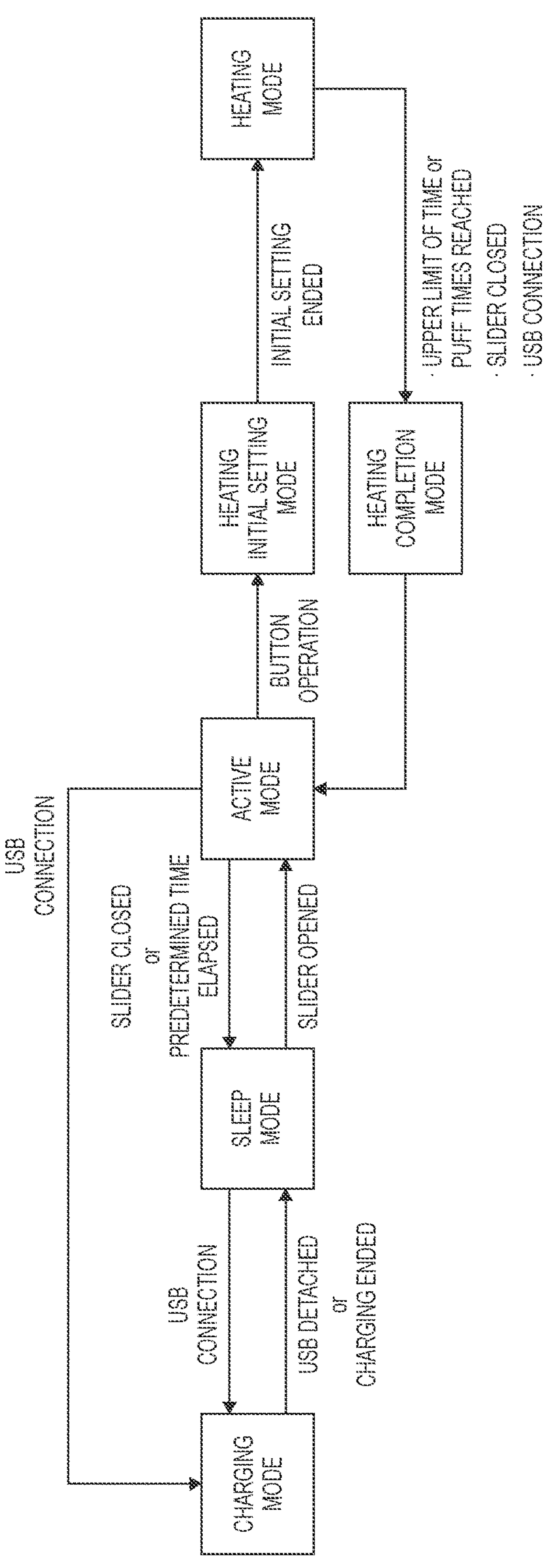
FIG. 9 is a schematic diagram for illustrating operation modes of the inhaler.

FIG. 9 is a schematic diagram for illustrating operation modes of the inhaler 100. As illustrated in FIG. 9, the operation modes of the inhaler 100 include a charging mode, a sleep mode, an active mode, a heating initial setting mode, a heating mode, and a heating completion mode.

The sleep mode is a mode in which supply of power to electronic components mainly required for heating control of the heater HTR is stopped to save power.

The active mode is a mode in which most of the functions excluding the heating control of the heater HTR are enabled. The inhaler 100 switches the operation mode to the active mode when the slider 119 is opened in a state of operating in the sleep mode. The inhaler 100 switches the operation mode to the sleep mode when the slider 119 is closed or a non-operation time of the operation switch OPS reaches a predetermined time in a state of operating in the active mode.

The heating initial setting mode is a mode for performing initial setting of control parameters and the like for starting the heating control of the heater HTR. The inhaler 100 switches the operation mode to the heating initial setting mode when the operation of the operation switch OPS is detected in a state of operating in the active mode, and switches the operation mode to the heating mode when the initial setting is completed.

The heating mode is a mode in which the heating control of the heater HTR (heating control for aerosol generation and heating control for temperature detection) is executed. The inhaler 100 starts the heating control of the heater HTR when the operation mode is switched to the heating mode.

The heating completion mode is a mode in which a completion process (storage process of heating history or the like) of the heating control of the heater HTR is executed. The inhaler 100 switches the operation mode to the heating completion mode when an energization time to the heater HTR or the number of times of inhaling by the user reaches an upper limit or the slider 119 is closed in a state of operating in the heating mode, and switches the operation mode to the active mode when the completion process is completed. The inhaler 100 switches the operation mode to the heating completion mode when a USB connection is established in a state of operating in the heating mode, and switches the operation mode to the charging mode when the completion process is completed. As illustrated in FIG. 9, in this case, the operation mode may be switched to the active mode before the operation mode is switched to the charging mode. In other words, the inhaler 100 may switch the operation mode in the order of the heating completion mode, the active mode, and the charging mode when the USB connection is established in a state of operating in the heating mode.

The charging mode is a mode in which the power supply BAT is charged by power supplied from the external power supply connected to the receptacle RCP. The inhaler 100 switches the operation mode to the charging mode when an external power supply is connected (USB connected) to the receptacle RCP in a state of operating in the sleep mode or the active mode. The inhaler 100 switches the operation mode to the sleep mode when the charging of the power supply BAT is completed or the connection between the receptacle RCP and the external power supply is released in a state of operating in the charging mode.

<Outline of Circuit of Internal Unit>

Figure 10:
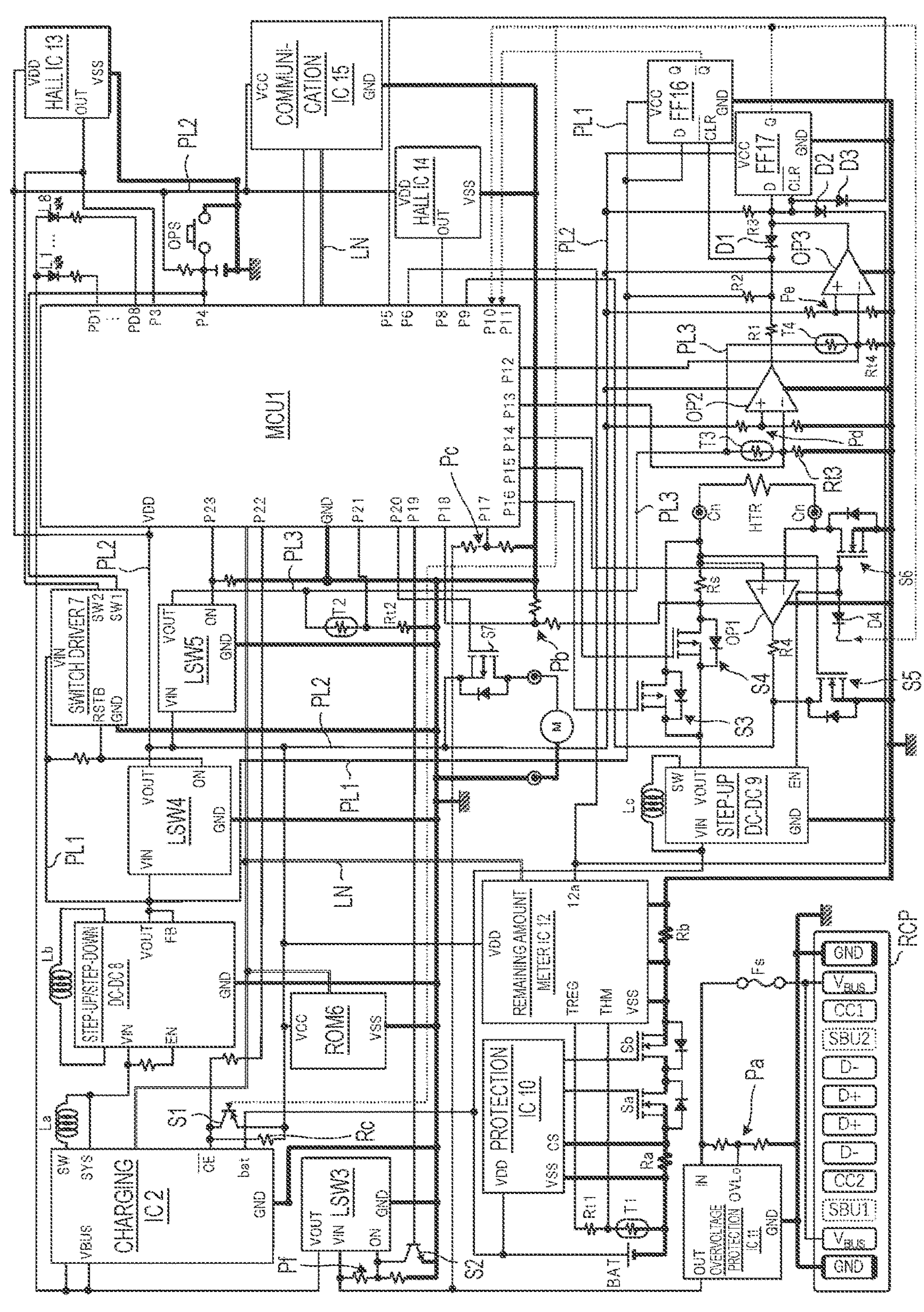
FIG. 10 is a diagram illustrating a schematic configuration of an electric circuit of the internal unit.
Figure 11:
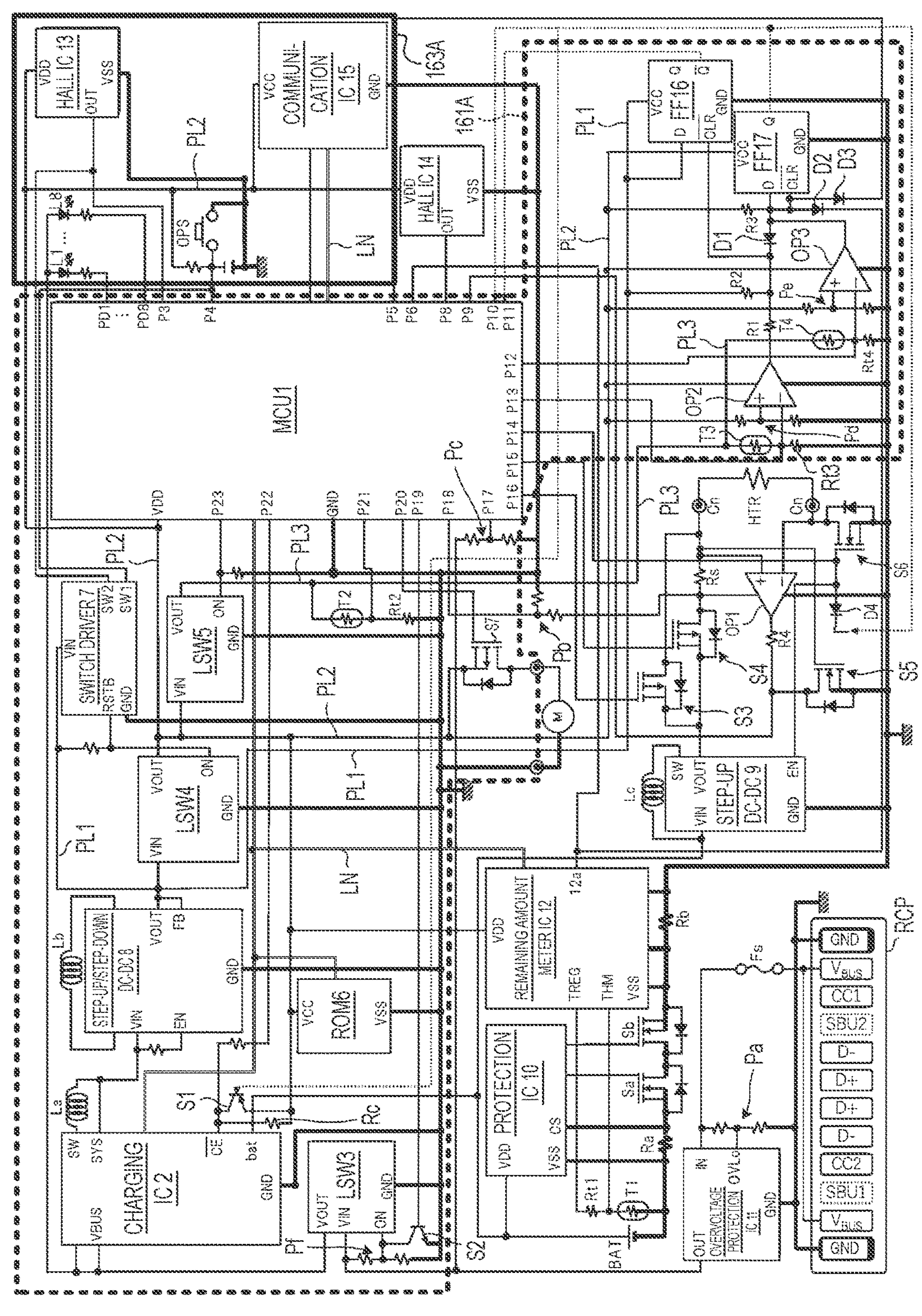
FIG. 11 is a diagram illustrating a schematic configuration of the electric circuit of the internal unit.
Figure 12:
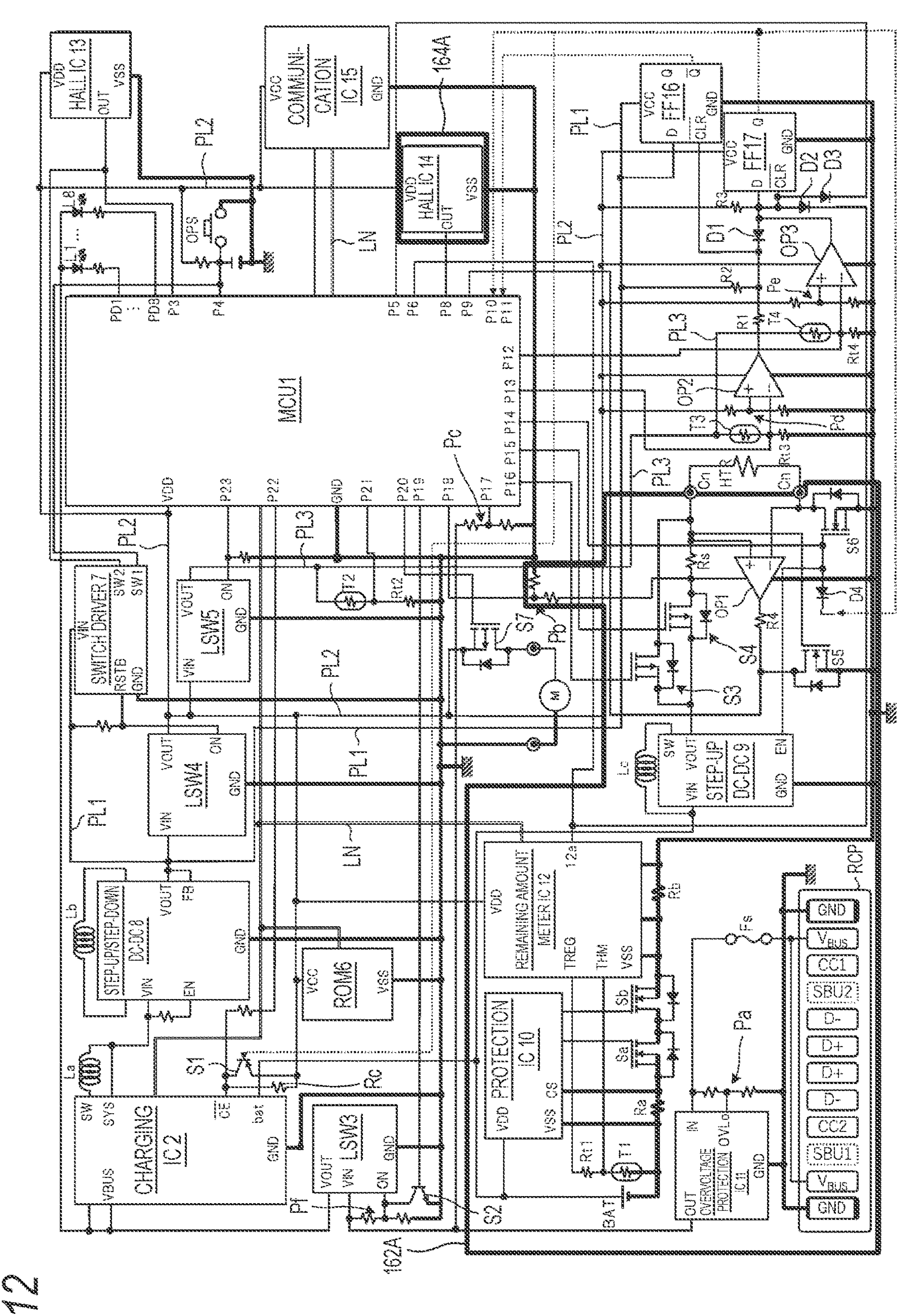
FIG. 12 is a diagram illustrating a schematic configuration of the electric circuit of the internal unit.

FIGS. 10, 11, and 12 are diagrams illustrating a schematic configuration of an electric circuit of the internal unit 140. FIG. 11 is the same as FIG. 10 except that a range 161A (range surrounded by a thick broken line) mounted on the MCU-mounted board 161 and a range 163A (range surrounded by a thick solid line) mounted on the LED-mounted board 163 are added in the electric circuit illustrated in FIG. 10. FIG. 12 is the same as FIG. 10 except that a range 162A mounted on the receptacle-mounted board 162 and a range 164A mounted on the Hall IC-mounted board 164 are added in the electric circuit illustrated in FIG. 10.

A wiring indicated by a thick solid line in FIG. 10 is a wiring having the same potential as a reference potential (ground potential) of the internal unit 140 (wiring connected to a ground provided in the internal unit 140), and this wiring is hereinafter referred to as a ground line. In FIG. 10, an electronic component in which a plurality of circuit elements are formed into a chip is indicated by a rectangle, and reference numerals of various terminals are described inside the rectangle. A power supply terminal VCC and a power supply terminal VDD mounted on the chip each indicate a power supply terminal on a high potential side. A power supply terminal VSS and a ground terminal GND mounted on the chip each indicate a power supply terminal on a low potential side (reference potential side). In the electronic component formed into a chip, a difference between a potential of the power supply terminal on the high potential side and a potential of the power supply terminal on the low potential side becomes a power supply voltage. The electronic component formed into a chip executes various functions using the power supply voltage.

As illustrated in FIG. 11, the MCU-mounted board 161 (range 161A) is provided with, as main electronic components, the MCU 1 which performs overall control of the inhaler 100, the charging IC 2 which performs charging control of the power supply BAT, load switches (hereinafter, LSW) 3, 4, and 5 configured by combining a capacitor, a resistor, a transistor, and the like, a read only memory (ROM) 6, a switch driver 7, a step-up/step-down DC/DC converter 8 (described as step-up/step-down DC/DC 8 in the drawing), an operational amplifier OP2, an operational amplifier OP3, flip-flops (hereinafter, FF) 16 and 17, a connector Cn (t2) electrically connected to the thermistor T2 constituting the intake sensor (described as the thermistor T2 connected to the connector in the drawing), a connector Cn (t3) electrically connected to the thermistor T3 constituting the heater temperature sensor (described as the thermistor T3 connected to the connector in the drawing), a connector Cn (t4) electrically connected to the thermistor T4 constituting the case temperature sensor (described as the thermistor T4 connected to the connector in the drawing), and a voltage divider circuit Pc for USB connection detection.

The ground terminal GND of each of the charging IC 2, LSW 3, LSW 4, LSW 5, the switch driver 7, the step-up/step-down DC/DC converter 8, the FF 16, and the FF 17 is connected to the ground line. The power supply terminal VSS of the ROM 6 is connected to the ground line. Negative power supply terminals of the operational amplifiers OP2 and the operational amplifier OP3 are connected to the ground line.

As illustrated in FIG. 11, the LED-mounted board 163 (range 163A) is provided with, as main electronic components, the Hall IC 13 including the Hall element constituting the panel detection sensor, the LEDs L1 to L8, the operation switch OPS, and the communication IC 15. The communication IC 15 is a communication module for communicating with an electronic device such as a smartphone. Each of the power supply terminal VSS of the Hall IC 13 and the ground terminal GND of the communication IC 15 is connected to the ground line. The communication IC 15 and the MCU 1 can communicate with each other via a communication line LN. One end of the operation switch OPS is connected to the ground line, and the other end of the operation switch OPS is connected to a terminal P4 of the MCU 1.

As illustrated in FIG. 12, the receptacle-mounted board 162 (range 162A) is provided with, as main electronic components, a power supply connector electrically connected to the power supply BAT (described as the power supply BAT connected to the power supply connector in the drawing), a connector electrically connected to the thermistor T1 constituting the power supply temperature sensor (described as the thermistor T1 connected to the connector in the drawing), the step-up DC/DC converter 9 (described as the step-up DC/DC 9 in the drawing), a protection IC 10, an overvoltage protection IC 11, a remaining amount meter IC 12, the receptacle RCP, the switch S3 to the switch S6 each constituted by a MOSFET, the operational amplifier OP1, and a pair of heater connectors Cn (positive electrode side and negative electrode side) electrically connected to the heater HTR.

The two ground terminals GND of the receptacle RCP, the ground terminal GND of the step-up DC/DC converter 9, the power supply terminal VSS of the protection IC 10, the power supply terminal VSS of the remaining amount meter IC 12, the ground terminal GND of the overvoltage protection IC 11, and the negative power supply terminal of the operational amplifier OP1 are each connected to the ground line.

As illustrated in FIG. 12, the Hall IC-mounted board 164 (range 164A) is provided with the Hall IC 14 including the Hall element constituting the cover position sensor. The power supply terminal VSS of the Hall IC 14 is connected to the ground line. An output terminal OUT of the Hall IC 14 is connected to a terminal P8 of the MCU 1. The MCU 1 detects opening and closing of the slider 119 based on a signal input to the terminal P8.

As illustrated in FIG. 11, a connector electrically connected to the vibration motor M is provided on the MCU-mounted board 161.

<Details of Circuit of Internal Unit>

A connection relation among the electronic components will be described below with reference to FIG. 10.

Two power supply input terminals VBUS of the receptacle RCP are each connected to an input terminal IN of the overvoltage protection IC 11 via a fuse Fs. When a USB plug is connected to the receptacle RCP and a USB cable including the USB plug is connected to an external power supply, a USB voltage $V_{USB}$ is supplied to the two power supply input terminals VBUS of the receptacle RCP.

One end of a voltage divider circuit Pa including a series circuit of two resistors is connected to the input terminal IN of the overvoltage protection IC 11. The other end of the voltage divider circuit Pa is connected to the ground line. A connection point of the two resistors constituting the voltage divider circuit Pa is connected to a voltage detection terminal OVLo of the overvoltage protection IC 11. In a state where a voltage input to the voltage detection terminal OVLo is less than a threshold, the overvoltage protection IC 11 outputs the voltage input to the input terminal IN from the output terminal OUT. When the voltage input to the voltage detection terminal OVLo is equal to or higher than a threshold (overvoltage), the overvoltage protection IC 11 stops the voltage output from the output terminal OUT (cuts off an electrical connection between the LSW 3 and the receptacle RCP) to protect the electronic components downstream of the overvoltage protection IC 11. The output terminal OUT of the overvoltage protection IC 11 is connected to an input terminal VIN of the LSW 3 and one end of the voltage divider circuit Pc (series circuit of two resistors) connected to the MCU 1. The other end of the voltage divider circuit Pc is connected to the ground line. A connection point of the two resistors constituting the voltage divider circuit Pc is connected to a terminal P17 of the MCU 1.

One end of a voltage divider circuit Pf including a series circuit of two resistors is connected to the input terminal VIN of the LSW 3. The other end of the voltage divider circuit Pf is connected to the ground line. A connection point of the two resistors constituting the voltage divider circuit Pf is connected to a control terminal ON of the LSW 3. A collector terminal of a bipolar transistor S2 is connected to the control terminal ON of the LSW 3. An emitter terminal of the bipolar transistor S2 is connected to the ground line. A base terminal of the bipolar transistor S2 is connected to a terminal P19 of the MCU 1. The LSW 3 outputs a voltage input to the input terminal VIN from an output terminal VOUT when a signal input to the control terminal ON becomes a high level. The output terminal VOUT of the LSW 3 is connected to an input terminal VBUS of the charging IC 2. The MCU 1 turns on the bipolar transistor S2 while the USB connection is not established. Accordingly, since the control terminal ON of the LSW 3 is connected to the ground line via the bipolar transistor S2, a low-level signal is input to the control terminal ON of the LSW 3.

The bipolar transistor S2 connected to the LSW 3 is turned off by the MCU 1 when the USB connection is established. By turning off the bipolar transistor S2, the USB voltage $V_{USB}$ divided by the voltage divider circuit Pf is input to the control terminal ON of the LSW 3. Therefore, when the USB connection is established and the bipolar transistor S2 is turned off, a high-level signal is input to the control terminal ON of the LSW 3. Accordingly, the LSW 3 outputs, from the output terminal VOUT, the USB voltage $V_{USB}$ supplied from the USB cable. Even when the USB connection is established in a state where the bipolar transistor S2 is not turned off, the control terminal ON of the LSW 3 is connected to the ground line via the bipolar transistor S2. Therefore, it should be noted that a low-level signal continues to be input to the control terminal ON of the LSW 3 unless the MCU 1 turns off the bipolar transistor S2.

A positive electrode terminal of the power supply BAT is connected to the power supply terminal VDD of the protection IC 10, an input terminal VIN of the step-up DC/DC converter 9, and a charging terminal bat of the charging IC 2. Therefore, the power supply voltage $V_{BAT}$ of the power supply BAT is supplied to the protection IC 10, the charging IC 2, and the step-up DC/DC converter 9. A resistor Ra, a switch Sa constituted by a MOSFET, a switch Sb constituted by a MOSFET, and a resistor Rb are connected in series to a negative electrode terminal of the power supply BAT in this order. A current detection terminal CS of the protection IC 10 is connected to a connection point between the resistor Ra and the switch Sa. Each of control terminals of the switch Sa and the switch Sb is connected to the protection IC 10. Both ends of the resistor Rb are connected to the remaining amount meter IC 12.

The protection IC 10 acquires a current value flowing through the resistor Ra during charging and discharging of the power supply BAT from the voltage input to the current detection terminal CS, and when the current value becomes excessively large (overcurrent), performs opening and closing control of the switch Sa and the switch Sb to stop charging or discharging of the power supply BAT, thereby protecting the power supply BAT. More specifically, when an excessively large current value is acquired at the time of charging the power supply BAT, the protection IC 10 turns off the switch Sb to stop the charging of the power supply BAT. When an excessively large current value is acquired at the time of discharging the power supply BAT, the protection IC 10 turns off the switch Sa to stop the discharging of the power supply BAT. In addition, when a voltage value of the power supply BAT becomes abnormal based on the voltage input to the power supply terminal VDD (in a case of overcharge or overvoltage), the protection IC 10 performs opening and closing control of the switch Sa and the switch Sb to stop charging or discharging of the power supply BAT, thereby protecting the power supply BAT. More specifically, when the overcharge of the power supply BAT is detected, the protection IC 10 turns off the switch Sb to stop the charging of the power supply BAT. When the overdischarge of the power supply BAT is detected, the protection IC 10 turns off the switch Sa to stop the discharging of the power supply BAT.

A resistor Rt1 is connected to the connector which is connected to the thermistor T1 disposed in the vicinity of the power supply BAT. A series circuit of the resistor Rt1 and the thermistor T1 is connected to the ground line and a regulator terminal TREG of the remaining amount meter IC 12. A connection point between the thermistor T1 and the resistor Rt1 is connected to a thermistor terminal THM of the remaining amount meter IC 12. The thermistor T1 may be a positive temperature coefficient (PTC) thermistor whose resistance value increases as the temperature increases, or may be a negative temperature coefficient (NTC) thermistor whose resistance value decreases as the temperature increases.

The remaining amount meter IC 12 detects a current flowing through the resistor Rb and derives battery information such as a remaining capacity of the power supply BAT, a state of charge (SOC) indicating a charging state, and a state of health (SOH) indicating a health state based on the detected current value. The remaining amount meter IC 12 supplies a voltage from a built-in regulator connected to the regulator terminal TREG to a voltage divider circuit of the thermistor T1 and the resistor Rt1. The remaining amount meter IC 12 acquires a voltage divided by the voltage divider circuit from the thermistor terminal THM, and acquires temperature information related to the temperature of the power supply BAT based on the voltage. The remaining amount meter IC 12 is connected to the MCU 1 via the communication line LN for serial communication, and is configured to be able to communicate with the MCU 1. The remaining amount meter IC 12 transmits the derived battery information and the acquired temperature information of the power supply BAT to the MCU 1 in response to a request from the MCU 1. A plurality of signal lines such as a data line for data transmission and a clock line for synchronization are required to perform serial communication. It should be noted that only one signal line is illustrated in FIGS. 10 to 19 for simplification.

The remaining amount meter IC 12 includes a notification terminal 12*a*. The notification terminal 12*a* is connected to a terminal P6 of the MCU 1 and a cathode of a diode D2 to be described later. When an abnormality such as an excessively high temperature of the power supply BAT is detected, the remaining amount meter IC 12 outputs a low-level signal from the notification terminal 12*a* to notify the MCU 1 of the occurrence of the abnormality. The low-level signal is also input to a CLR(‾) terminal of the FF 17 via the diode D2.

One end of a reactor Lc is connected to a switching terminal SW of the step-up DC/DC converter 9. The other end of the reactor Lc is connected to the input terminal VIN of the step-up DC/DC converter 9. The step-up DC/DC converter 9 performs ON/OFF control of a built-in transistor connected to the switching terminal SW, thereby stepping up an input voltage and outputting the stepped-up voltage from an output terminal VOUT thereof. The input terminal VIN of the step-up DC/DC converter 9 constitutes a power supply terminal of the step-up DC/DC converter 9 on a high potential side. The step-up DC/DC converter 9 performs a step-up operation when a signal input to an enable terminal EN is at a high level. In the USB-connected state, the signal input to the enable terminal EN of the step-up DC/DC converter 9 may be controlled to a low level by the MCU 1. Alternatively, in the USB-connected state, the MCU 1 may not control the signal input to the enable terminal EN of the step-up DC/DC converter 9 to make a potential of the enable terminal EN unstable.

A source terminal of a switch S4 constituted by a P-channel MOSFET is connected to the output terminal VOUT of the step-up DC/DC converter 9. A gate terminal of the switch S4 is connected to a terminal P15 of the MCU 1. One end of a resistor Rs is connected to a drain terminal of the switch S4. The other end of the resistor Rs is connected to the heater connector Cn on the positive electrode side connected to one end of the heater HTR. A voltage divider circuit Pb including two resistors is connected to a connection point between the switch S4 and the resistor Rs. A connection point of the two resistors constituting the voltage divider circuit Pb is connected to a terminal P18 of the MCU 1. A connection point between the switch S4 and the resistor Rs is further connected to a positive power supply terminal of the operational amplifier OP1.

A connection line between the output terminal VOUT of the step-up DC/DC converter 9 and the source terminal of the switch S4 is connected to a source terminal of the switch S3 constituted by a P-channel MOSFET. A gate terminal of the switch S3 is connected to the terminal P16 of the MCU 1. A drain terminal of the switch S3 is connected to a connection line between the resistor Rs and the heater connector Cn on the positive electrode side. In this way, a circuit including the switch S3 and a circuit including the switch S4 and the resistor Rs are connected in parallel between the output terminal VOUT of the step-up DC/DC converter 9 and the positive electrode side of the heater connector Cn. The circuit including the switch S3 does not include a resistor, and thus is a circuit having a lower resistance than the circuit including the switch S4 and the resistor Rs.

A non-inverting input terminal of the operational amplifier OP1 is connected to the connection line between the resistor Rs and the heater connector Cn on the positive electrode side. An inverting input terminal of the operational amplifier OP1 is connected to the heater connector Cn on the negative electrode side and a drain terminal of the switch S6, the heater connector Cn being connected to the other end of the heater HTR, the drain terminal of the switch S6 being constituted by an N-channel MOSFET. A source terminal of the switch S6 is connected to the ground line. A gate terminal of the switch S6 is connected to a terminal P14 of the MCU 1, an anode of the diode D4, and the enable terminal EN of the step-up DC/DC converter 9. A cathode of the diode D4 is connected to a Q terminal of the FF 17. One end of a resistor R4 is connected to an output terminal of the operational amplifier OP1. The other end of the resistor R4 is connected to a terminal P9 of the MCU 1 and a drain terminal of the switch S5 constituted by an N-channel MOSFET. A source terminal of the switch S5 is connected to the ground line. A gate terminal of the switch S5 is connected to the connection line between the resistor Rs and the heater connector Cn on the positive electrode side.

The input terminal VBUS of the charging IC 2 is connected to an anode of each of the LEDs L1 to L8. Cathodes of the LEDs L1 to L8 are connected to control terminals PD1 to PD8 of the MCU 1 via resistors for current limitation, respectively. That is, the LEDs L1 to L8 are connected in parallel with the input terminal VBUS. The LEDs L1 to L8 are configured to be able to be operated by the USB voltage $V_{USB}$ supplied from the USB cable connected to the receptacle RCP and a voltage supplied from the power supply BAT via the charging IC 2. Transistors (switching elements) connected to the control terminal PD1 to the control terminal PD8 and the ground terminal GND are built in the MCU 1. The MCU 1 turns on the transistor connected to the control terminal PD1 to energize the LED L1 and turn on the LED L1. The MCU 1 turns off the transistor connected to the control terminal PD1 to turn off the LED L1. By switching ON and OFF of the transistor connected to the control terminal PD1 at a high speed, the luminance and the light emission pattern of the LED L1 can be dynamically controlled. Similarly, the LEDs L2 to L8 are controlled to be turned on and turned off by the MCU 1.

The charging IC 2 has a charging function of charging the power supply BAT based on the USB voltage $V_{USB}$ input to the input terminal VBUS. The charging IC 2 acquires a charging current or a charging voltage of the power supply BAT from a terminal or wiring (not illustrated), and performs charging control of the power supply BAT (control on supply of power from the charging terminal bat to the power supply BAT) based on the acquired charging current or charging voltage. In addition, the charging IC 2 may acquire, from the MCU 1, the temperature information of the power supply BAT transmitted from the remaining amount meter IC 12 to the MCU 1 through serial communication using the communication line LN and use the temperature information for charging control.

The charging IC 2 further includes a $V_{BAT}$ power path function and an OTG function. The$V_{BAT}$ power path function is a function of outputting, from an output terminal SYS, a system power supply voltage Vcc0 which is substantially equal to the power supply voltage $V_{BAT}$ input to the charging terminal bat. The OTG function is a function of outputting a system power supply voltage Vcc4 obtained by stepping up the power supply voltage $V_{BAT}$ input to the charging terminal bat from the input terminal VBUS. ON/OFF of the OTG function of the charging IC 2 is controlled by the MCU 1 through serial communication using the communication line LN. In the OTG function, the power supply voltage $V_{BAT}$ input to the charging terminal bat may be output as it is from the input terminal VBUS. In this case, the power supply voltage $V_{BAT}$ is substantially equal to the system power supply voltage Vcc4.

The output terminal SYS of the charging IC 2 is connected to an input terminal VIN of the step-up/step-down DC/DC converter 8. One end of a reactor La is connected to the switching terminal SW of the charging IC 2. The other end of the reactor La is connected to the output terminal SYS of the charging IC 2. A charge enable terminal CE(‾) of the charging IC 2 is connected to a terminal P22 of the MCU 1 via a resistor. Further, a collector terminal of the bipolar transistor S1 is connected to the charge enable terminal CE(‾) of the charging IC 2. An emitter terminal of the bipolar transistor S1 is connected to an output terminal VOUT of the LSW 4 to be described later. A base terminal of the bipolar transistor S1 is connected to the Q terminal of the FF 17. Further, one end of a resistor Rc is connected to the charge enable terminal CE(‾) of the charging IC 2. The other end of the resistor Rc is connected to the output terminal VOUT of the LSW 4.

A resistor is connected to the input terminal VIN and an enable terminal EN of the step-up/step-down DC/DC converter 8. By inputting the system power supply voltage Vcc0 from the output terminal SYS of the charging IC 2 to the input terminal VIN of the step-up/step-down DC/DC converter 8, a signal input to the enable terminal EN of the step-up/step-down DC/DC converter 8 becomes a high level, and the step-up/step-down DC/DC converter 8 starts a step-up operation or a step-down operation. The step-up/step-down DC/DC converter 8 steps up or steps down the system power supply voltage Vcc0 input to the input terminal VIN by switching control of a built-in transistor connected to a reactor Lb to generate a system power supply voltage Vcc1, and outputs the system power supply voltage Vcc1 from the output terminal VOUT. The output terminal VOUT of the step-up/step-down DC/DC converter 8 is connected to a feedback terminal FB of the step-up/step-down DC/DC converter 8, an input terminal VIN of the LSW 4, an input terminal VIN of the switch driver 7, and the power supply terminal VCC and a D terminal of the FF 16. A wiring to which the system power supply voltage Vcc1 output from the output terminal VOUT of the step-up/step-down DC/DC converter 8 is supplied is referred to as a power supply line PL1.

When the signal input to a control terminal ON becomes a high level, the LSW 4 outputs, from the output terminal VOUT, the system power supply voltage Vcc1 input to the input terminal VIN. The control terminal ON of the LSW 4 and the power supply line PL1 are connected via a resistor. Therefore, by supplying the system power supply voltage Vcc1 to the power supply line PL1, the high-level signal is input to the control terminal ON of the LSW 4. The voltage output by the LSW 4 is the same as the system power supply voltage Vcc1 when a wiring resistance or the like is ignored, but in order to distinguish from the system power supply voltage Vcc1, the voltage output from the output terminal VOUT of the LSW 4 is hereinafter referred to as a system power supply voltage Vcc2.

The output terminal VOUT of the LSW 4 is connected to the power supply terminal VDD of the MCU 1, an input terminal VIN of the LSW 5, the power supply terminal VDD of the remaining amount meter IC 12, the power supply terminal VCC of the ROM 6, the emitter terminal of the bipolar transistor S1, the resistor Rc, and the power supply terminal VCC of the FF 17. A wiring to which the system power supply voltage Vcc2 output from the output terminal VOUT of the LSW 4 is supplied is referred to as a power supply line PL2.

When a signal input to a control terminal ON becomes a high level, the LSW 5 outputs, from an output terminal VOUT thereof, the system power supply voltage Vcc2 input to the input terminal VIN. The control terminal ON of the LSW 5 is connected to a terminal P23 of the MCU 1. A voltage output by the LSW 5 is the same as the system power supply voltage Vcc2 when a wiring resistance or the like is ignored, but in order to distinguish from the system power supply voltage Vcc2, the voltage output from the output terminal VOUT of the LSW 5 is hereinafter referred to as a system power supply voltage Vcc3. A wiring to which the system power supply voltage Vcc3 output from the output terminal VOUT of the LSW 5 is supplied is referred to as a power supply line PL3.

A series circuit of the thermistor T2 and a resistor Rt2 is connected to the power supply line PL3, and the resistor Rt2 is connected to the ground line. The thermistor T2 and the resistor Rt2 constitute a voltage divider circuit, and a connection point thereof is connected to a terminal P21 of the MCU 1. The MCU 1 detects a temperature variation (resistance value variation) of the thermistor T2 based on the voltage input to the terminal P21, and determines presence or absence of a puff operation based on a temperature variation amount.

A series circuit of the thermistor T3 and a resistor Rt3 is connected to the power supply line PL3, and the resistor Rt3 is connected to the ground line. The thermistor T3 and the resistor Rt3 constitute a voltage divider circuit, and a connection point thereof is connected to a terminal P13 of the MCU 1 and an inverting input terminal of the operational amplifier OP2. The MCU 1 detects a temperature of the thermistor T3 (corresponding to the temperature of the heater HTR) based on the voltage input to the terminal P13.

A series circuit of the thermistor T4 and a resistor Rt4 is connected to the power supply line PL3, and the resistor Rt4 is connected to the ground line. The thermistor T4 and the resistor Rt4 constitute a voltage divider circuit, and a connection point thereof is connected to a terminal P12 of the MCU 1 and an inverting input terminal of the operational amplifier OP3. The MCU 1 detects a temperature of the thermistor T4 (corresponding to the temperature of the case 110) based on the voltage input to the terminal P12.

A source terminal of a switch S7 constituted by a MOSFET is connected to the power supply line PL2. A gate terminal of the switch S7 is connected to a terminal P20 of the MCU 1. A drain terminal of the switch S7 is connected to one of a pair of connectors to which the vibration motor M is connected. The other of the pair of connectors is connected to the ground line. The MCU 1 can control opening and closing of the switch S7 by operating a potential of the terminal P20 to vibrate the vibration motor M in a specific pattern. A dedicated driver IC may be used instead of the switch S7.

A positive power supply terminal of the operational amplifier OP2 and a voltage divider circuit Pd (series circuit of two resistors) connected to a non-inverting input terminal of the operational amplifier OP2 are connected to the power supply line PL2. A connection point of the two resistors constituting the voltage divider circuit Pd is connected to the non-inverting input terminal of the operational amplifier OP2. The operational amplifier OP2 outputs a signal corresponding to the temperature of the heater HTR (signal corresponding to a resistance value of the thermistor T3). In the present embodiment, since a thermistor having the NTC characteristic is used as the thermistor T3, an output voltage of the operational amplifier OP2 decreases as the temperature of the heater HTR (temperature of the thermistor T3) increases. A reason is that a negative power supply terminal of the operational amplifier OP2 is connected to the ground line, and the value of the output voltage of the operational amplifier OP2 becomes substantially equal to the value of the ground potential when the voltage value (divided value by the thermistor T3 and the resistor Rt3) input to the inverting input terminal of the operational amplifier OP2 becomes higher than the voltage value (divided value by the voltage divider circuit Pd) input to the non-inverting input terminal of the operational amplifier OP2. That is, when the temperature of the heater HTR (temperature of the thermistor T3) becomes high, the output voltage of the operational amplifier OP2 becomes a low level.

When a thermistor having the PTC characteristic is used as the thermistor T3, outputs of voltage divider circuits of the thermistor T3 and the resistor Rt3 may be connected to the non-inverting input terminal of the operational amplifier OP2, and an output of the voltage divider circuit Pd may be connected to the inverting input terminal of the operational amplifier OP2.

A positive power supply terminal of the operational amplifier OP3 and a voltage divider circuit Pe (series circuit of two resistors) connected to a non-inverting input terminal of the operational amplifier OP3 are connected to the power supply line PL2. A connection point of the two resistors constituting the voltage divider circuit Pe is connected to the non-inverting input terminal of the operational amplifier OP3. The operational amplifier OP3 outputs a signal corresponding to the temperature of the case 110 (signal corresponding to a resistance value of the thermistor T4). In the present embodiment, since a thermistor having the NTC characteristic is used as the thermistor T4, the output voltage of the operational amplifier OP3 decreases as the temperature of the case 110 increases. A reason is that a negative power supply terminal of the operational amplifier OP3 is connected to the ground line, and the value of the output voltage of the operational amplifier OP3 becomes substantially equal to the value of the ground potential when the voltage value (divided value by the thermistor T4 and the resistor Rt4) input to the inverting input terminal of the operational amplifier OP3 becomes higher than the voltage value (divided value by the voltage divider circuit Pe) input to the non-inverting input terminal of the operational amplifier OP3. That is, when the temperature of the thermistor T4 becomes high, the output voltage of the operational amplifier OP3 becomes a low level.

When a thermistor having the PTC characteristic is used as the thermistor T4, outputs of voltage divider circuits of the thermistor T4 and the resistor Rt4 may be connected to the non-inverting input terminal of the operational amplifier OP3, and an output of the voltage divider circuit Pe may be connected to the inverting input terminal of the operational amplifier OP3.

A resistor R1 is connected to an output terminal of the operational amplifier OP2. A cathode of a diode D1 is connected to the resistor R1. An anode of the diode D1 is connected to an output terminal of the operational amplifier OP3, a D terminal of the FF 17, and a CLR(‾) terminal of the FF 17. A resistor R2 connected to the power supply line PL1 is connected to a connection line between the resistor R1 and the diode D1. In addition, a CLR(‾) terminal of the FF 16 is connected to the connection line.

One end of a resistor R3 is connected to a connection line between the D terminal of the FF 17 and a connection point of the anode of the diode D1 and the output terminal of the operational amplifier OP3. The other end of the resistor R3 is connected to the power supply line PL2. Further, an anode of the diode D2 connected to the notification terminal 12*a* of the remaining amount meter IC 12, an anode of a diode D3, and the CLR(‾) terminal of the FF 17 are connected to the connection line. A cathode of the diode D3 is connected to a terminal P5 of the MCU 1.

When the temperature of the heater HTR becomes excessively high, the signal output from the operational amplifier OP2 becomes small, and the signal input to the CLR(‾) terminal becomes a low level, the FF 16 inputs a high-level signal from a Q(‾) terminal to a terminal P11 of the MCU 1. A high-level system power supply voltage Vcc1 is supplied from the power supply line PL1 to the D terminal of the FF 16. Therefore, in the FF 16, a low-level signal is continuously output from the Q(‾) terminal unless the signal input to the CLR(‾) terminal operating with a negative logic becomes a low level.

The signal input to the CLR(‾) terminal of the FF 17 becomes a low level when the temperature of the heater HTR becomes excessively high, when the temperature of the case 110 becomes excessively high, or when a low-level signal indicating abnormality detection is output from the notification terminal 12*a* of the remaining amount meter IC 12. The FF 17 outputs a low-level signal from the Q terminal when the signal input to the CLR(‾) terminal becomes a low level. The low-level signal is input to a terminal P10 of the MCU 1, the gate terminal of the switch S6, the enable terminal EN of the step-up DC/DC converter 9, and the base terminal of the bipolar transistor S1 connected to the charging IC 2. When a low-level signal is input to the gate terminal of the switch S6, a gate-source voltage of the N-channel MOSFET constituting the switch S6 becomes lower than a threshold voltage, and thus the switch S6 is turned off. When a low-level signal is input to the enable terminal EN of the step-up DC/DC converter 9, the enable terminal EN of the step-up DC/DC converter 9 is a positive logic, and thus the step-up operation is stopped. When a low-level signal is input to the base terminal of the bipolar transistor S1, the bipolar transistor S1 is turned on (an amplified current is output from the collector terminal). When the bipolar transistor S1 is turned on, a high-level system power supply voltage Vcc2 is input to a CE(‾) terminal of the charging IC 2 via the bipolar transistor S1. Since the CE(‾) terminal of the charging IC 2 is a negative logic, the charging of the power supply BAT is stopped. Accordingly, the heating of the heater HTR and the charging of the power supply BAT are stopped. Even when the MCU 1 outputs a low-level enable signal from the terminal P22 to the charge enable terminal CE(‾) of the charging IC 2, an amplified current is input from the collector terminal to the terminal P22 of the MCU 1 and the charge enable terminal CE(‾) of the charging IC 2 when the bipolar transistor S1 is turned on. Accordingly, it should be noted that a high-level signal is input to the charge enable terminal CE(‾) of the charging IC 2.

A high-level system power supply voltage Vcc2 is supplied from the power supply line PL2 to the D terminal of the FF 17. Therefore, in the FF 17, a high-level signal continues to be output from the Q terminal unless a signal input to the CLR(‾) terminal operating in a negative logic becomes a low level. When a low-level signal is output from the output terminal of the operational amplifier OP3, the low-level signal is input to the CLR(‾) terminal of the FF 17 regardless of the level of the signal output from the output terminal of the operational amplifier OP2. It should be noted that when a high-level signal is output from the output terminal of the operational amplifier OP2, the low-level signal output from the output terminal of the operational amplifier OP3 is not affected by the high-level signal by the diode D1. In addition, when a low-level signal is output from the output terminal of the operational amplifier OP2, even when a high-level signal is output from the output terminal of the operational amplifier OP3, the high-level signal is replaced with a low-level signal via the diode D1.

The power supply line PL2 further branches from the MCU-mounted board 161 toward the LED-mounted board 163 and the Hall IC-mounted board 164. A power supply terminal VDD of the Hall IC 13, a power supply terminal VCC of the communication IC 15, and a power supply terminal VDD of the Hall IC 14 are connected to the power supply line PL2 which branches.

An output terminal OUT of the Hall IC 13 is connected to a terminal P3 of the MCU 1 and a terminal SW2 of the switch driver 7. When the outer panel 115 is detached, a low-level signal is output from the output terminal OUT of the Hall IC 13. The MCU 1 determines whether the outer panel 115 is attached based on the signal input to the terminal P3.

The LED-mounted board 163 is provided with the series circuit (series circuit of a resistor and a capacitor) connected to the operation switch OPS. The series circuit is connected to the power supply line PL2. A connection point between the resistor and the capacitor of the series circuit is connected to the terminal P4 of the MCU 1, the operation switch OPS, and a terminal SW1 of the switch driver 7. In a state where the operation switch OPS is not pressed, the operation switch OPS is not conducted, and the signals input to the terminal P4 of the MCU 1 and the terminal SW1 of the switch driver 7 become a high level by the system power supply voltage Vcc2. When the operation switch OPS is pressed and the operation switch OPS is brought into a conductive state, the signals input to the terminal P4 of the MCU 1 and the terminal SW1 of the switch driver 7 become a low level because of connection to the ground line. The MCU 1 detects the operation of the operation switch OPS based on the signal input to the terminal P4.

The switch driver 7 is provided with a reset input terminal RSTB. The reset input terminal RSTB is connected to the control terminal ON of the LSW 4. When both the levels of the signals input to the terminal SW1 and the terminal SW2 become a low level (a state where the outer panel 115 is detached and the operation switch OPS is pressed), the switch driver 7 outputs a low-level signal from the reset input terminal RSTB, thereby stopping the output operation of the LSW 4. That is, when the operation switch OPS, which is originally pressed down via the pressing portion 117 of the outer panel 115, is directly pressed down by the user in a state where the outer panel 115 is detached, both the levels of the signals input to the terminal SW1 and the terminal SW2 of the switch driver 7 become a low level.

<Operation in Each Operation Mode of Inhaler>

Figure 13:
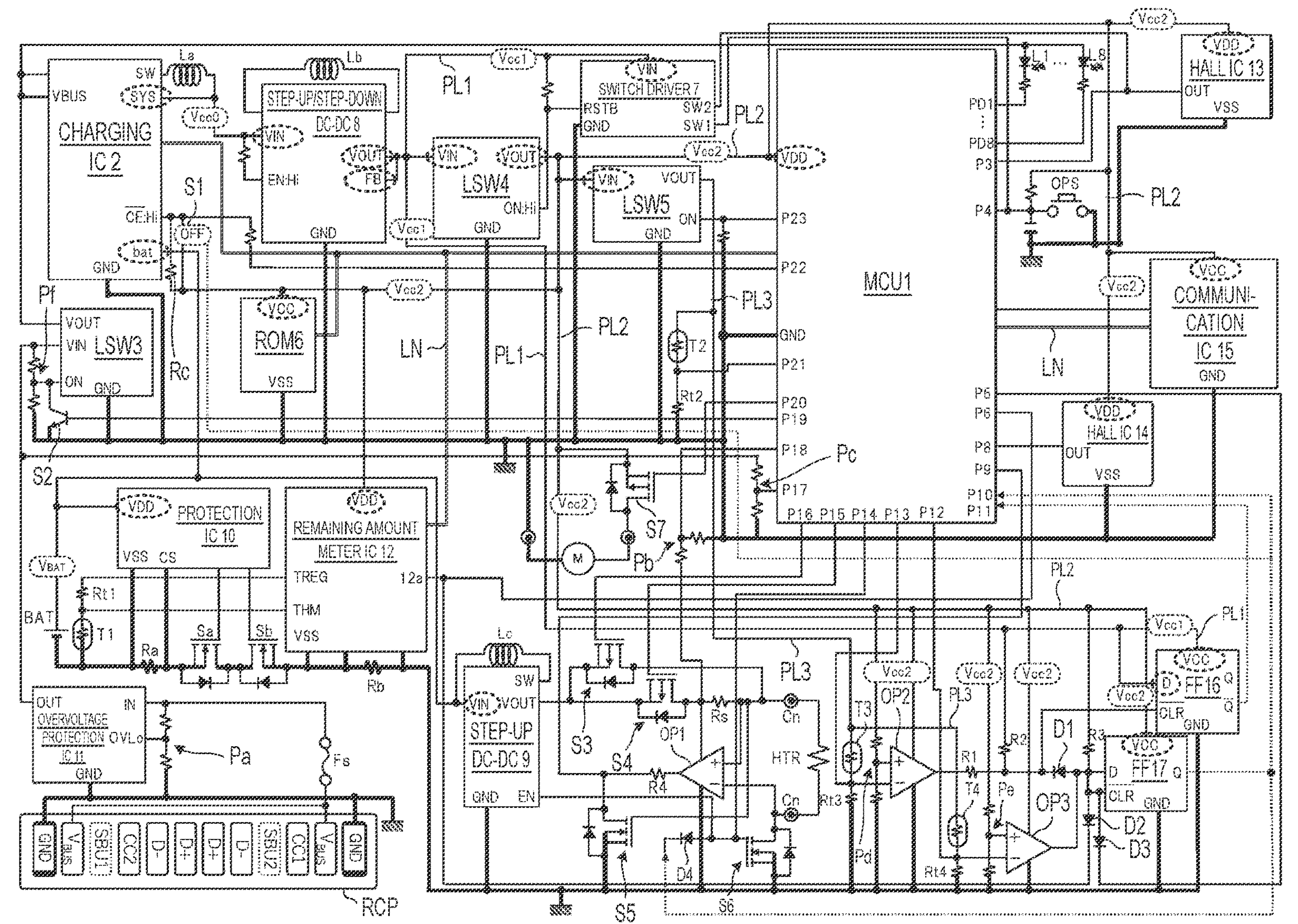
FIG. 13 is a diagram for illustrating an operation of the electric circuit in a sleep mode.
Figure 14:
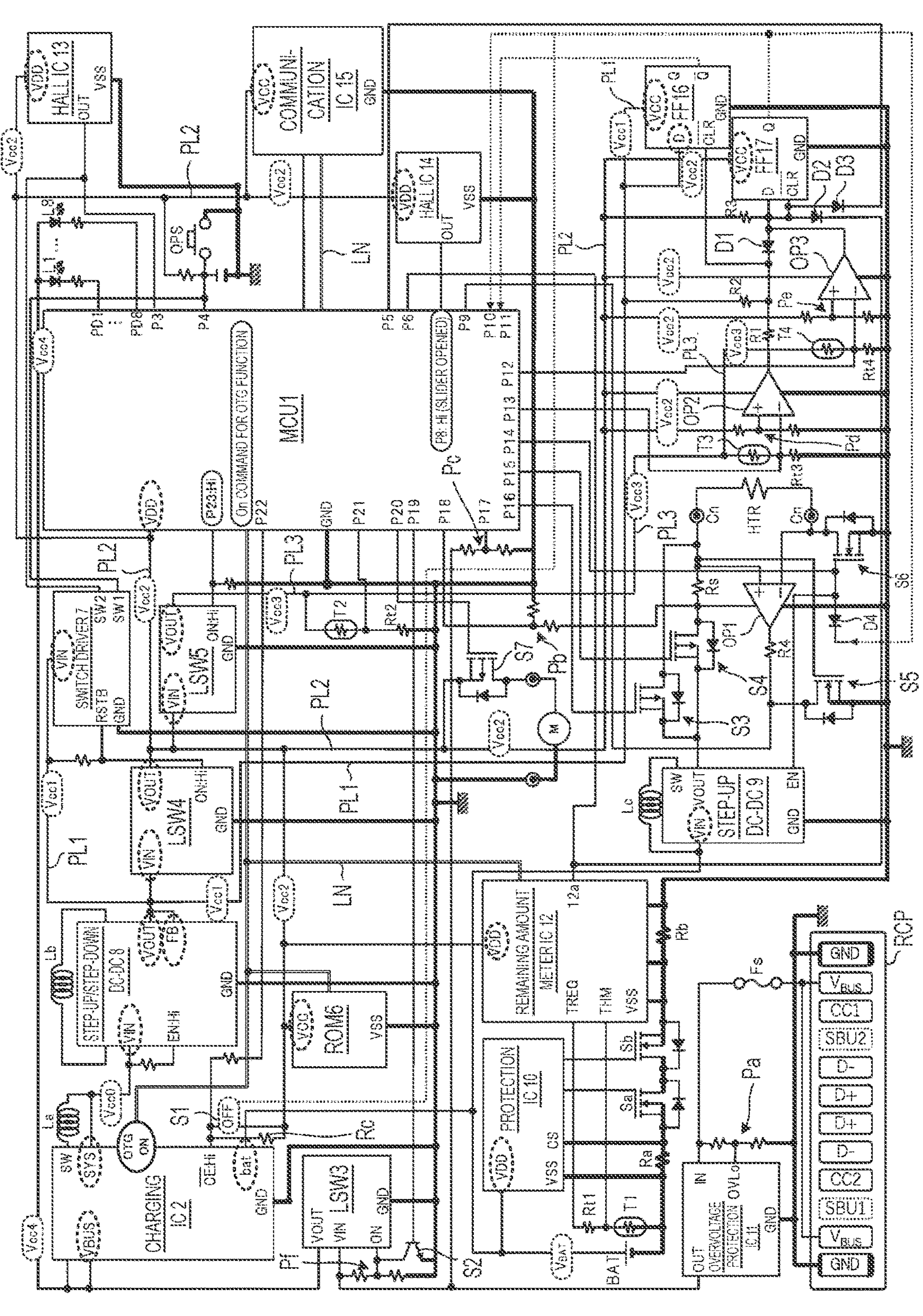
FIG. 14 is a diagram for illustrating an operation of the electric circuit in an active mode.
Figure 15:
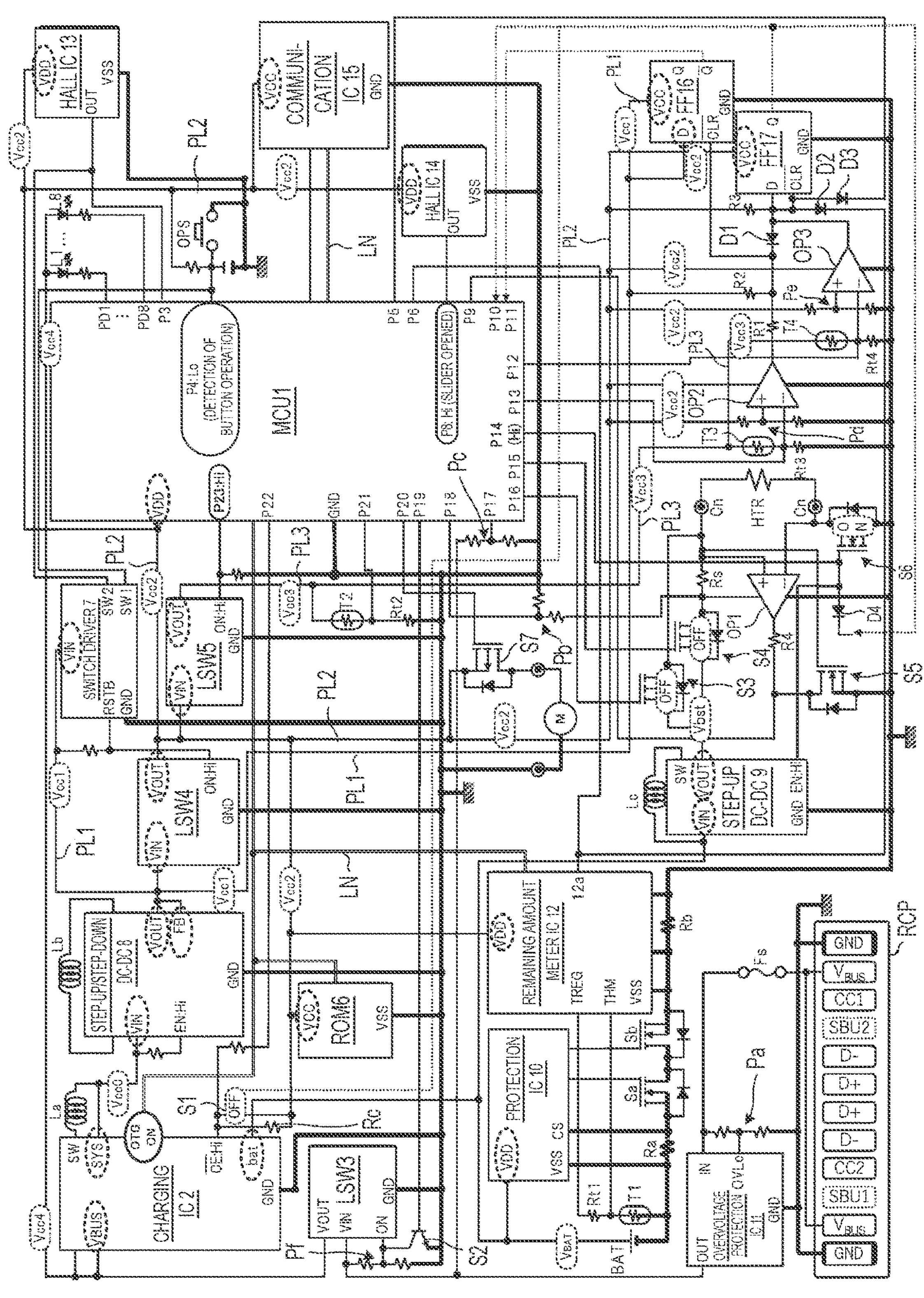
FIG. 15 is a diagram for illustrating an operation of the electric circuit in a heating initial setting mode.
Figure 16:
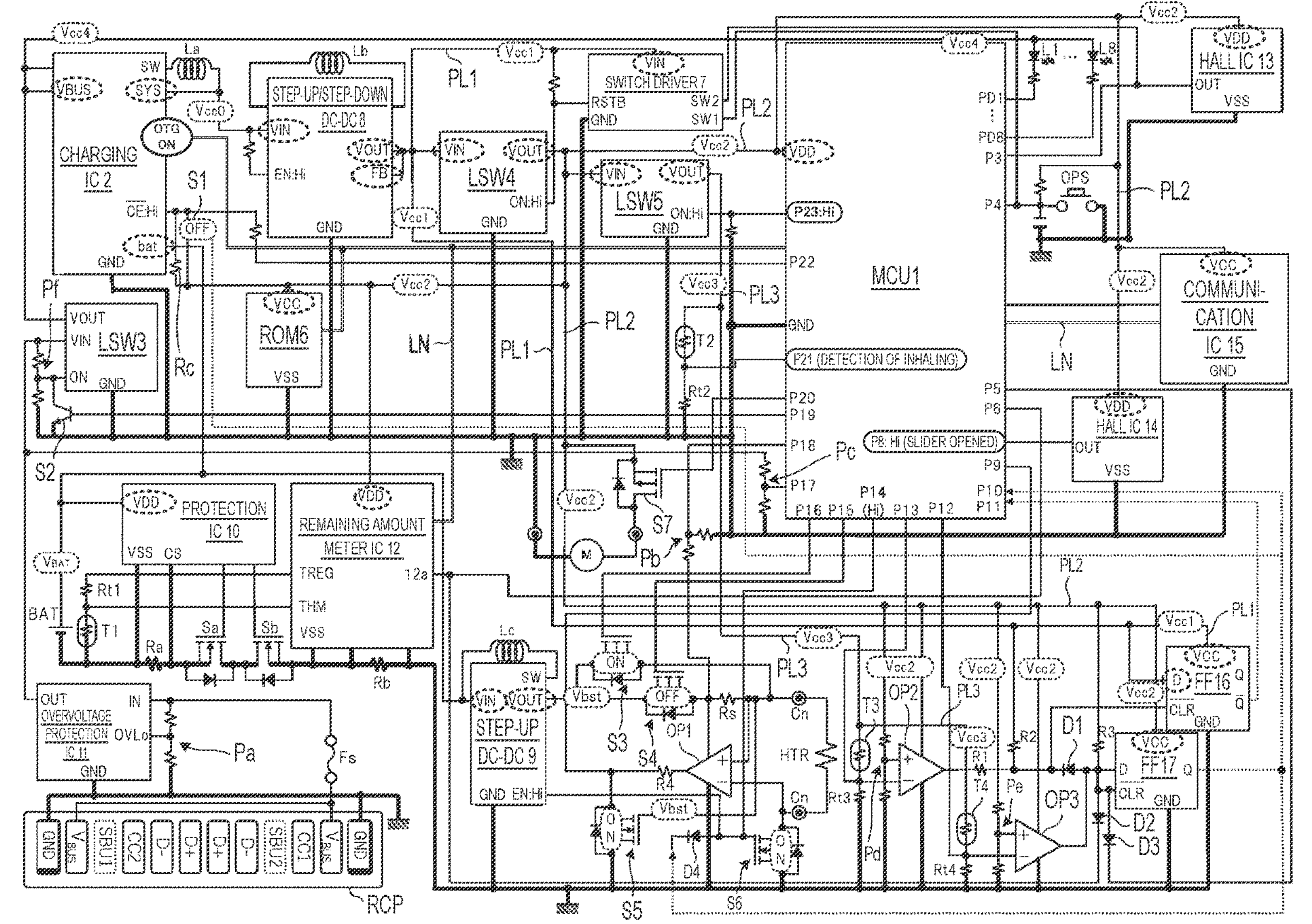
FIG. 16 is a diagram for illustrating an operation of the electric circuit at the time of heating the heater in a heating mode.
Figure 17:
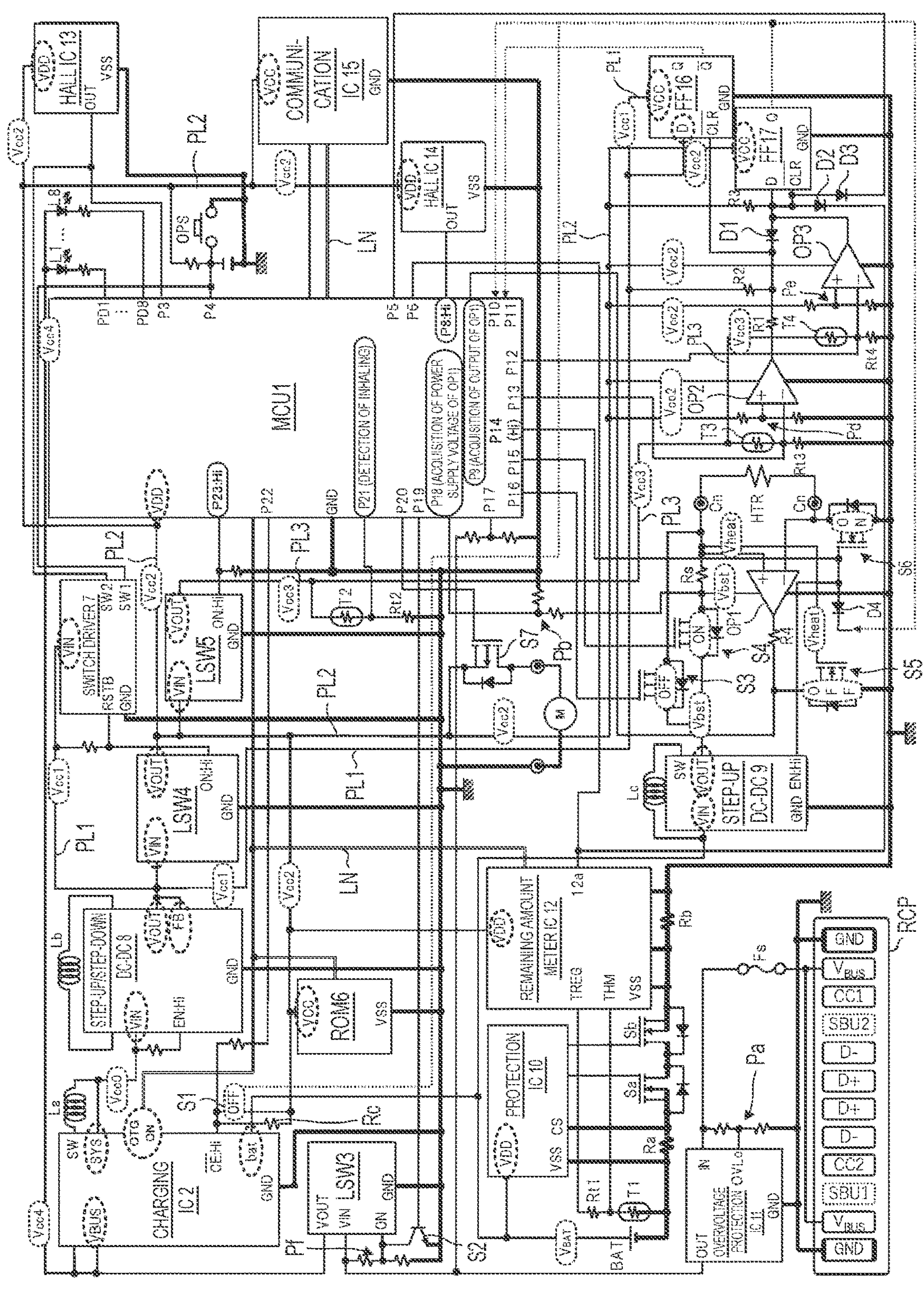
FIG. 17 is a diagram for illustrating an operation of the electric circuit at the time of detecting a temperature of the heater in the heating mode.
Figure 18:
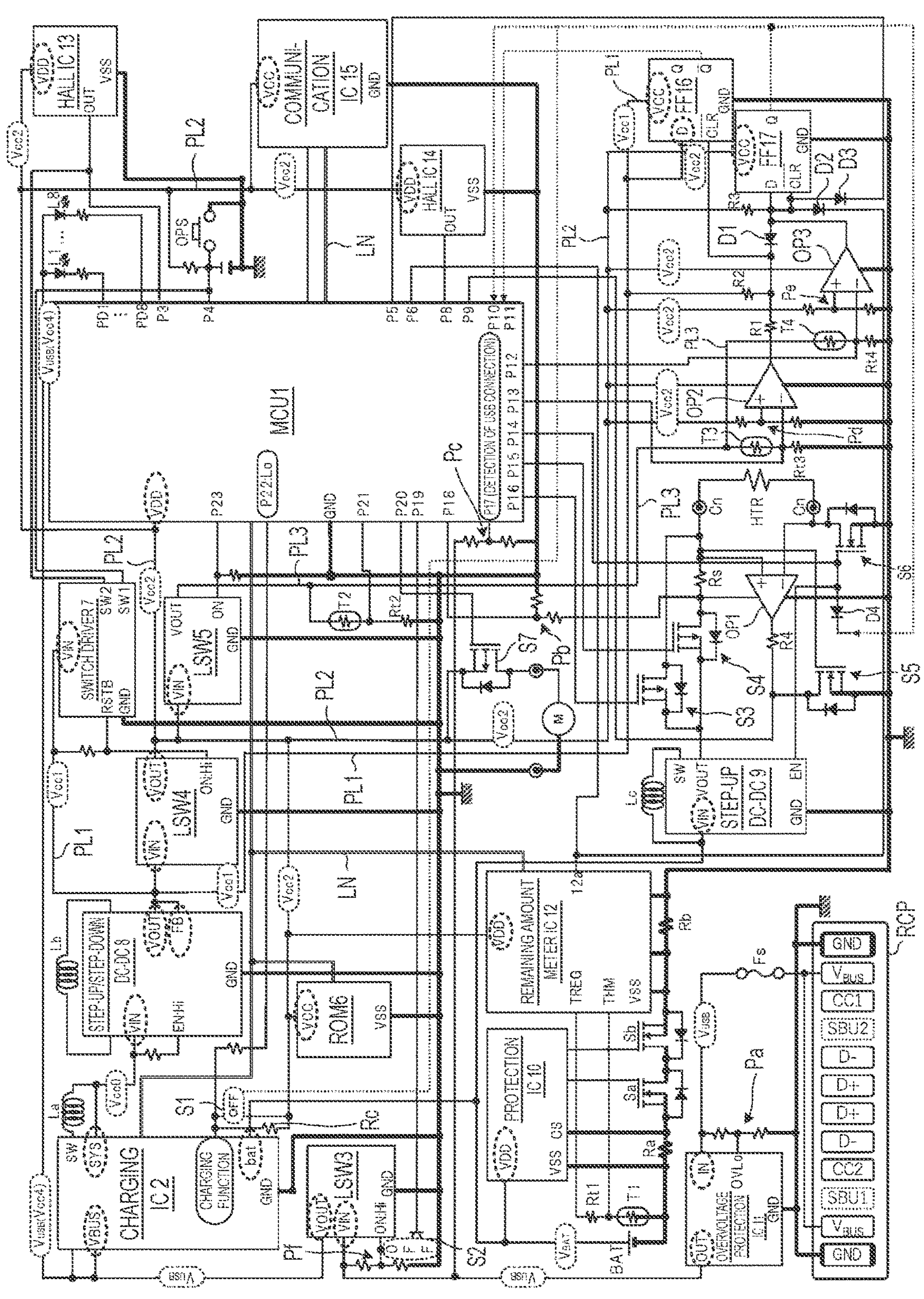
FIG. 18 is a diagram for illustrating an operation of the electric circuit in a charging mode.
Figure 19:
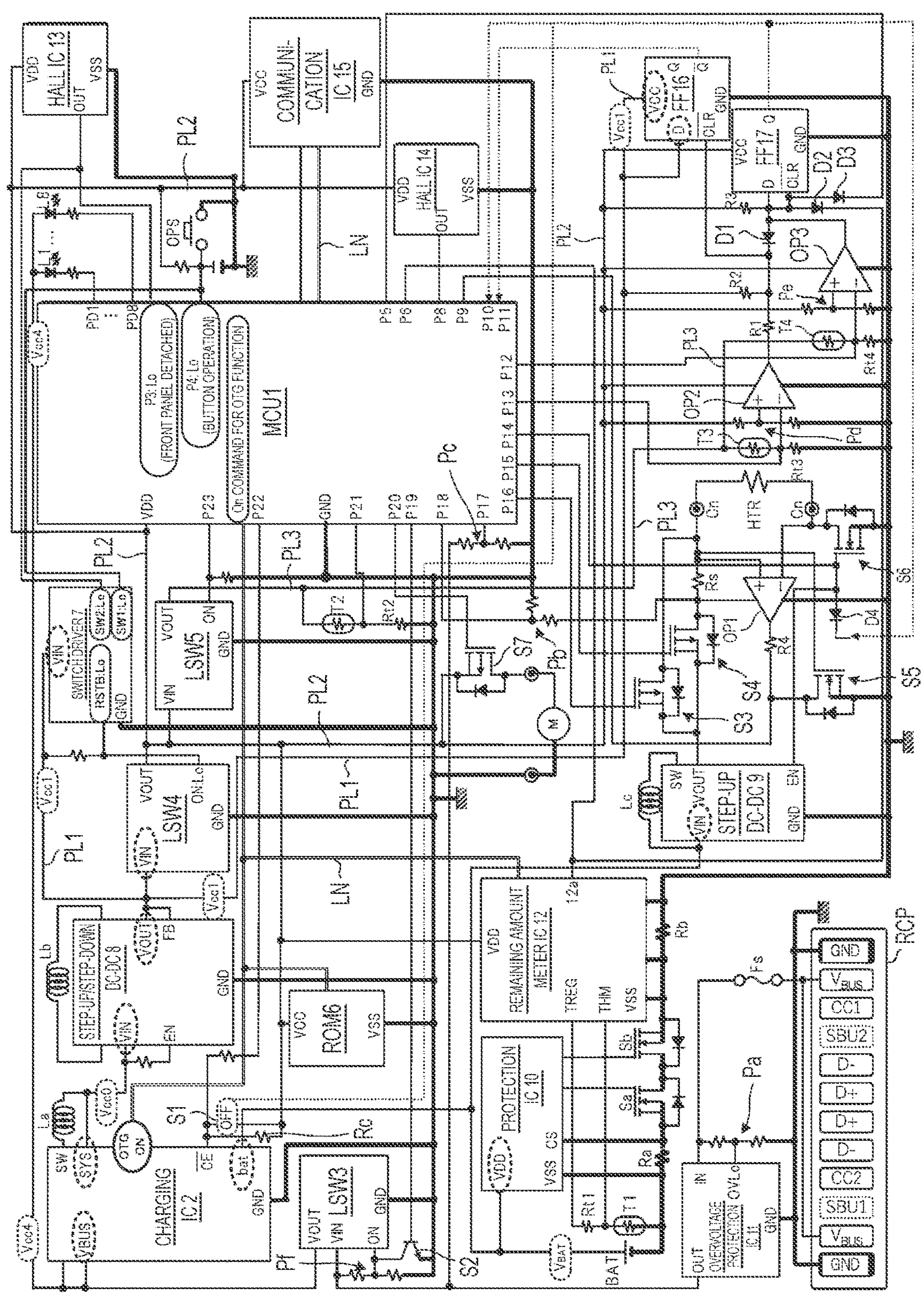
FIG. 19 is a diagram for illustrating an operation of the electric circuit at the time of resetting (restarting) an MCU.

Hereinafter, operations of the electric circuit illustrated in FIG. 10 will be described with reference to FIGS. 13 to 19. FIG. 13 is a diagram for illustrating an operation of the electric circuit in the sleep mode. FIG. 14 is a diagram for illustrating an operation of the electric circuit in the active mode. FIG. 15 is a diagram for illustrating an operation of the electric circuit in the heating initial setting mode. FIG. 16 is a diagram for illustrating an operation of the electric circuit at the time of heating the heater HTR in the heating mode. FIG. 17 is a diagram for illustrating an operation of the electric circuit at the time of detecting the temperature of the heater HTR in the heating mode. FIG. 18 is a diagram for illustrating an operation of the electric circuit in the charging mode. FIG. 19 is a diagram for illustrating an operation of the electric circuit at the time of resetting (restarting) the MCU 1. In each of FIGS. 13 to 19, terminals surrounded by a broken ellipse, among the terminals of the electronic components formed into chips, indicate terminals to which the power supply voltage $V_{BAT}$, the USB voltage $V_{USB}$, the system power supply voltage, and the like are input or output.

In any operation mode, the power supply voltage $V_{BAT}$ is input to the power supply terminal VDD of the protection IC 10, the input terminal VIN of the step-up DC/DC converter 9, and the charging terminal bat of the charging IC 2.

<Sleep Mode: FIG. 13>

The MCU 1 enables the V BAT power path function of the charging IC 2 and disables the OTG function and the charging function. The USB voltage $V_{USB}$ is not input to the input terminal VBUS of the charging IC 2, whereby the $V_{BAT}$ power path function of the charging IC 2 is enabled. Since a signal for enabling the OTG function from the communication line LN is not output from the MCU 1 to the charging IC 2, the OTG function is disabled. Therefore, the charging IC 2 generates the system power supply voltage Vcc0 from the power supply voltage $V_{BAT}$ input to the charging terminal bat, and outputs the system power supply voltage Vcc0 from the output terminal SYS. The system power supply voltage Vcc0 output from the output terminal SYS is input to the input terminal VIN and the enable terminal EN of the step-up/step-down DC/DC converter 8. The step-up/step-down DC/DC converter 8 is enabled by inputting the high-level system power supply voltage Vcc0 to the enable terminal EN which is a positive logic, generates the system power supply voltage Vcc1 from the system power supply voltage Vcc0, and outputs the system power supply voltage Vcc1 from the output terminal VOUT. The system power supply voltage Vcc1 output from the output terminal VOUT of the step-up/step-down DC/DC converter 8 is supplied to the input terminal VIN of the LSW 4, the control terminal ON of the LSW 4, the input terminal VIN of the switch driver 7, and the power supply terminal VCC and the D terminal of the FF 16.

By inputting the system power supply voltage Vcc1 to the control terminal ON, the LSW 4 outputs, from the output terminal VOUT, the system power supply voltage Vcc1 input to the input terminal VIN as the system power supply voltage Vcc2. The system power supply voltage Vcc2 output from the LSW 4 is input to the power supply terminal VDD of the MCU 1, the input terminal VIN of the LSW 5, the power supply terminal VDD of the Hall IC 13, the power supply terminal VCC of the communication IC 15, and the power supply terminal VDD of the Hall IC 14. Further, the system power supply voltage Vcc2 is supplied to the power supply terminal VDD of the remaining amount meter IC 12, the power supply terminal VCC of the ROM 6, the resistor Rc and the bipolar transistor S1 connected to the charge enable terminal CE(‾) of the charging IC 2, the power supply terminal VCC of the FF 17, the positive power supply terminal of the operational amplifier OP3, the voltage divider circuit Pe, the positive power supply terminal of the operational amplifier OP2, and the voltage divider circuit Pd. The bipolar transistor S1 connected to the charging IC 2 is turned off unless a low-level signal is output from the Q terminal of the FF 17. Therefore, the system power supply voltage Vcc2 generated by the LSW 4 is also input to the charge enable terminal CE(‾) of the charging IC 2. Since the charge enable terminal CE(‾) of the charging IC 2 is a negative logic, the charging function by the charging IC 2 is turned off in this state.

In this manner, since the LSW 5 stops outputting the system power supply voltage Vcc3 in the sleep mode, the supply of power to the electronic components connected to the power supply line PL3 is stopped. In addition, since the OTG function of the charging IC 2 is stopped in the sleep mode, the supply of power to the LEDs L1 to L8 is stopped.

<Active Mode: FIG. 14>

When the MCU 1 detects that the signal input to the terminal P8 becomes a high level and the slider 119 is opened from the sleep mode state in FIG. 13, the MCU 1 inputs a high-level signal to the control terminal ON of the LSW 5 from the terminal P23. Accordingly, the LSW 5 outputs, from the output terminal VOUT, the system power supply voltage Vcc2 input to the input terminal VIN as the system power supply voltage Vcc3. The system power supply voltage Vcc3 output from the output terminal VOUT of the LSW 5 is supplied to the thermistor T2, the thermistor T3, and the thermistor T4.

Further, when the MCU 1 detects that the slider 119 is opened, the MCU 1 enables the OTG function of the charging IC 2 via the communication line LN. Accordingly, the charging IC 2 outputs, from the input terminal VBUS, the system power supply voltage Vcc4 obtained by stepping up the power supply voltage $V_{BAT}$ input from the charging terminal bat.

The system power supply voltage Vcc4 output from the input terminal VBUS is supplied to the LEDs L1 to L8.

<Heating Initial Setting Mode: FIG. 15>

When the signal input to the terminal P4 becomes a low level (the operation switch OPS is pressed) from the state in FIG. 14, the MCU 1 performs various settings necessary for heating, and then inputs a high-level enable signal from the terminal P14 to the enable terminal EN of the step-up DC/DC converter 9. Accordingly, the step-up DC/DC converter 9 outputs, from the output terminal VOUT, the drive voltage $V_{bst}$ obtained by stepping up the power supply voltage $V_{BAT}$. The drive voltage $V_{bst}$ is supplied to the switch S3 and the switch S4. In this state, the switch S3 and the switch S4 are turned off. In addition, the switch S6 is turned on by a high-level enable signal output from the terminal P14. Accordingly, a negative electrode-side terminal of the heater HTR is connected to the ground line, and the heater HTR is brought into a state of being heated by turning on the switch S3. After the enable signal of the high-level signal is output from the terminal P14 of the MCU 1, the operation mode shifts to the heating mode.

<Heater Heating in Heating Mode: FIG. 16>

In the state of FIG. 15, the MCU 1 starts switching control of the switch S3 connected to the terminal P16 and switching control of the switch S4 connected to the terminal P15. The switching control may be automatically started when the heating initial setting mode described above is completed, or may be started by further pressing the operation switch OPS. Specifically, the MCU 1 performs, as illustrated in FIG. 16, heating control in which the switch S3 is turned on, the switch S4 is turned off, the drive voltage $V_{bst}$ is supplied to the heater HTR, and the heater HTR is heated for generating aerosol, and performs, as illustrated in FIG. 17, temperature detection control in which the switch S3 is turned off, the switch S4 is turned on, and the temperature of the heater HTR is detected.

As illustrated in FIG. 16, during the heating control, the drive voltage $V_{bst}$ is also supplied to a gate of the switch S5, and the switch S5 is turned on. In addition, during the heating control, the drive voltage $V_{bst}$ passing through the switch S3 is also input to the positive power supply terminal of the operational amplifier OP1 via the resistor Rs. A resistance value of the resistor Rs is small enough to be negligible as compared with an internal resistance value of the operational amplifier OP1. Therefore, during the heating control, the voltage input to the positive power supply terminal of the operational amplifier OP1 is substantially equal to the drive voltage $V_{bst}$.

A resistance value of the resistor R4 is larger than an on-resistance value of the switch S5. The operational amplifier OP1 also operates during the heating control, but the switch S5 is turned on during the heating control. In a state where the switch S5 is turned on, the output voltage of the operational amplifier OP1 is divided by a voltage divider circuit of the resistor R4 and the switch S5 and is input to the terminal P9 of the MCU 1. The resistance value of the resistor R4 is larger than the on-resistance value of the switch S5, whereby the voltage input to the terminal P9 of the MCU 1 becomes sufficiently small. Accordingly, it is possible to prevent a large voltage from being input from the operational amplifier OP1 to the MCU 1.

<Heater Temperature Detection in Heating Mode: FIG. 17>

As illustrated in FIG. 17, during the temperature detection control, the drive voltage $V_{bst}$ is input to the positive power supply terminal of the operational amplifier OP1 and is input to the voltage divider circuit Pb. The voltage divided by the voltage divider circuit Pb is input to the terminal P18 of the MCU 1. The MCU 1 acquires a reference voltage $V_{temp}$ applied to a series circuit of the resistor Rs and the heater HTR during the temperature detection control based on the voltage input to the terminal P18.

In addition, during the temperature detection control, the drive voltage $V_{bst}$ (reference voltage $V_{temp}$) is supplied to the series circuit of the resistor Rs and the heater HTR. Further, a voltage $V_{heat}$ obtained by dividing the drive voltage $V_{bst}$ (reference voltage $V_{temp}$) by the resistor Rs and the heater HTR is input to the non-inverting input terminal of the operational amplifier OP1. Since the resistance value of the resistor Rs is sufficiently larger than a resistance value of the heater HTR, the voltage $V_{heat}$ is a value sufficiently lower than the drive voltage $V_{bst}$. During the temperature detection control, the low voltage $V_{heat}$ is also supplied to the gate terminal of the switch S5, whereby the switch S5 is turned off. The operational amplifier OP1 amplifies a difference between the voltage input to the inverting input terminal and the voltage $V_{heat}$ input to the non-inverting input terminal and outputs the amplified difference.

An output signal of the operational amplifier OP1 is input to the terminal P9 of the MCU 1. The MCU 1 acquires the temperature of the heater HTR based on the signal input to the terminal P9, the reference voltage $V_{temp}$ acquired based on the input voltage of the terminal P18, and a known electric resistance value of the resistor Rs. The MCU 1 performs the heating control of the heater HTR (for example, control such that the temperature of the heater HTR becomes a target temperature) based on the acquired temperature of the heater HTR.

The MCU 1 can also acquire the temperature of the heater HTR even in a period in which the switch S3 and the switch S4 are turned off (a period in which the heater HTR is not energized). Specifically, the MCU 1 acquires the temperature of the heater HTR based on the voltage input to the terminal P13 (output voltage of the voltage divider circuit including the thermistor T3 and the resistor Rt3).

In addition, the MCU 1 may also acquire the temperature of the case 110 at any timing. Specifically, the MCU 1 acquires the temperature of the case 110 based on the voltage input to the terminal P12 (output voltage of the voltage divider circuit including the thermistor T4 and the resistor Rt4).

<Charging Mode: FIG. 18>

FIG. 18 illustrates a case where the USB connection is established in the sleep mode. When the USB connection is established, the USB voltage $V_{USB}$ is input to the input terminal VIN of the LSW 3 via the overvoltage protection IC 11. The USB voltage $V_{USB}$ is also supplied to the voltage divider circuit Pf connected to the input terminal VIN of the LSW 3. Since the bipolar transistor S2 is turned on immediately after the USB connection is established, the signal input to the control terminal ON of the LSW 3 remains at a low level. The USB voltage $V_{USB}$ is also supplied to the voltage divider circuit Pc connected to the terminal P17 of the MCU 1, and a voltage divided by the voltage divider circuit Pc is input to the terminal P17. The MCU 1 detects that the USB connection is established based on the voltage input to the terminal P17.

When the MCU 1 detects that the USB connection is established, the MCU 1 turns off the bipolar transistor S2 connected to the terminal P19. When a low-level signal is input to a gate terminal of the bipolar transistor S2, the USB voltage $V_{USB}$ divided by the voltage divider circuit Pf is input to the control terminal ON of the LSW 3. Accordingly, a high-level signal is input to the control terminal ON of the LSW 3, and the LSW 3 outputs the USB voltage $V_{USB}$ from the output terminal VOUT. The USB voltage $V_{USB}$ output from the LSW 3 is input to the input terminal VBUS of the charging IC 2. In addition, the USB voltage $V_{USB}$ output from the LSW 3 is supplied to the LEDs L1 to L8 as the system power supply voltage Vcc4.

When the MCU 1 detects that the USB connection is established, the MCU 1 further outputs a low-level enable signal from the terminal P22 to the charge enable terminal CE(‾) of the charging IC 2. Accordingly, the charging IC 2 enables the charging function of the power supply BAT and starts charging the power supply BAT by the USB voltage $V_{USB}$ input to the input terminal VBUS.

In a case where the USB connection is established in the active mode, when the MCU 1 detects that the USB connection is established, the MCU 1 turns off the bipolar transistor S2 connected to the terminal P19, outputs a low-level enable signal from the terminal P22 to the charge enable terminal CE(‾) of the charging IC 2, and turns off the OTG function of the charging IC 2 by serial communication using the communication line LN. Accordingly, the system power supply voltage Vcc4 supplied to the LEDs L1 to L8 is switched from the voltage generated by the OTG function of the charging IC 2 (voltage based on the power supply voltage $V_{BAT}$) to the USB voltage $V_{USB}$ output from the LSW 3. The LEDs L1 to L8 are not operated unless ON control of the built-in transistor is not performed by the MCU 1. Therefore, the unstable voltage in a transition period from ON to OFF of the OTG function is prevented from being supplied to the LEDs L1 to L8.

<Resetting of MCU: FIG. 19>

When the outer panel 115 is detached, the output of the Hall IC 13 becomes a low level, an ON operation of the operation switch OPS is performed, and the signal input to the terminal P4 of the MCU 1 becomes a low level, the terminal SW1 and the terminal SW2 of the switch driver 7 both become a low level. Accordingly, the switch driver 7 outputs a low-level signal from the reset input terminal RSTB. The low-level signal output from the reset input terminal RSTB is input to the control terminal ON of the LSW 4. Accordingly, the LSW 4 stops the output of the system power supply voltage Vcc2 from the output terminal VOUT. By stopping the output of the system power supply voltage Vcc2, the system power supply voltage Vcc2 is not input to the power supply terminal VDD of the MCU 1, and thus the MCU 1 is stopped.

The switch driver 7 returns the signal output from the reset input terminal RSTB to a high level when a time during which the low-level signal is output from the reset input terminal RSTB reaches a predetermined time or when the signal input to either the terminal SW1 or the terminal SW2 becomes a high level. Accordingly, the control terminal ON of the LSW 4 becomes a high level, and the system power supply voltage Vcc2 returns to a state of being supplied to each unit.

<Details of Heating Control and Temperature Detection Control>

Figure 20:
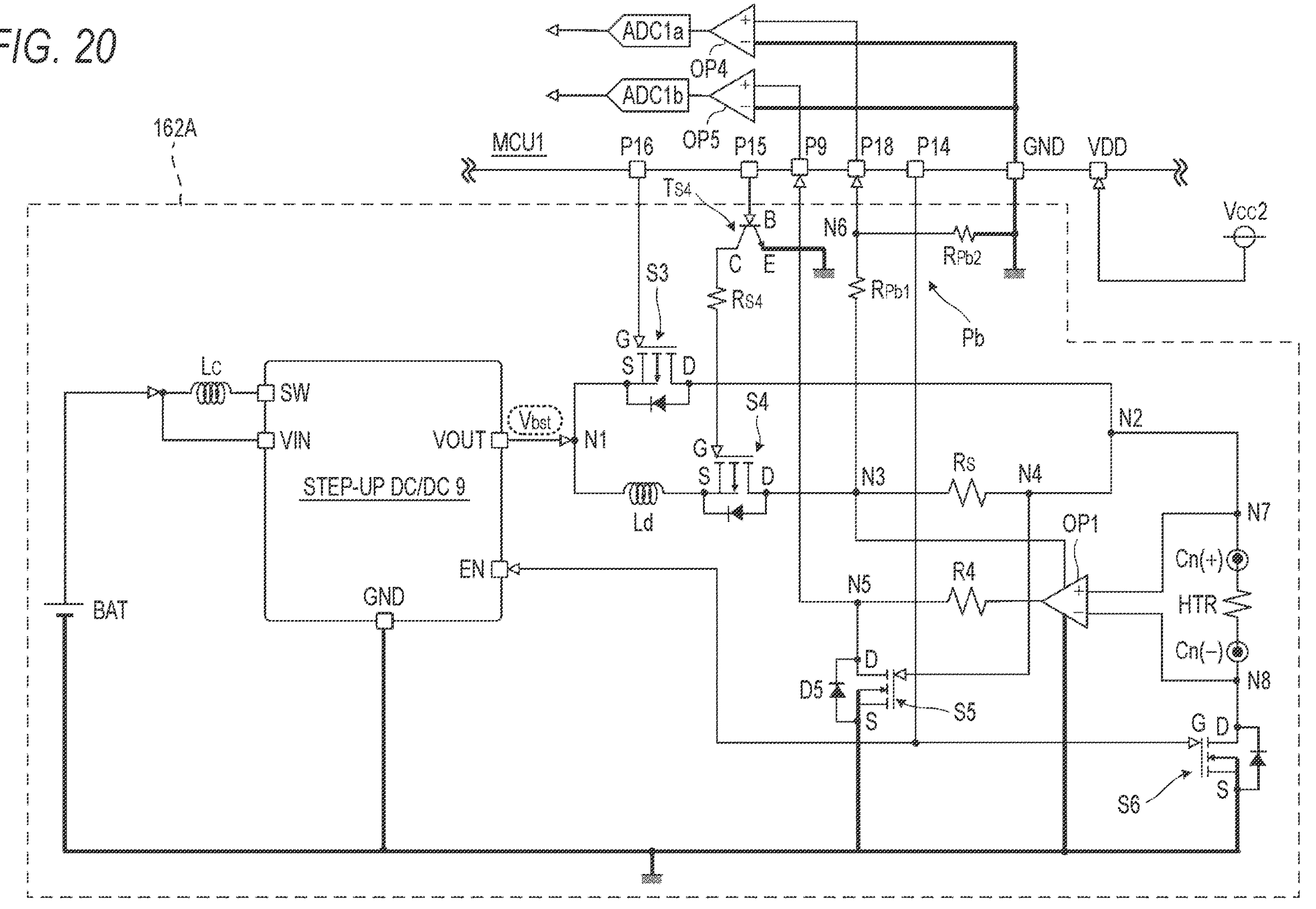
FIG. 20 is a circuit diagram of essential parts illustrating main electronic components used for heating and detecting the temperature of the heater in the electric circuit illustrated in FIG. 10.

FIG. 20 is a circuit diagram of essential parts illustrating main electronic components used for heating and temperature detection of the heater HTR in the electric circuit illustrated in FIG. 10. FIG. 20 illustrates, as electronic components and nodes that are not illustrated in FIG. 10, a reactor Ld, a resistor $R_{S4}$, a npn-type bipolar transistor $T_{S4}$, a resistor $R_{Pb1}$ and a resistor $R_{Pb2}$ constituting the voltage divider circuit Pb, a parasitic diode D5 of the switch S5, nodes N1 to N8, and an operational amplifier OP4, an operational amplifier OP5, an analog-to-digital converter (ADC) 1*a*, and an ADC 1*b*, which are built in the MCU 1. The various resistors (resistor $R_{S4}$, resistor Rs, resistor $R_{Pb1}$, resistor $R_{Pb2}$, and resistor R4) illustrated in FIG. 20 are fixed resistors having predetermined resistance values.

One end of the resistor $R_{S4}$ is connected to the gate terminal of the switch S4. The other end of the resistor $R_{S4}$ is connected to a collector terminal of the bipolar transistor $T_{S4}$. An emitter terminal of the bipolar transistor $T_{S4}$ is connected to the ground. A base terminal of the bipolar transistor $T_{S4}$ is connected to the terminal P15 of the MCU 1.

The reactor Ld is provided to reduce noise of the drive voltage $V_{bst}$ output from the step-up DC/DC converter 9. The reactor Ld is connected between the source terminal of the switch S4 and the output terminal VOUT of the step-up DC/DC converter 9. In addition to the reactor Ld, another first reactor for noise reduction may be provided between the switch S4 and the resistor Rs, and another second reactor for noise reduction may be provided between the resistor Rs and a heater connector Cn (+) on the positive electrode side. Any one of the reactor Ld, the first reactor, and the second reactor may be omitted, or any two of them may be omitted. In addition, these reactors for noise reduction are not essential and may be omitted.

The node N1 connects the source terminal of the switch S3 and one end of the reactor Ld. The node N1 is connected to the output terminal VOUT of the step-up DC/DC converter 9.

The node N7 connects the heater connector Cn (+) on the positive electrode side (positive electrode) and the non-inverting input terminal of the operational amplifier OP1.

The node N2 connects the drain terminal of the switch S3 and the node N7.

The node N4 connects the node N2 and the resistor Rs. The node N4 is connected to the gate terminal of the switch S5.

The node N5 connects an end at a side of the resistor R4 opposite to an operational amplifier OP1 side and the drain terminal of the switch S5. The node N5 is connected to the terminal P9 of the MCU 1.

The node N3 connects the drain terminal of the switch S4 and an end of the resistor Rs opposite to a node N4 side. The node N3 is connected to the positive power supply terminal of the operational amplifier OP1 and one end of the resistor $R_{Pb1}$.

The node N6 connects the other end of the resistor $R_{Pb1}$ and one end of the resistor $R_{Pb2}$. The node N6 is connected to the terminal P18 of the MCU 1. The other end of the resistor $R_{Pb2}$ is connected to the ground.

The node N8 connects a heater connector Cn (−) on a negative electrode side (negative electrode) and the drain terminal of the switch S6. The node N8 is connected to the inverting input terminal of the operational amplifier OP1.

The parasitic diode D5 has an anode connected to the source terminal of the switch S5 and a cathode connected to the drain terminal of the switch S5.

In the circuit illustrated in FIG. 20, a flow when the switch S4 is turned on is as follows. First, in a state where the drive voltage $V_{bst}$ is output from the output terminal VOUT of the step-up DC/DC converter 9, the MCU 1 turns on the bipolar transistor $T_{S4}$ (an amplified current is output from the emitter terminal of the bipolar transistor $T_{S4}$). Accordingly, the gate terminal of the switch S4 is connected to the ground via the resistor $R_{S4}$, the collector terminal of the bipolar transistor $T_{S4}$, and the emitter terminal of the bipolar transistor $T_{S4}$. As a result, a gate voltage of the switch S4 becomes a value close to the ground potential (0 V in the present embodiment), an absolute value of a gate-source voltage of the switch S4 becomes larger than an absolute value of a threshold voltage of the switch S4, and the switch S4 is turned on. When the bipolar transistor $T_{S4}$ is turned off, the absolute value of the gate-source voltage of the switch S4 becomes equal to or lower than the absolute value of the threshold voltage of the switch S4, and thus the switch S4 is turned off.

The gate-source voltage refers to a voltage applied between the gate terminal and the source terminal. Since the switch S4 in the present embodiment is a P-channel MOSFET, a gate-source voltage having a negative value is required when the switch S4 is turned on. In other words, the switch S4 is turned on when a potential of the source terminal becomes lower than the threshold voltage from a potential of the gate terminal. For example, when the threshold voltage of the switch S4 is −4.5 V, the gate-source voltage becomes −4.9 V when the source potential is 4.9 V and the gate potential is 0 V. Since −4.9 V is lower than −4.5 V which s the threshold voltage, the switch S4 is turned on. On the other hand, when the source potential is 4.9 V and the gate potential is 3.3 V, the gate-source voltage becomes −1.6 V. Since −1.6 V is higher than −4.5 V which is the threshold voltage, the switch S4 is turned off.

In the present description, in order to facilitate understanding, the gate-source voltage and the threshold voltage of the P-channel MOSFET will be described as absolute values that disregard positive and negative signs.

The system power supply voltage Vcc2 (power supply voltage of the MCU 1 input to the power supply terminal VDD of the MCU 1) and the drive voltage $V_{bst}$ described above are preferably the following values.

System power supply voltage Vcc2=3.3 V

Drive voltage $V_{bst}$=4.9 V

Next, the heating control of the heater HTR and the temperature detection control of the heater HTR will be described with reference to FIGS. 21 to 24.

Figure 21:
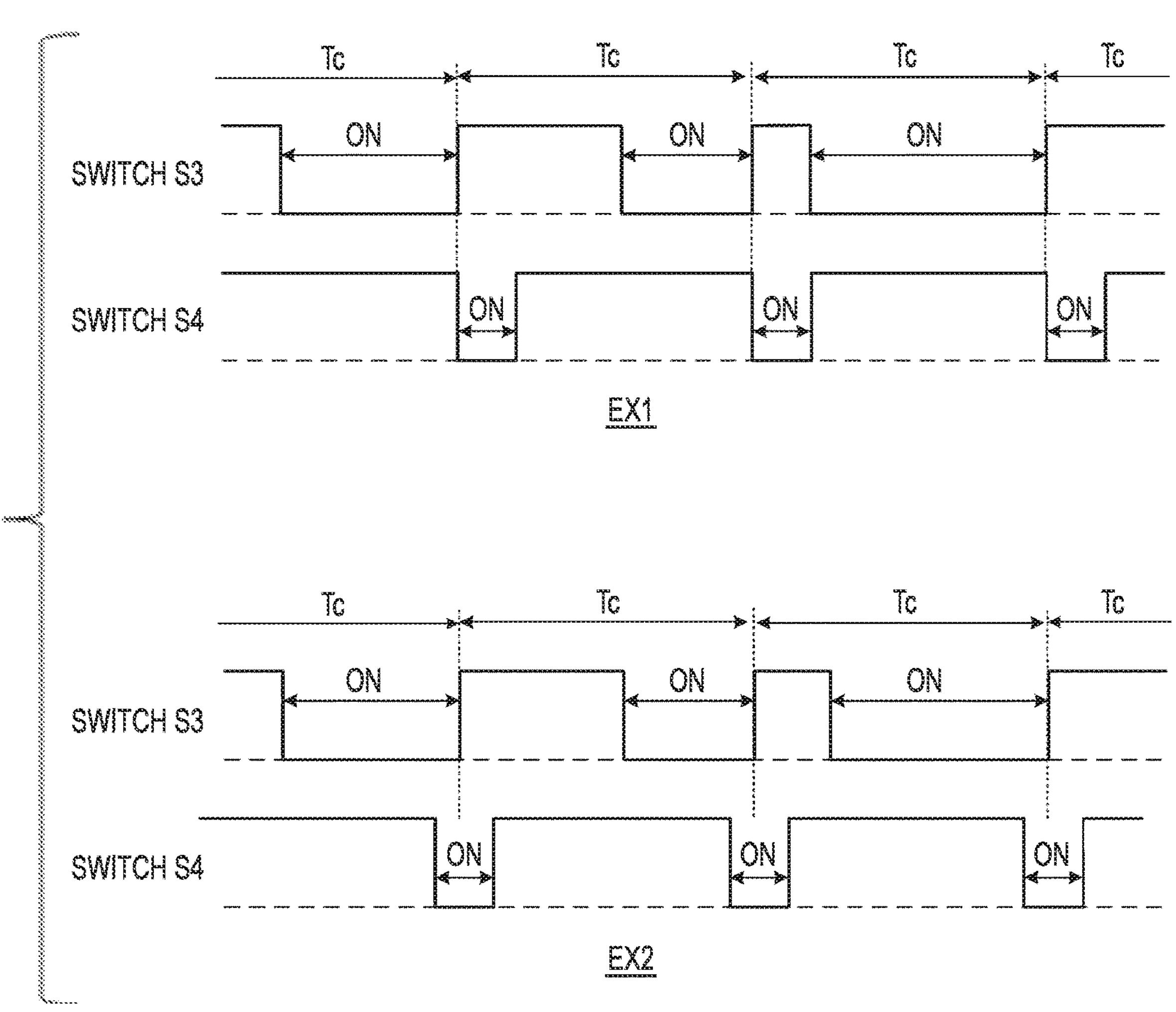
FIG. 21 is a diagram illustrating an example of changes in voltages input to gate terminals of a switch S3 and a switch S4in the heating mode.

FIG. 21 is a diagram illustrating examples of a change in the voltage input to the gate terminals of the switch S3 and the switch S4 in the heating mode. In the present embodiment, since the switch S3 and the switch S4 are P-channel MOSFETs, it should be noted that the switch S3 and the switch S4 are turned on when the voltage input to the gate terminal is at a low level. FIG. 21 illustrates a driving example EX1 and a driving example EX2. In the driving example EX1 in FIG. 21, the MCU 1 alternately turns on and off the switch S3 and the switch S4. That is, in the driving example EX1, the MCU 1 turns off the switch S4 while the switch S3 is turned on, and turns on the switch S4 while the switch S3 is turned off. In other words, in the driving example EX1, a period in which the voltage input to the gate terminal of the switch S3 is at a low level does not overlap with a period in which the voltage input to the gate terminal of the switch S4 is at a low level. The driving example EX2 is different from the driving example EX1 in that a period in which the switch S3 is turned on and a period in which the switch S4 is turned on partially overlap with each other. In other words, in the driving example EX2, a period in which the voltage input to the gate terminal of the switch S3 is at a low level overlaps with a period in which the voltage input to the gate terminal of the switch S4 is at a low level.

FIG. 21 illustrates a control cycle Tc of the MCU 1. In the control cycle Tc, the MCU 1 keeps the time during which the switch S4 is turned on constant and controls the time during which the switch S3 is turned on. That is, the MCU 1 supplies power to the heater HTR by pulse width modulation (PWM) control during heating control. In this control cycle Tc, a time excluding a certain time during which the switch S4 is turned on is the maximum value of a time during which the switch S3 is turned on. The certain time during which the switch S4 is turned on is sufficiently shorter than the maximum value of the time during which the switch S3 is turned on, and is, for example, equal to or shorter than one tenth of the maximum value. In the control cycle Tc, the switch S3 may be turned on a plurality of times. In this case, when a duty ratio calculated by the PWM control is less than 100%, the switch S3 is intermittently turned on in the time excluding the certain time during which the switch S4 is turned on in the control cycle Tc.

In the driving example EX1, the MCU 1 performs control such that the switch S4 is switched from OFF to ON at a timing when the switch S3 is switched from ON to OFF. That is, the MCU 1 changes the ON time of the switch S3 by fixing a timing of turning off the switch S3 and controlling a timing of turning on the switch S3. The MCU 1 may supply power to the heater HTR by pulse frequency modulation (PFM) control.

Figure 22:
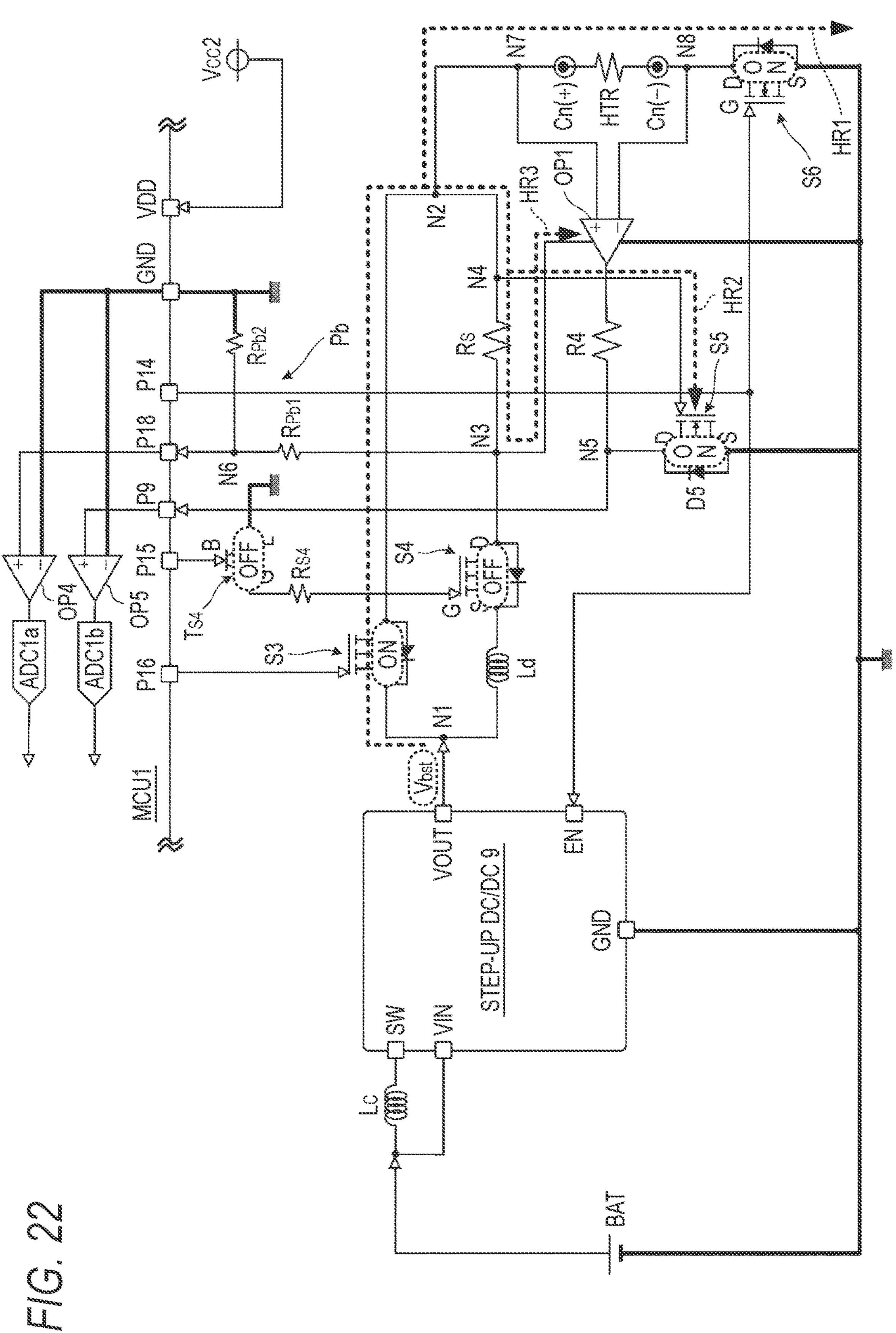
FIG. 22 is a diagram illustrating a flow of a current during heating control in the heating mode.

FIG. 22 is a diagram illustrating a flow of a current during heating control in the heating mode. During the heating control, the switch S3 is turned on and the switch S4 is turned off. In this state, a first heating discharge path HR1 through which a current flows in the order of the node N1, the switch S3, the node N2, the node N7, the heater HTR, the node N8, the switch S6, and the ground, a second heating discharge path HR2 through which a current flows in the order of the node N1, the switch S3, the node N2, the node N4, and the gate terminal of the switch S5, and a third heating discharge path HR3 through which a current flows in the order of the node N1, the switch S3, the node N2, the node N4, the resistor Rs, the node N3, and the positive power supply terminal of the operational amplifier OP1 are formed.

Due to the presence of the third heating discharge path HR3, a voltage lower than the drive voltage $V_{bst}$ (voltage stepped down by the resistor Rs of the drive voltage $V_{bst}$) is supplied to the positive power supply terminal of the operational amplifier OP1, and the operational amplifier OP1 can operate. That is, during the heating control, the voltage applied between the positive power supply terminal and the negative power supply terminal of the operational amplifier OP1 is a value lower than the drive voltage $V_{bst}$ (however, a value higher than the system power supply voltage Vcc2 which is the power supply voltage of the MCU 1) due to the presence of the third heating discharge path HR3. In this state, when a differential input value of the operational amplifier OP1 becomes higher than the drive voltage $V_{bst}$, the output voltage of the operational amplifier OP1 sticks to the voltage applied to the positive power supply terminal of the operational amplifier OP1. Since this voltage is higher than the power supply voltage of the MCU 1, the MCU 1 may not operate normally when this voltage is input to the MCU 1. Therefore, the switch S5 is turned on due to the presence of the second heating discharge path HR2. Accordingly, the output voltage of the operational amplifier OP1 is divided by the resistor R4 and the on-resistance of the switch S5 and is input to the terminal P9 of the MCU 1. The on-resistance value of the switch S5 is sufficiently smaller than the resistance value of the resistor R4. Therefore, the voltage value divided by the resistor R4 and the switch S5 is minute. Therefore, the switch S5 can be regarded as clamping the output voltage of the operational amplifier OP1 to the ground level by being turned on.

Figure 23:
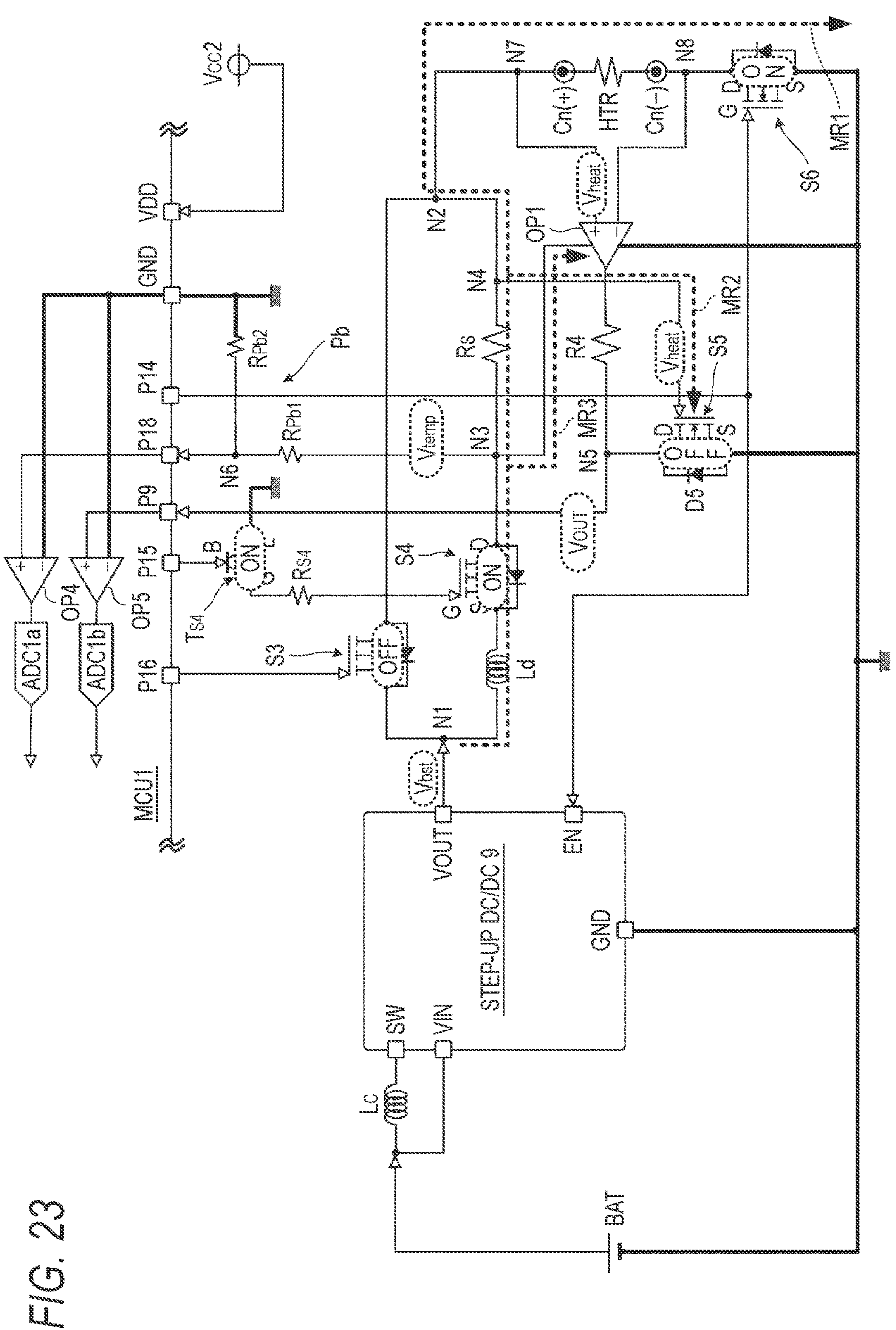
FIG. 23 is a diagram illustrating a flow of a current during temperature detection control in the heating mode.

FIG. 23 is a diagram illustrating a flow of a current during temperature detection control in the heating mode. During the temperature detection control, the switch S3 is turned off and the switch S4 is turned on. In this state, a first detecting discharge path MR1 through which a current flows in the order of the node N1, the reactor Ld, the switch S4, the resistor Rs, the node N2, the node N7, the heater HTR, the node N8, the switch S6, and the ground, a second detecting discharge path MR2 through which a current flows in the order of the node N1, the reactor Ld, the switch S4, the resistor Rs, the node N4, and the gate terminal of the switch S5, and a third detecting discharge path MR3 through which a current flows in the order of the node N1, the reactor Ld, the switch S4, the node N3, and the positive power supply terminal of the operational amplifier OP1 are formed.

A resistance value of the reactor Ld and an on-resistance value of the switch S4 are sufficiently small. Therefore, due to the presence of the third detecting discharge path MR3, a voltage (reference voltage $V_{temp}$) substantially equal to the drive voltage $V_{bst}$ is supplied to the positive power supply terminal of the operational amplifier OP1, and the operational amplifier OP1 can operate. In this way, since the power supply voltage of the operational amplifier OP1 becomes higher during the temperature detection control than during the heating control, an upper limit value of the differential input value of the operational amplifier OP1 can be increased.

During the temperature detection control, the voltage $V_{heat}$ obtained by dividing a voltage (reference voltage $V_{temp}$) of the node N3 by the resistor Rs and the heater HTR is input to the non-inverting input terminal of the operational amplifier OP1. A potential of the node N7 is equal to that of the node N4 when the wiring resistance is ignored. Therefore, the voltage input to the gate terminal of the switch S5 is also the same as the voltage $V_{heat}$. Since the voltage $V_{heat}$ is lower than a threshold voltage of the switch S5, the switch S5 is turned off in the state of FIG. 23. In this way, the resistance value of the resistor Rs is preferably determined so that the voltage $V_{heat}$ is equal to or lower than the threshold voltage of the switch S5. By turning off the switch S5, the output voltage $V_{OUT}$ of the operational amplifier OP1 is input to the terminal P9 of the MCU 1 without being divided. In a state where the switch S5 is turned off, the parasitic diode D5 acts as a Zener diode. Therefore, the voltage input to the terminal P9 of the MCU 1 can be prevented from increasing even when the output voltage $V_{OUT}$ of the operational amplifier OP1 becomes excessively large due to some factor. In the present embodiment, the resistance values of the resistor R4 and the resistor Rs are determined so that the voltage input to the terminal P9 of the MCU 1 is equal to or lower than the operating voltage (system power supply voltage Vcc2) of the MCU 1 in the state of FIG. 23.

When an amplification factor of the operational amplifier OP1 is denoted by A, the resistance value of the heater HTR is denoted by $R_{HTR}$, the resistance value of the resistor Rs is denoted by $R_{RS}$, and the voltage input to the inverting input terminal of the operational amplifier OP1 is 0 V, the output voltage $V_{OUT}$ of the operational amplifier OP1 is expressed by the following Equation (1). An item excluding the amplification factor A on a right side of Equation (1) corresponds to the voltage $V_{heat}$.

[Math. 1]

$$V_{OUT} = A \cdot \frac{R_{HTR}}{R_{Rs} + R_{HTR}} \cdot V_{temp} \tag{1}$$

When Equation (1) is solved with respect to the resistance value $R_{HTR}$, the following Equation (2) is obtained.

[Math. 2]

$$R_{HTR} = \frac{R_{Rs}}{\frac{V_{temp} \cdot A}{V_{OUT}} - 1} \tag{2}$$

During the temperature detection control, the MCU 1 amplifies a difference between the output voltage $V_{OUT}$ input to the terminal P9 and the ground potential (=0 V) by the built-in operational amplifier OP5, and converts the amplified voltage into a digital value (described as ADC_$V_{OUT}$) by the built-in ADC 1*b*. In addition, the MCU 1 amplifies a difference between a divided value (value divided by the voltage divider circuit Pb) of the reference voltage $V_{temp}$ input to the terminal P18 and the ground potential (=0 V) by the built-in operational amplifier OP4, and converts the amplified voltage into a digital value (described as ADC_$V_{temp}$) by the built-in ADC 1*a*. The inverting input terminal of the operational amplifier OP4 and/or the operational amplifier OP5 may not necessarily be connected to the ground potential, and may be connected to another reference potential. When the reference potential is sufficiently high, the reference potential may be connected to the non-inverting input terminal, and a divided value of the output voltage $V_{OUT}$ or the reference voltage $V_{temp}$ may be connected to the inverting input terminal. Outputs of the ADC 1*a* and the operational amplifier OP4 cause a temperature drift error ε1 due to an influence of the temperature in the MCU 1, and outputs of the ADC 1*b* and the operational amplifier OP5 cause a temperature drift error ε2 due to the influence of the temperature in the MCU 1. That is, strictly speaking, the digital value output from the ADC 1*a* is $ADC\_V_{temp}$ (1+ε1), and strictly speaking, the digital value output from the ADC 1*b* is $ADC\_V_{OUT}$ (1+ε2).

Equation (3) is obtained by substituting the digital value $ADC\_V_{temp}$ (1+ε1) into $V_{temp}$ of Equation (2) and substituting the digital value $ADC\_V_{OUT}$ (1+ε2) into $V_{OUT}$ of Equation (2). The ADC 1*a* and the operational amplifier OP4 as well as the ADC 1*b* and the operational amplifier OP5 are provided in the MCU 1. Therefore, the temperature drift error ε1 and the temperature drift error ε2 are regarded to be substantially the same. That is, (1+ε1) and (1+ε2) in Equation (3) have the same value. Therefore, in Equation (3), the temperature drift errors are canceled. The MCU 1 derives the resistance value $R_{HTR}$ of the heater HTR by the calculation of Equation (3). Since the heater HTR has a characteristic in which the resistance value varies in accordance with the temperature, the temperature of the heater HTR may be acquired by deriving the resistance value $R_{HTR}$.

[Math. 3]

$$R_{HTR} = \frac{R_{Rs}}{\frac{\text{ADC\_Vtemp}\cdot A\cdot(1+\varepsilon 1)}{\text{ADC\_Vout}\cdot(1+\varepsilon 2)} - 1} \tag{3}$$

In this way, by the calculation of Equation (3), a temperature drift error which may occur in the output voltage $V_{OUT}$ (more precisely, a temperature drift error which may occur in an output of the electronic components (operational amplifier OP5 and ADC 1*b*) necessary for acquiring the information corresponding to the output voltage $V_{OUT}$) and a temperature drift error which may occur in the reference voltage $V_{temp}$ (more precisely, a temperature drift error which may occur in an output of the electronic components (operational amplifier OP4 and ADC 1*a*) necessary for acquiring the information corresponding to the reference voltage $V_{temp}$) can be canceled, and the resistance value $R_{HTR}$ of the heater HTR can be derived more accurately. In other words, the resistance value $R_{HTR}$ of the heater HTR is easily derived without being affected by the temperature of the MCU 1.

In the example of FIG. 20, the operational amplifier OP5 and the ADC 1*b* as well as the operational amplifier OP4 and the ADC 1*a* are individually provided in the MCU 1. However, these may be commonalized. That is, an operational amplifier and an ADC for acquiring information of the output voltage $V_{OUT}$ as well as an operational amplifier and an ADC for acquiring information of the reference voltage $V_{temp}$ may be commonalized, and the digital value $ADC\_V_{temp}$ (1+ε1) and the digital value $ADC\_V_{OUT}$ (1+ε2) may be obtained in a time-division manner. According to this configuration, the temperature drift errors occurring in the two digital values can be further matched, and the resistance value $R_{HTR}$ of the heater HTR can be derived with higher accuracy.

A potential of the node N3 when the switch S4 is turned on is substantially the same as a potential of the node N1. Therefore, when the switch S3 is turned off and the switch S4 is turned on, the MCU 1 may acquire the potential of the node N1 as the reference voltage $V_{temp}$ and use the acquired voltage for deriving the resistance value of the heater HTR. In addition, when an increase in power consumption is allowed by constantly supplying a voltage to the positive power supply terminal of the operational amplifier OP1, the positive power supply terminal of the operational amplifier OP1 may be connected to the node N1 instead of the node N3, and the node N1 and the voltage divider circuit Pb may be connected.

Figure 24:
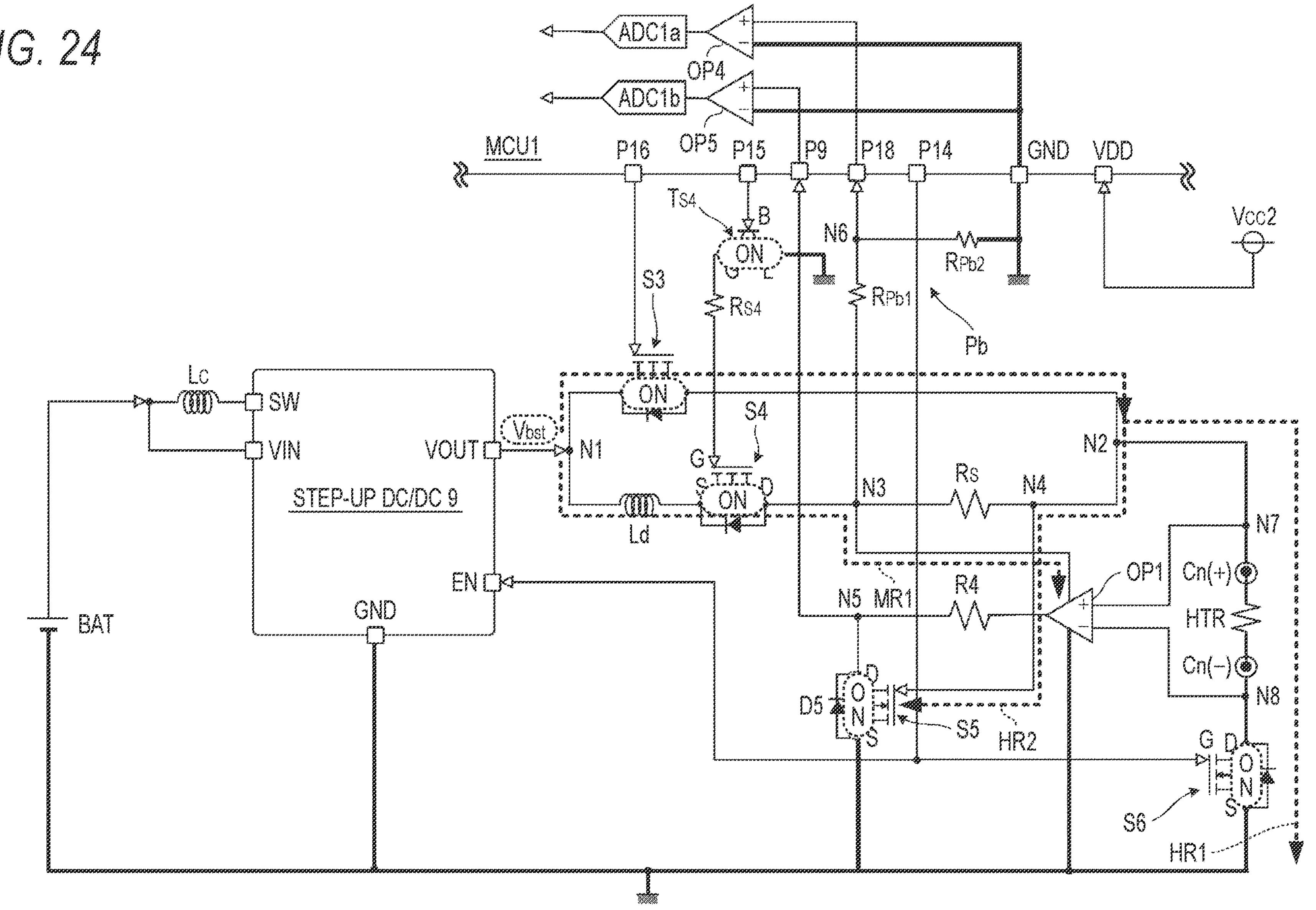

FIG. 24 is a diagram illustrating a flow of a current when both the switch S3 and the switch S4 in the driving example EX2 of FIG. 21 are turned on. In the state of FIG. 24, the first heating discharge path HR1 through which a current flows in the order of the node N1, the switch S3, the node N2, the node N7, the heater HTR, the node N8, the switch S6, and the ground, the second heating discharge path HR2 through which a current flows in the order of the node N1, the switch S3, the node N2, the node N4, and the gate terminal of the switch S5, and the third detecting discharge path MR3 through which a current flows in the order of the node N1, the reactor Ld, the switch S4, the node N3, and the positive power supply terminal of the operational amplifier OP1 are formed.

In the state of FIG. 24, since the node N3 and the node N4 have substantially the same potential, almost no current flows through the resistor Rs. Therefore, the power supply voltage of the operational amplifier OP1 becomes the drive voltage $V_{bst}$. That is, in this state, the upper limit value of the differential input value of the operational amplifier OP1 becomes equal to the drive voltage $V_{bst}$. Therefore, the output voltage of the operational amplifier OP1 is larger than that in the state of FIG. 22. However, in the present embodiment, a resistance ratio of the resistor R4 and the on-resistance of the switch S5 is determined so that the voltage input to the terminal P9 of the MCU 1 is equal to or lower than the operating voltage (system power supply voltage Vcc2) of the MCU 1 in the state of FIG. 24. Therefore, a large voltage equal to or higher than the operating voltage is not input to the terminal P9 of the MCU 1. That is, the operation of the MCU 1 is stabilized.

In this way, in the inhaler 100, a voltage lower than the drive voltage $V_{bst}$ can be supplied as the power supply voltage of the operational amplifier OP1 through the third heating discharge path HR3 in a period in which the switch S3 is turned on and the switch S4 is turned off, as illustrated in FIG. 22. In addition, a voltage equivalent to the drive voltage $V_{bst}$ can be supplied as the power supply voltage of the operational amplifier OP1 through the third detecting discharge path MR3 in a period in which the switch S4 is turned on and the switch S3 is turned off, as illustrated in FIG. 23. Therefore, the power supply voltage can be continuously supplied to the operational amplifier OP1 in a period from the start of the heating of the heater HTR to the completion of the heating and the completion of the temperature detection of the heater HTR (period from the fall of a gate voltage of the switch 3 to the rise of the switch S4 immediately thereafter), as illustrated in FIG. 21. Therefore, as compared with a reference example in which the power supply voltage is not supplied to the operational amplifier OP1 in a period in which the switch S3 is turned on (heating period of the heater HTR), it is not necessary to wait until the power supply voltage of the operational amplifier OP1 sufficiently rises during the temperature detection control, and the heating control and the temperature detection control can be efficiently performed.

In particular, according to the driving example EX2, it is possible to supply the power supply voltage of the operational amplifier OP1 necessary for the temperature detection control while performing the heating control. Therefore, the power supply voltage of the operational amplifier OP1 can be sufficiently raised at a timing when the heating control is completed, and the resistance value of the heater HTR can be detected with high accuracy at an earlier timing after the heating of the heater HTR is completed as compared with the driving example EX1.

In either the driving example EX1 or the driving example EX2 illustrated in FIG. 21, the power supply voltage may not be supplied to the operational amplifier OP1 in a period from when the switch S4 is turned off to when the switch S3 is turned on next time. However, the heating control is performed immediately after this period, and the operation of the operational amplifier OP1 is not essential. Therefore, there is no problem even when the power supply voltage is not supplied to the operational amplifier OP1 in this period. Furthermore, since power consumption by the operational amplifier OP1 can be eliminated in this period, it is possible to contribute to power saving of the entire inhaler 100.

In the inhaler 100 configured as described above, the switch S3, the switch S4, and the switch S6 illustrated in FIG. 20 have preferable configurations. Hereinafter, preferable examples of each switch will be described.

<Preferable Configuration of Switch S3>

The switch S3 is preferably configured to have a small on-resistance value (in other words, a large chip size) so that more current flows through the heater HTR at the time of heating the heater HTR. Hereinafter, when the respective on-resistance values of the switch S3, the switch S4, and the switch S6 are compared, the comparison is performed under a condition that the temperature and the flowing current are the same.

At the time of heating the heater HTR, the switch S3 is turned on or turned off at a high speed by PWM control, PFM control, or the like. Therefore, the maximum current value which may be instantaneously output (maximum current value which may be output in a pulse shape) is preferably large. In addition, from the viewpoint of passing a large amount of current to the heater HTR and the viewpoint of making the ON time longer than that of the switch S4, it is preferable that the maximum current value that the switch S3 may continuously output is larger than that of the switch S4. Hereinafter, when the respective maximum current values which may be output by the switch S3, the switch S4, and the switch S6 are compared, the comparison is performed under a condition that the temperatures are the same.

As illustrated in FIG. 20, the switch S3 is preferably a P-channel MOSFET. The switch S3 may be constituted by an N-channel MOSFET. However, when the switch S3 is constituted by an N-channel MOSFET, in order to turn on the switch S3, it is necessary to set the voltage supplied from the terminal P16 of the MCU 1 to the gate terminal of the switch S3 to a value larger than the drive voltage $V_{bst}$, and it is necessary to increase the power supply voltage of the MCU 1. On the other hand, when the switch S3 is constituted by a P-channel MOSFET, the power supply voltage of the MCU 1 can be lowered than the drive voltage $V_{bst}$, and thus the power consumption of the MCU 1 can be suppressed.

<Preferable Configuration of Switch S4>

The on-resistance value of the switch S4 is preferably reduced so that a sufficiently large voltage can be applied to the series circuit of the resistor Rs and the heater HTR. However, when the on-resistance value is extremely small, the size increases, and thus in order to reduce a circuit area, the on-resistance value of the switch S4 is preferably larger than the on-resistance value of the switch S3. In order to prevent the current for detecting the resistance value of the heater HTR from changing the temperature of the heater HTR, it is preferable that the on-resistance value of the switch S4 is not extremely small. Specifically, the on-resistance value of the switch S4 is preferably a value smaller than the resistance value of the resistor Rs and larger than the on-resistance value of the switch 3.

As illustrated in FIG. 21, it is necessary that the detection of the resistance value of the heater HTR is performed in a shorter time than the heating of the heater HTR. In addition, since the switch S6 is always turned on in the heating mode, the responsiveness may not be high. Therefore, the responsiveness of the switch S4 is preferably higher than the responsiveness of the switch S3 and the switch S6. Indicators indicating the responsiveness of the transistor include a turn-on time $t_{on}$, a turn-on delay time $t_{d(on)}$, rise time $t_r$, a turn-off time $t_{off}$, a turn-off delay time $tt_{d(off)}$, and a fall time $t_f$.

The turn-on delay time $t_{d(on)}$ is a time required for a drain-source voltage to reach 90% of a set value after the gate-source voltage reaches 10% of a set value at the time of turning on.

The rise time $t_r$ is a time required for the drain-source voltage to reach 10% of the set value from 90% at the time of turning on.

The turn-on time $t_{on}$ is a total value of the turn-on delay time $tt_{d(on)}$ and the rise time $t_r$.

The turn-off delay time $tt_{d(off)}$ is a time required for the drain-source voltage to reach 10% of the set value after the gate-source voltage reaches 90% of the set value at the time of turning off.

The fall time $t_f$ is a time required for the drain-source voltage to reach 90% of the set value from 10% at the time of turning off.

The turn-off time $t_{off}$ is a total value of the turn-off delay time $t_{d(off)}$ and the fall time $t_f$.

It is necessary that the detection of the resistance value of the heater HTR is performed in a shorter time than the heating of the heater HTR. Therefore, the turn-on delay time or the rise time of the switch S4 is preferably shorter than the turn-on delay time or the rise time of each of the switch S3 and the switch S6. Similarly, the turn-off delay time or the fall time of the switch S4 is preferably shorter than the turn-off delay time or the fall time of each of the switch S3 and the switch S6.

As illustrated in FIG. 20, the switch S4 is preferably a P-channel MOSFET. The switch S4 may be constituted by an N-channel MOSFET. However, when the switch S4 is constituted by an N-channel MOSFET, in order to turn on the switch S4, it is necessary to set the voltage supplied from the terminal P15 of the MCU 1 to the gate terminal of the switch S4 to a value larger than the drive voltage $V_{bst}$, and the power supply voltage of the MCU 1 is increased. On the other hand, when the switch S4 is constituted by a P-channel MOSFET, the power supply voltage of the MCU 1 can be lowered than the drive voltage $V_{bst}$, and thus the power consumption of the MCU 1 can be suppressed.

<Preferable Configuration of Switch S6>

The switch S6 is preferably configured to have a small on-resistance value (in other words, a large chip size) so that more current flows through the heater HTR at the time of heating the heater HTR. Specifically, the on-resistance value of the switch S6 is preferably equal to the on-resistance value of the switch S3.

It is necessary for the switch S6 to continuously supply a current in the heating mode. Therefore, the maximum current value that the switch S6 may continuously output is preferably larger than those of the switch S4 and the switch S3. On the other hand, since the switch S6 is always turned on in the heating mode, the maximum current value that the switch S6 may instantaneously output (may output in a pulse shape) is preferably smaller than that of the switch S3 that is repeatedly turned on or turned off. When the maximum current value which may be instantaneously output (which may be output in a pulse shape) for the application of the switch S6 is made excessively large, the chip size and the cost of the switch S6 may increase.

In addition, since the switch S3 is connected to a high potential position on the circuit, it is more difficult to improve the responsiveness than the switch S6 from the viewpoint of safety. Therefore, enhancing the responsiveness of the switch S6 to be higher than that of the switch S3 is effective in enhancing the responsiveness of the entire circuit. Specifically, the turn-off delay time or the fall time of the switch S6 is preferably shorter than the turn-off delay time or the fall time of the switch S3. Similarly, the turn-on delay time or the rise time of the switch S6 is preferably shorter than the turn-on delay time or the rise time of the switch S3.

As illustrated in FIG. 20, the switch S6 is preferably an N-channel MOSFET. The switch S6 may be constituted by a P-channel MOSFET. However, when the switch S6 is constituted by a P-channel MOSFET, it is necessary to set the voltage supplied from the terminal P14 of the MCU 1 to the gate terminal of the switch S6 to a value smaller than the ground level in order to turn on the switch S6. When a voltage lower than the ground level is generated, a dedicated circuit such as a negative power supply or a rail splitter circuit is required. On the other hand, when the switch S6 is constituted by an N-channel MOSFET, the MCU 1 can turn on the switch S6 by inputting a voltage corresponding to its own power supply voltage to the gate terminal, and thus it is possible to prevent the circuit from becoming complicated. In addition, when the switch S6 is constituted by an N-channel MOSFET, a high-level signal can be input to the enable terminal EN of the step-up DC/DC converter 9 simultaneously with turning on the switch S6, and the drive voltage $V_{bst}$ can be output from the step-up DC/DC converter 9. When the switch S6 is constituted by a P-channel MOSFET, it is necessary to connect an inverter for logic inversion between the enable terminal EN of the step-up DC/DC converter 9 and the gate terminal of the switch S6. However, by constituting the switch S6 with an N-channel MOSFET, such an inverter can be eliminated, and reduction in circuit scale and reduction in manufacturing cost can be implemented.

In this way, it is preferable that the switch S3, the switch S4, and the switch S6 have different configurations. In the present description, a difference in a configuration of a switch including a transistor means that at least one of a difference in a type of the transistor and a difference in specification (on-resistance value, responsiveness, and the like) of the transistor is satisfied. With such a configuration, the type and the specification of each switch can correspond to a position to which each switch is connected, as compared with a case where all the three switches have the same type and the same specification. Therefore, the performance of the inhaler 100 can be improved.

In the circuit illustrated in FIG. 20, the switch S6 may be omitted, and the node N8 may be directly connected to the ground. With such a configuration, by setting the switch S3 and the switch S4 to have different configurations, the type and the specification of each switch can also correspond to a position to which each switch is connected, as compared with a case where the two switches have the same type and the same specification. Therefore, the performance of the inhaler 100 can be improved.

<Preferable Disposition of Electronic Component>

Next, a description will be given on a preferable example of installation positions of main electronic components on the receptacle-mounted board 162 in the circuit illustrated in FIG. 20.

Figure 25:
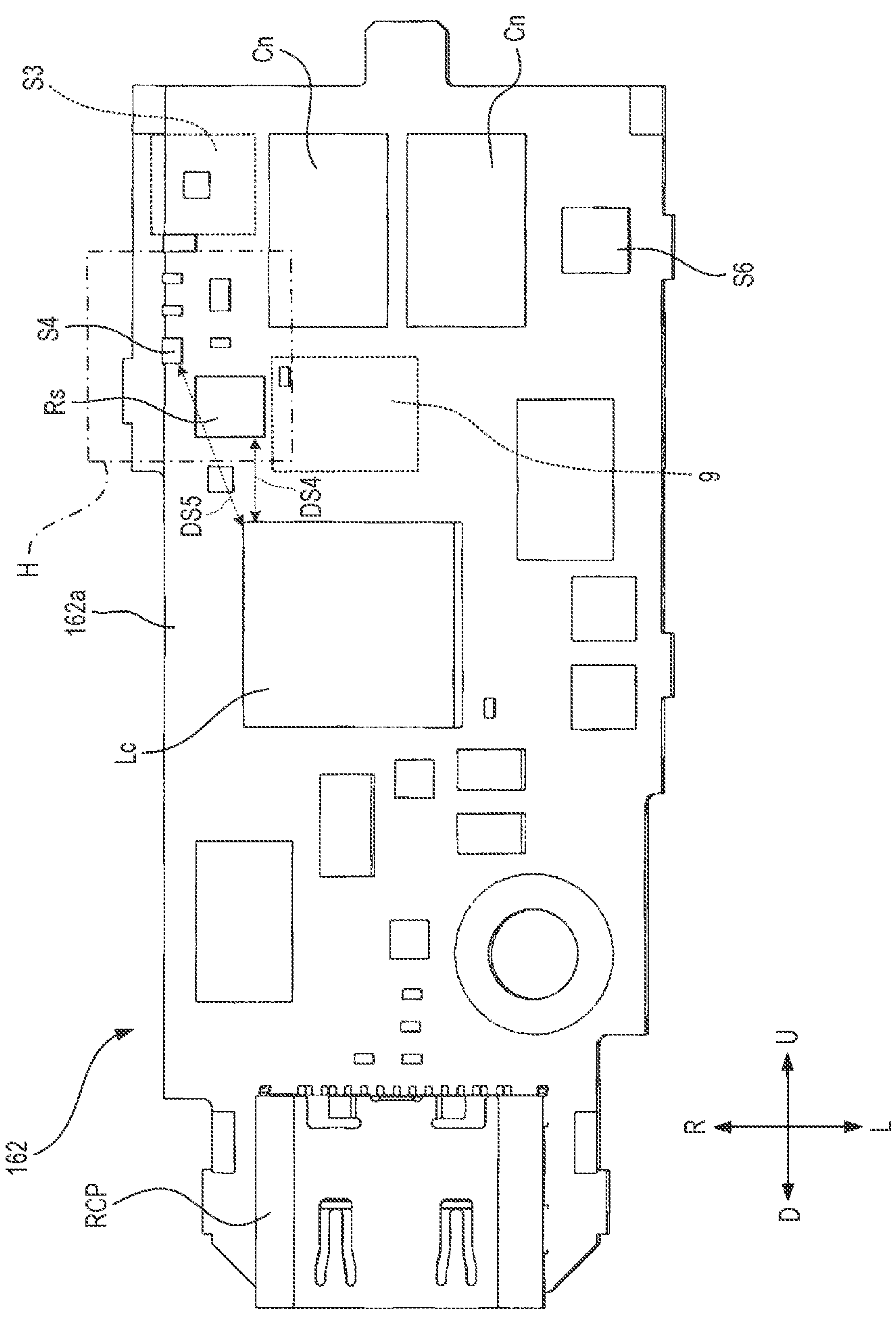
FIG. 25 is a plan view of a receptacle-mounted board as viewed from a main surface side.
Figure 26:
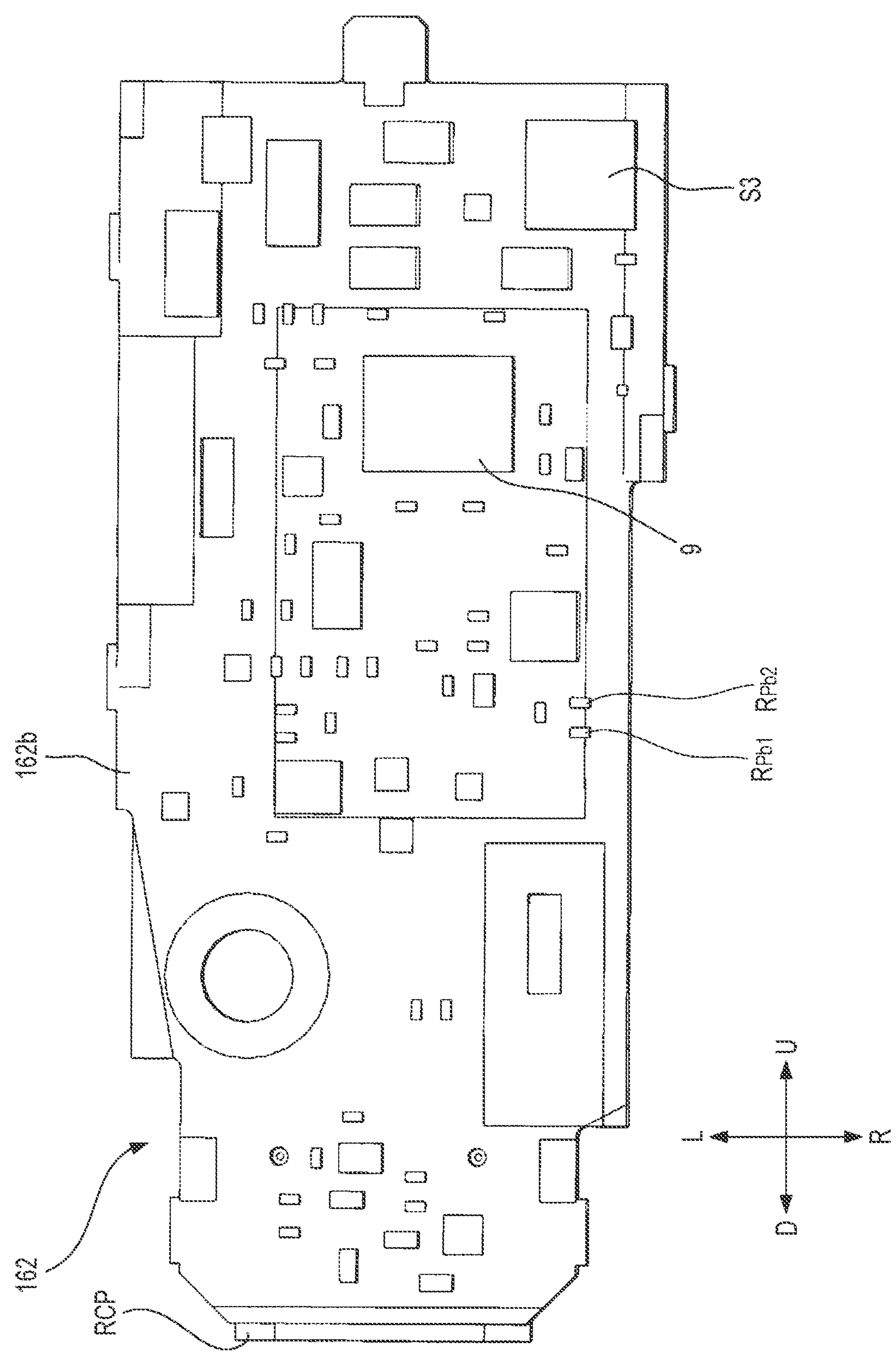
FIG. 26 is a plan view of the receptacle-mounted board as viewed from a secondary surface side.

FIG. 25 is a plan view of the receptacle-mounted board 162 as viewed from a main surface 162*a* side. FIG. 26 is a plan view of the receptacle-mounted board 162 as viewed from a secondary surface 162*b* side. As illustrated in FIG. 25, the reactor Lc, the resistor Rs, the switch S4, the switch S6, and the heater connector Cn, among the electronic components illustrated in FIG. 20, are provided on the main surface 162*a* of the receptacle-mounted board 162. As illustrated in FIG. 26, the step-up DC/DC converter 9, the switch S3, the resistor $R_{Pb1}$, and the resistor $R_{Pb2}$, among the electronic components illustrated in FIG. 20, are provided on the secondary surface 162*b* of the receptacle-mounted board 162.

On the secondary surface 162*b*, the resistor $R_{Pb1}$ and the resistor $R_{Pb2}$ are disposed close to each other. The resistor $R_{Pb1}$ and the resistor $R_{Pb2}$ constitute the voltage divider circuit Pb which divides the potential of the node N3. When a difference occurs between the temperatures of the resistor $R_{Pb1}$ and the resistor $R_{Pb2}$, a voltage division ratio of the voltage divider circuit Pb varies, and the accuracy of obtaining the potential of the node N3 necessary for deriving the resistance value of the heater HTR decreases. As illustrated in FIG. 26, the resistor $R_{Pb1}$ and the resistor $R_{Pb2}$ are mounted on the same surface of the receptacle-mounted board 162 and are disposed close to each other, whereby a difference in temperature between the resistor $R_{Pb1}$ and the resistor $R_{Pb2}$ can be prevented. In order to enhance this effect, it is preferable that the electronic component closest to the resistor $R_{Pb1}$, among the electronic components mounted on the receptacle-mounted board 162, is the resistor $R_{Pb2}$.

Among the electronic components illustrated in FIGS. 25 and 26, the switch S3, the step-up DC/DC converter 9, the reactor Lc, and the heater connector Cn may be used as a heat source or a noise source. Among them, the switch S3 generates the largest amount of heat, and the step-up DC/DC converter 9 generates the next largest amount of heat. In the examples of FIGS. 25 and 26, the switch S3 and the step-up DC/DC converter 9 which generate a large amount of heat as well as the switch S4, the switch S6, and the resistor Rs are mounted on different surfaces of the same board. In other words, the switch S3 and the step-up DC/DC converter 9 are mounted on the secondary surface 162*b*, and the switch S4, the switch S6, and the resistor Rs are mounted on the main surface 162*a*. In this way, the switch S4, the switch S6, and the resistor Rs can be prevented from being affected by heat or noise from the switch S3 and the step-up DC/DC converter 9.

In addition, in the example illustrated in FIG. 25, the switch S3 and the step-up DC/DC converter 9 as well as the switch S4, the switch S6, and the resistor Rs are disposed so as not to overlap with one another in a state of being viewed in a direction orthogonal to an element mounting surface (main surface 162*a* and secondary surface 162*b*) of the receptacle-mounted board 162. In this way, the heat or the noise generated in the switch S3 and the step-up DC/DC converter 9 is less likely to be transmitted to the switch S4, the switch S6, and the resistor Rs via the board. That is, it is possible to more strongly prevent the switch S4, the switch S6, and the resistor Rs from being affected by the heat or the noise from the switch S3 and the step-up DC/DC converter 9.

In the example illustrated in FIGS. 25 and 26, for example, the switch S4 or the switch S6 may be mounted on the secondary surface 162*b*. In this way, it is also possible to prevent either the switch S4 or the switch S6 from being affected by the heat or the noise from the switch S3 and the step-up DC/DC converter 9.

In addition, at least one of the switch S4 and the switch S6, among the electronic components of the circuit illustrated in FIG. 20, may be mounted on a board (for example, the MCU-mounted board 161 or the like) different from the receptacle-mounted board 162. In this way, it is also possible to prevent at least one of the switch S4 and the switch S6 from being affected by the heat or the noise from the switch S3 and the step-up DC/DC converter 9.

FIG. 25 illustrates a distance DS4 (length of a straight line connecting two mounting regions at the shortest distance) between a mounting region where the resistor Rs is mounted on the main surface 162*a* and a mounting region where the reactor Lc is mounted on the main surface 162*a*. In addition, FIG. 25 illustrates a distance DS5 (length of a straight line connecting two mounting regions at the shortest distance) between a mounting region where the switch S4 is mounted on the main surface 162*a* and the mounting region where the reactor Lc is mounted on the main surface 162*a*. The distance DS4 is shorter than the distance DS5.

The resistance value of the resistor Rs is less likely to be affected by temperature variation than the on-resistance value of the switch S4. Therefore, by disposing the resistor Rs which is less likely to be affected by the temperature variation closer to the reactor Lc than the switch S4, a board area can be effectively used.

Further, in the example of FIG. 25, the resistor Rs is mounted between the switch S4 and the reactor Lc. That is, the mounting region of the resistor Rs exists on a straight line connecting the mounting region of the switch S4 and the mounting region of the reactor Lc. In this way, the resistor Rs serves as a physical barrier which protects the switch S4 from the heat generated in the reactor Lc. As a result, it is possible to strongly suppress a change in the temperature of the switch S4. When the on-resistance value of the switch S4 varies, the measurement accuracy of the resistance value of the heater HTR is affected. Therefore, it is particularly important to suppress the temperature variation of the switch S4.

Figure 27:
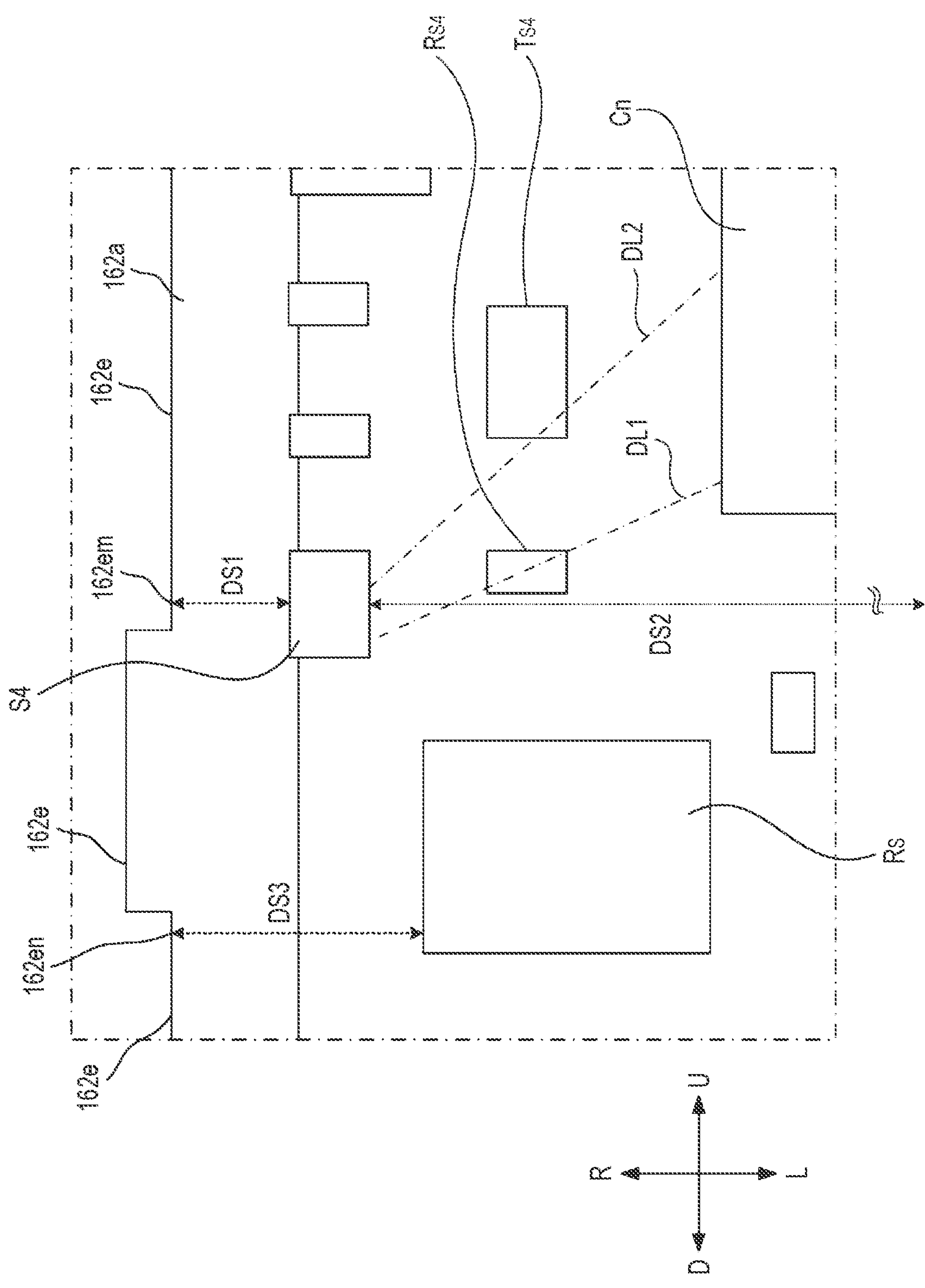
FIG. 27 is an enlarged view of a range H illustrated in FIG. 25.

FIG. 27 is an enlarged view of a range H illustrated in FIG. 25. As illustrated in FIG. 27, the mounting region of the switch S4 and the mounting region of the heater connector Cn are separated from each other on the main surface 162*a* of the receptacle-mounted board 162, but the resistor $R_{S4}$ and the bipolar transistor $T_{S4}$ in the circuit illustrated in FIG. 20 are mounted therebetween. In other words, the resistor $R_{S4}$ and the bipolar transistor $T_{S4}$ are mounted on a straight line DL1 and a straight line DL2 connecting the mounting region of the switch S4 and the mounting region of the heater connector Cn. According to this configuration, the resistor $R_{S4}$ and the bipolar transistor $T_{S4}$ serve as physical barriers which protect the switch S4 from the heat generated by the heater connector Cn. As a result, it is possible to strongly suppress a change in the temperature of the switch S4.

In addition, as illustrated in FIGS. 25 and 27, the switch S4 is disposed in the vicinity of an outer edge of the main surface 162*a* of the receptacle-mounted board 162. Specifically, on the main surface 162*a* of the receptacle-mounted board 162, a distance DS1 between the mounting region of the switch S4 and a closest edge 162*em* which is an edge closest to the mounting region of the switch S4 among edges 162*e* in a right direction of the main surface 162*a* is shorter than a distance DS2 between a center of the main surface 162*a* of the receptacle-mounted board 162 in the left-right direction and the mounting region of the switch S4. In this way, by disposing the switch S4 in the vicinity of the edge of the receptacle-mounted board 162, the switch S4 is less likely to be affected by the heat generated by other electronic components. In particular, as illustrated in FIG. 27, another electronic component is not present between the closest edge 162*em* and the switch S4, in other words, the electronic component closest to the closest edge 162*em* on the receptacle-mounted board 162 is the switch S4, whereby the temperature change of the switch S4 can be further suppressed.

In addition, in the example illustrated in FIG. 27, a distance DS3 between the mounting region of the resistor Rs on the main surface 162*a* of the receptacle-mounted board 162 and an edge 162*en*, among the edges 162*e*, closest to the mounting region of the resistor Rs is larger than the distance DS1. As described above, the resistor Rs is less likely to be affected by the temperature change than the switch S4. Therefore, by disposing the resistor Rs close to the center of the receptacle-mounted board 162, the board area can be effectively utilized.

Preferable Embodiment of Switch S4

It is preferable that a voltage $V_{GS}$ (absolute value) applied between the gate and the source of the switch S4 when being turned on is as high as possible. That is, when the switch S4 is a P-channel MOSFET, the voltage $V_{GS}$ applied between the gate and the source when being turned on is preferably set to a negative value as large as possible. In this way, the reason is that it is possible to reduce the on-resistance value of the switch S4, reduce the Joule heat at the time of turning on, and suppress the temperature variation of the switch S4. Specifically, when the maximum rated value (absolute value) of the voltage which can be applied between the gate and the source of the switch S4 is denoted by voltage $V_{GSS}$ and a threshold (absolute value) of the voltage between the gate and the source of the switch S4 is denoted by voltage $V_{th}$, the MCU 1 preferably controls the voltage applied to the gate terminal of the switch S4 so that the voltage $V_{GS}$ (absolute value) becomes a value close to the voltage $V_{GSS}$ among the voltage $V_{GSS}$ and the voltage $V_{th}$. In other words, the voltage applied to the gate terminal of the switch S4 is preferably controlled so that an absolute value of a difference between the voltage $V_{GSS}$ and the voltage $V_{GS}$ (absolute value) is smaller than an absolute value of a difference between the voltage $V_{th}$ and the voltage $V_{GS}$ (absolute value).

In this way, in order to set the voltage $V_{GS}$ (absolute value) to a high value, it is preferable to provide an overvoltage protection diode such as a varistor between the gate terminal and the source terminal of the switch S4. Due to presence of the overvoltage protection diode, even when a surge voltage which may occur due to switching in the step-up DC/DC converter 9 is applied to the switch S4, a value thereof can be set to be equal to or less than the maximum rated value. As a result, the switch S4 is less likely to fail, and the durability of the inhaler 100 can be improved.

In the present description, at least the following matters are described. Corresponding constituent components and the like in the above-mentioned embodiment are shown in parentheses, but the present invention is not limited thereto.

(1) A power supply unit for an aerosol generating device, including:

a power supply (power supply BAT);

a heater connector (heater connector Cn) including a positive electrode and a negative electrode, by which a heater (heater HTR) configured to heat an aerosol source by consuming power supplied from the power supply is connected to the positive electrode and the negative electrode;

a first plus-side circuit (circuit including a series circuit of a reactor Ld, a switch S4, and a resistor Rs, and a wiring connecting the series circuit to a node N1 and a node N2) having one end connected to the positive electrode and including a first plus-side switch (switch S4) and a fixed resistor (resistor Rs);

a second plus-side circuit (circuit including a wiring connecting a switch S3 to a node N1 and a node N2) having one end connected to the positive electrode, including a second plus-side switch (switch S3), and connected in parallel with the first plus-side circuit;

minus-side switch (switch S6) connected to the negative electrode; and a controller (MCU 1) configured to execute predetermined control based on a voltage applied to the fixed resistor or the heater connector when the first plus-side switch and the minus-side switch are ON, in which one or both of a first condition in which the first plus-side switch is different from at least one of the second plus-side switch and the minus-side switch and a second condition in which the second plus-side switch is different from the minus-side switch is satisfied.

According to (1), the type and the specification of each switch can correspond to a position to which each switch is connected as compared with a case where all of the three switches have the same type and the same specification. Therefore, the performance of the aerosol generating device can be improved.

(2) The power supply unit for an aerosol generating device according to (1), in which:

the first plus-side switch includes a P-channel MOSFET;

the second plus-side switch includes a P-channel MOSFET; and the minus-side switch includes an N-channel MOSFET.

According to (2), a P-channel MOSFET suitable for a high potential (plus control) is disposed on a positive side, and an N-channel MOSFET suitable for a low potential (minus control) is disposed on a negative side. Therefore, the performance of the aerosol generating device can be improved.

(3) The power supply unit for an aerosol generating device according to (2), further including:

a step-up converter (step-up DC/DC converter) having an output terminal connected to a source terminal of the P-channel MOSFET included in the first plus-side switch and a source terminal of the P-channel MOSFET included in the second plus-side switch; and a controller (MCU 1) connected to a gate terminal of the P-channel MOSFET included in the first plus-side switch and a gate terminal of the P-channel MOSFET included in the second plus-side switch, in which a voltage (system power supply voltage Vcc2) input to a power supply terminal (power supply terminal VDD) of the controller is lower than a voltage (drive voltage $V_{bst}$) output from the output terminal (VOUT) of the step-up converter.

According to (3), a high voltage with excellent aerosol generating efficiency can be applied to the heater by the step-up converter. In addition, even in a power-saving controller which operates at a low voltage, a gate-source voltage of each of the first plus-side switch and the second plus-side switch can be easily set to a value for turning on the switch. As a result, high performance and power saving of the aerosol generating device can be implemented simultaneously.

(4) The power supply unit for an aerosol generating device according to (2) or (3), further including:

a step-up converter (step-up DC/DC converter 9) having an output terminal (output terminal VOUT) connected to a source terminal of the P-channel MOSFET included in the first plus-side switch and a source terminal of the P-channel MOSFET included in the second plus-side switch, and including an activation terminal (enable terminal EN) configured to output a voltage from the output terminal when a signal of a predetermined level is input, in which the activation terminal of the step-up converter is connected to a gate terminal of the N-channel MOSFET included in the minus-side switch.

According to (4), it is possible to simultaneously turn on the minus-side switch and start the step-up converter. Therefore, the number of steps necessary for discharging to the heater is reduced, and the responsiveness of aerosol generation can be improved.

(5) The power supply unit for an aerosol generating device according to (4), in which the predetermined level is a high level.

According to (5), it is possible to simultaneously turn on the minus-side switch and start the step-up converter. In other words, it is not necessary to connect an inverter for logic inversion to the activation terminal of the step-up converter. Therefore, the responsiveness of aerosol generation can be improved while reducing the cost of the aerosol generating device.

(6) The power supply unit for an aerosol generating device according to (1), in which:

the second plus-side switch includes a transistor;

the minus-side switch includes a transistor; and the transistor included in the second plus-side switch has a difference from the transistor included in the minus-side switch other than a channel type.

According to (6), the specification of each switch can correspond to a position to which each switch is connected as compared with a case where the second plus-side switch and the minus-side switch have different types and same specification. Therefore, the performance of the aerosol generating device can be improved.

(7) The power supply unit for an aerosol generating device according to (6), in which a maximum current value that the transistor included in the minus-side switch is capable of continuously outputting is larger than a maximum current value that the transistor included in the second plus-side switch is capable of continuously outputting.

According to (7), the two plus-side switches are simultaneously turned on due to some factors, and even when a current is supplied from both of the two plus-side circuits connected in parallel to the minus-side switch, the minus-side switch is less likely to be damaged. Therefore, the durability of the aerosol generating device is improved.

(8) The power supply unit for an aerosol generating device according to (6) or (7), in which:

the controller is configured to repeatedly switch ON and OFF of the transistor included in the second plus-side switch while the transistor included in the minus-side switch is ON; and a maximum current value that the transistor included in the minus-side switch is capable of outputting in a pulse shape is smaller than a maximum current value that the transistor included in the second plus-side switch is capable of outputting in a pulse shape.

According to (8), even when a surge current is generated by repeating switching of the second plus-side switch, the second plus-side switch is less likely to be damaged. Therefore, the aerosol generating device can be stably operated.

(9) The power supply unit for an aerosol generating device according to any one of (6) to (8), in which:

a turn-off delay time of the transistor included in the second plus-side switch is longer than a turn-off delay time of the transistor included in the minus-side switch; and/or a fall time of the transistor included in the second plus-side switch is longer than a fall time of the transistor included in the minus-side switch.

Since the transistor on the positive side is connected to a high potential position on the circuit, it is difficult to improve the responsiveness from the viewpoint of safety. According to (9), since the responsiveness of the transistor on the negative side is higher than that on the positive side, the responsiveness relating to aerosol generation of the aerosol generating device as a whole can be improved.

(10) The power supply unit for an aerosol generating device according to any one of (6) to (9), in which:

a turn-on delay time of the transistor included in the second plus-side switch is longer than a turn-on delay time of the transistor included in the minus-side switch; and/or a rise time of the transistor included in the second plus-side switch is longer than a rise time of the transistor included in the minus-side switch.

Since the transistor on the positive side is connected to a high potential position on the circuit, it is difficult to improve the responsiveness from the viewpoint of safety. According to (10), since the responsiveness of the transistor on the negative side is higher than that on the positive side, the responsiveness relating to aerosol generation of the aerosol generating device as a whole can be improved.

(11) The power supply unit for an aerosol generating device according to (1), in which:

the first plus-side switch includes a P-channel MOSFET;

the second plus-side switch includes a P-channel MOSFET; and the P-channel MOSFET included in the first plus-side switch is different from the P-channel MOSFET included in the second plus-side switch.

According to (11), the specification of each switch can correspond to a position to which each switch is connected as compared with a case where the two plus-side switches have the same type and the same specification. Therefore, the performance of the aerosol generating device can be improved.

(12) The power supply unit for an aerosol generating device according to (11), in which a maximum current value that the P-channel MOSFET included in the second plus-side switch is capable of continuously outputting is larger than a maximum current value that the P-channel MOSFET included in the first plus-side switch is capable of continuously outputting.

According to (12), a larger amount of current can be supplied to the heater via the second plus-side switch at the time of generating aerosol. Therefore, the amount of aerosol that can be generated can be improved, and the marketability of the aerosol generating device can be improved.

(13) The power supply unit for an aerosol generating device according to (11) or (12), in which an ON resistance value of the P-channel MOSFET included in the second plus-side switch is lower than an ON resistance value of the P-channel MOSFET included in the first plus-side switch.

According to (13), it is possible not only to supply the power for aerosol generating to the heater with low loss while reducing the loss in the second plus-side switch, but also to reduce the size of the first plus-side switch. Therefore, it is possible to reduce the size of the aerosol generating device while improving the aerosol generation efficiency thereof.

(14) The power supply unit for an aerosol generating device according to (13), in which an ON resistance value of the P-channel MOSFET included in the first plus-side switch is lower than an electric resistance value of the fixed resistor.

According to (14), the current flowing through the first plus-side switch can be further reduced by a fixed resistor having a high resistance value. Therefore, the size of the first plus-side switch can be reduced, and the size of the aerosol generating device can be further reduced.

(15) The power supply unit for an aerosol generating device according to any one of (11) to (14), in which:

a turn-on delay time of the P-channel MOSFET included in the first plus-side switch is shorter than a turn-on delay time of the P-channel MOSFET included in the second plus-side switch; and/or a rise time of the P-channel MOSFET included in the first plus-side switch is shorter than a rise time of the P-channel MOSFET included in the second plus-side switch.

According to (15), the voltage applied to the heater connector or the fixed resistor can be acquired more quickly when executing the predetermined control. Therefore, the predetermined control can be executed with good responsiveness.

(16) The power supply unit for an aerosol generating device according to (1), in which:

the first plus-side switch includes a transistor;

the minus-side switch includes a transistor; and the transistor included in the first plus-side switch has a difference from the transistor included in the minus-side switch other than a channel type.

According to (16), the specification of each switch can correspond to a position to which each switch is connected as compared with a case where the first plus-side switch and the minus-side switch have the same type and the same specification. Therefore, the performance of the aerosol generating device can be improved.

(17) The power supply unit for an aerosol generating device according to (16), in which:

a turn-on delay time of the transistor included in the first plus-side switch is shorter than a turn-on delay time of the transistor included in the minus-side switch; and/or a rise time of the transistor included in the first plus-side switch is shorter than a rise time of the transistor included in the minus-side switch.

According to (17), it is possible to improve the responsiveness of the first plus-side switch through which a large current does not flow unlike the minus-side switch. Therefore, it is possible to improve the responsiveness for executing predetermined control in the aerosol generating device as a whole.

(18) A power supply unit for an aerosol generating device, including:

a power supply (power supply BAT);

a heater connector (heater connector Cn) including a positive electrode and a negative electrode, by which a heater (heater HTR) configured to heat an aerosol source by consuming power supplied from the power supply is connected to the positive electrode and the negative electrode;

a first plus-side circuit (circuit including a series circuit of a reactor Ld, a switch S4, and a resistor Rs, and a wiring connecting the series circuit to a node N1 and a node N2) having one end connected to the positive electrode and including a first plus-side switch (switch S4) and a fixed resistor (resistor Rs);

second plus-side circuit (circuit including a wiring connecting a switch S3 to a node N1 and a node N2) having one end connected to the positive electrode, including a second plus-side switch (switch S3), and connected in parallel with the first plus-side circuit; and a controller (MCU 1) configured to execute predetermined control based on a voltage applied to the fixed resistor or the heater connector when the first plus-side switch is ON, in which the first plus-side switch is different from the second plus-side switch.

According to (18), the type and the specification of each switch can correspond to a position to which each switch is connected as compared with a case where the two switches have the same type and the same specification. Therefore, the performance of the aerosol generating device can be improved.

(19) The power supply unit for an aerosol generating device according to (18), in which:

the first plus-side switch includes a P-channel MOSFET;

the second plus-side switch includes a P-channel MOSFET; and the P-channel MOSFET included in the first plus-side switch is different from the P-channel MOSFET included in the second plus-side switch.

According to (19), the specification of each switch can correspond to a position to which each switch is connected as compared with a case where the two switches have different types and the same specification. Therefore, the performance of the aerosol generating device can be improved.

Although various embodiments have been described above with reference to the drawings, it is needless to say that the present invention is not limited to these examples. It is apparent to those skilled in the art that various changes and modifications may be conceived within the scope described in the claims, and it is understood that the changes and the modifications naturally fall within the technical scope of the present invention. In addition, the components described in the above embodiments may be optionally combined without departing from the spirit of the invention.

The invention claimed is:

1. A power supply apparatus for an aerosol generating device, comprising:

a power supply;

an electric connector including a positive electrode and a negative electrode, by which a heater configured to heat an aerosol source by consuming power supplied from the power supply is connected to the positive electrode and the negative electrode;

a first plus-side circuit having one end connected to the positive electrode and including a first plus-side switch and a fixed resistor;

a second plus-side circuit having one end connected to the positive electrode, including a second plus-side switch, and connected in parallel with the first plus-side circuit;

a minus-side switch connected to the negative electrode; and control circuitry configured to execute predetermined control based on a voltage applied to the fixed resistor or the electric connector when the first plus-side switch and the minus-side switch are ON, wherein one or both of a first condition in which the first plus-side switch is different from at least one of the second plus-side switch and the minus-side switch and a second condition in which the second plus-side switch is different from the minus-side switch is satisfied.

2. The power supply apparatus for an aerosol generating device according to claim 1, wherein:

the first plus-side switch includes a P-channel MOSFET;

the second plus-side switch includes a P-channel MOSFET; and the minus-side switch includes an N-channel MOSFET.

3. The power supply apparatus for an aerosol generating device according to claim 2, further comprising:

a step-up converter having an output terminal connected to a source terminal of the P-channel MOSFET included in the first plus-side switch and a source terminal of the P-channel MOSFET included in the second plus-side switch, wherein the control circuitry is connected to a gate terminal of the P-channel MOSFET included in the first plus-side switch and a gate terminal of the P-channel MOSFET included in the second plus-side switch, wherein a voltage input to a power supply terminal of the control circuitry is lower than a voltage output from the output terminal of the step-up converter.

4. The power supply apparatus for an aerosol generating device according to claim 2, further comprising:

a step-up converter having an output terminal connected to a source terminal of the P-channel MOSFET included in the first plus-side switch and a source terminal of the P-channel MOSFET included in the second plus-side switch, and including an activation terminal configured to output a voltage from the output terminal when a signal of a predetermined level is input, wherein the activation terminal of the step-up converter is connected to a gate terminal of the N-channel MOSFET included in the minus-side switch.

5. The power supply apparatus for an aerosol generating device according to claim 4, wherein the predetermined level is a high level.

6. The power supply apparatus for an aerosol generating device according to claim 1, wherein:

the second plus-side switch includes a transistor;

the minus-side switch includes a transistor; and the transistor included in the second plus-side switch has a difference from the transistor included in the minus-side switch other than a channel type.

7. The power supply apparatus for an aerosol generating device according to claim 6, wherein a maximum current value that the transistor included in the minus-side switch is capable of continuously outputting is larger than a maximum current value that the transistor included in the second plus-side switch is capable of continuously outputting.

8. The power supply apparatus for an aerosol generating device according to claim 6, wherein:

the control circuitry is configured to repeatedly switch ON and OFF of the transistor included in the second plus-side switch while the transistor included in the minus-side switch is ON; and a maximum current value that the transistor included in the minus-side switch is capable of outputting in a pulse shape is smaller than a maximum current value that the transistor included in the second plus-side switch is capable of outputting in a pulse shape.

9. The power supply apparatus for an aerosol generating device according to claim 6, wherein:

a turn-off delay time of the transistor included in the second plus-side switch is longer than a turn-off delay time of the transistor included in the minus-side switch; and/or a fall time of the transistor included in the second plus-side switch is longer than a fall time of the transistor included in the minus-side switch.

10. The power supply apparatus for an aerosol generating device according to claim 6, wherein:

a turn-on delay time of the transistor included in the second plus-side switch is longer than a turn-on delay time of the transistor included in the minus-side switch; and/or a rise time of the transistor included in the second plus-side switch is longer than a rise time of the transistor included in the minus-side switch.

11. The power supply apparatus for an aerosol generating device according to claim 1, wherein:

the first plus-side switch includes a P-channel MOSFET;

the second plus-side switch includes a P-channel MOSFET; and the P-channel MOSFET included in the first plus-side switch is different from the P-channel MOSFET included in the second plus-side switch.

12. The power supply apparatus for an aerosol generating device according to claim 11, wherein a maximum current value that the P-channel MOSFET included in the second plus-side switch is capable of continuously outputting is larger than a maximum current value that the P-channel MOSFET included in the first plus-side switch is capable of continuously outputting.

13. The power supply apparatus for an aerosol generating device according to claim 11, wherein an ON resistance value of the P-channel MOSFET included in the second plus-side switch is lower than an ON resistance value of the P-channel MOSFET included in the first plus-side switch.

14. The power supply apparatus for an aerosol generating device according to claim 13, wherein an ON resistance value of the P-channel MOSFET included in the first plus-side switch is lower than an electric resistance value of the fixed resistor.

15. The power supply apparatus for an aerosol generating device according to claim 11, wherein:

a turn-on delay time of the P-channel MOSFET included in the first plus-side switch is shorter than a turn-on delay time of the P-channel MOSFET included in the second plus-side switch; and/or a rise time of the P-channel MOSFET included in the first plus-side switch is shorter than a rise time of the P-channel MOSFET included in the second plus-side switch.

16. The power supply apparatus for an aerosol generating device according to claim 1, wherein:

the first plus-side switch includes a transistor;

the minus-side switch includes a transistor; and the transistor included in the first plus-side switch has a difference from the transistor included in the minus-side switch other than a channel type.

17. The power supply apparatus for an aerosol generating device according to claim 16, wherein:

a turn-on delay time of the transistor included in the first plus-side switch is shorter than a turn-on delay time of the transistor included in the minus-side switch; and/or a rise time of the transistor included in the first plus-side switch is shorter than a rise time of the transistor included in the minus-side switch.

18. A power supply apparatus for an aerosol generating device, comprising:

a power supply;

a heater connector including a positive electrode and a negative electrode, by which a heater configured to heat an aerosol source by consuming power supplied from the power supply is connected to the positive electrode and the negative electrode;

a first plus-side circuit having one end connected to the positive electrode and including a first plus-side switch and a fixed resistor;

a second plus-side circuit having one end connected to the positive electrode, including a second plus-side switch, and connected in parallel with the first plus-side circuit; and a controller configured to execute predetermined control based on a voltage applied to the fixed resistor or the heater connector when the first plus-side switch is ON, wherein the first plus-side switch is different from the second plus-side switch.

19. The power supply apparatus for an aerosol generating device according to claim 18, wherein:

the first plus-side switch includes a P-channel MOSFET;

the second plus-side switch includes a P-channel MOSFET; and the P-channel MOSFET included in the first plus-side switch is different from the P-channel MOSFET included in the second plus-side switch.

20. A power supply apparatus for an aerosol generating device, comprising:

a battery;

an electric connector by which a heater configured to heat an aerosol source by consuming power supplied from the power supply is connected to a positive electrode and a negative electrode of the electric connector;

a first plus-side circuit having one end connected to the positive electrode and including a first plus-side switch and a fixed resistor, wherein the first plus side switch includes a P-channel MOSFET;

a second plus-side circuit having one end connected to the positive electrode, including a second plus-side switch, and connected in parallel with the first plus-side circuit, wherein the second plus-side switch includes a P-channel MOSFET;

a minus-side switch connected to the negative electrode, wherein the minus-side switch includes an N-channel MOSFET;

control circuitry configured to execute predetermined control based on a voltage applied to the fixed resistor or the electric connector when the first plus-side switch and the minus-side switch are ON, wherein one or both of a first condition in which the first plus-side switch is different from at least one of the second plus-side switch and the minus-side switch and a second condition in which the second plus-side switch is different from the minus-side switch is satisfied; and a step-up converter having an output terminal connected to a source terminal of the P-channel MOSFET included in the first plus-side switch and a source terminal of the P-channel MOSFET included in the second plus-side switch, and including an activation terminal configured to output a voltage from the output terminal when a signal of a predetermined level is input, wherein the activation terminal of the step-up converter is connected to a gate terminal of the N-channel MOSFET included in the minus-side switch.

* * * * *